April 8, 1930. J. D. VAN VLIET 1,754,192
MULTIPOWERPLANT TRANSMISSION FOR AIRCRAFT AND THE LIKE
Filed Sept. 28, 1925 15 Sheets-Sheet 1

INVENTOR

April 8, 1930. J. D. VAN VLIET 1,754,192
MULTIPOWERPLANT TRANSMISSION FOR AIRCRAFT AND THE LIKE
Filed Sept. 28, 1925 15 Sheets-Sheet 3

INVENTOR

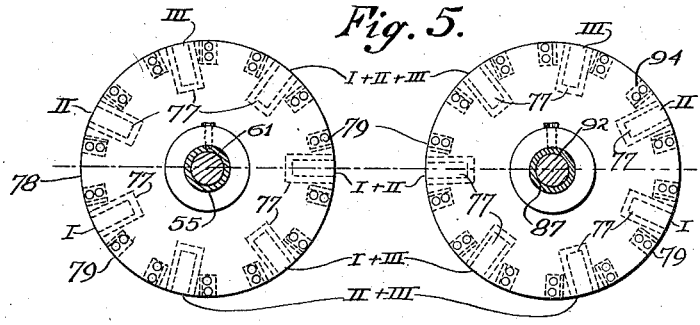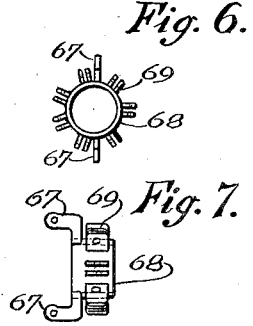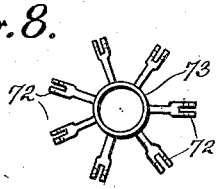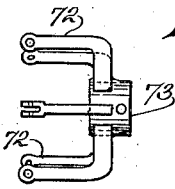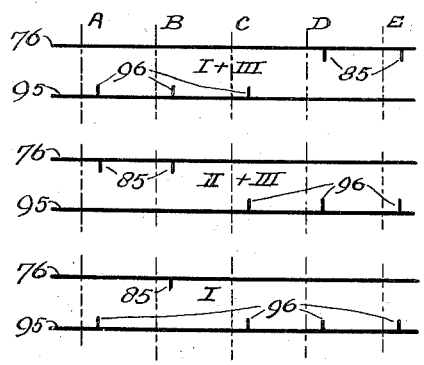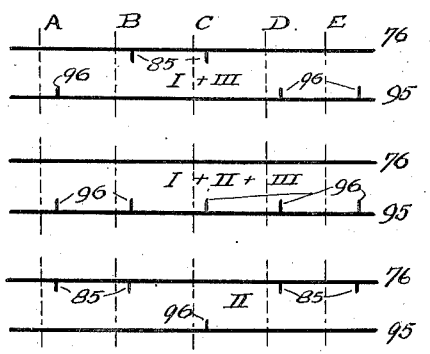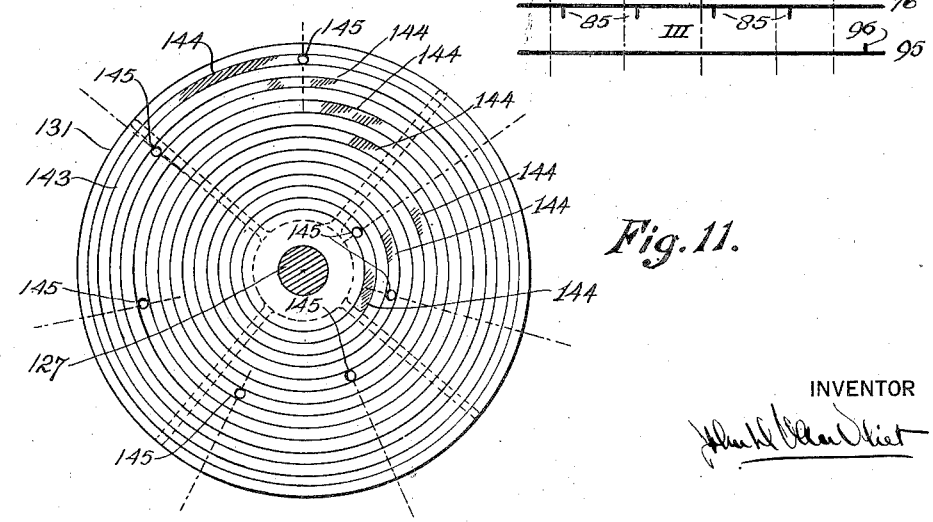

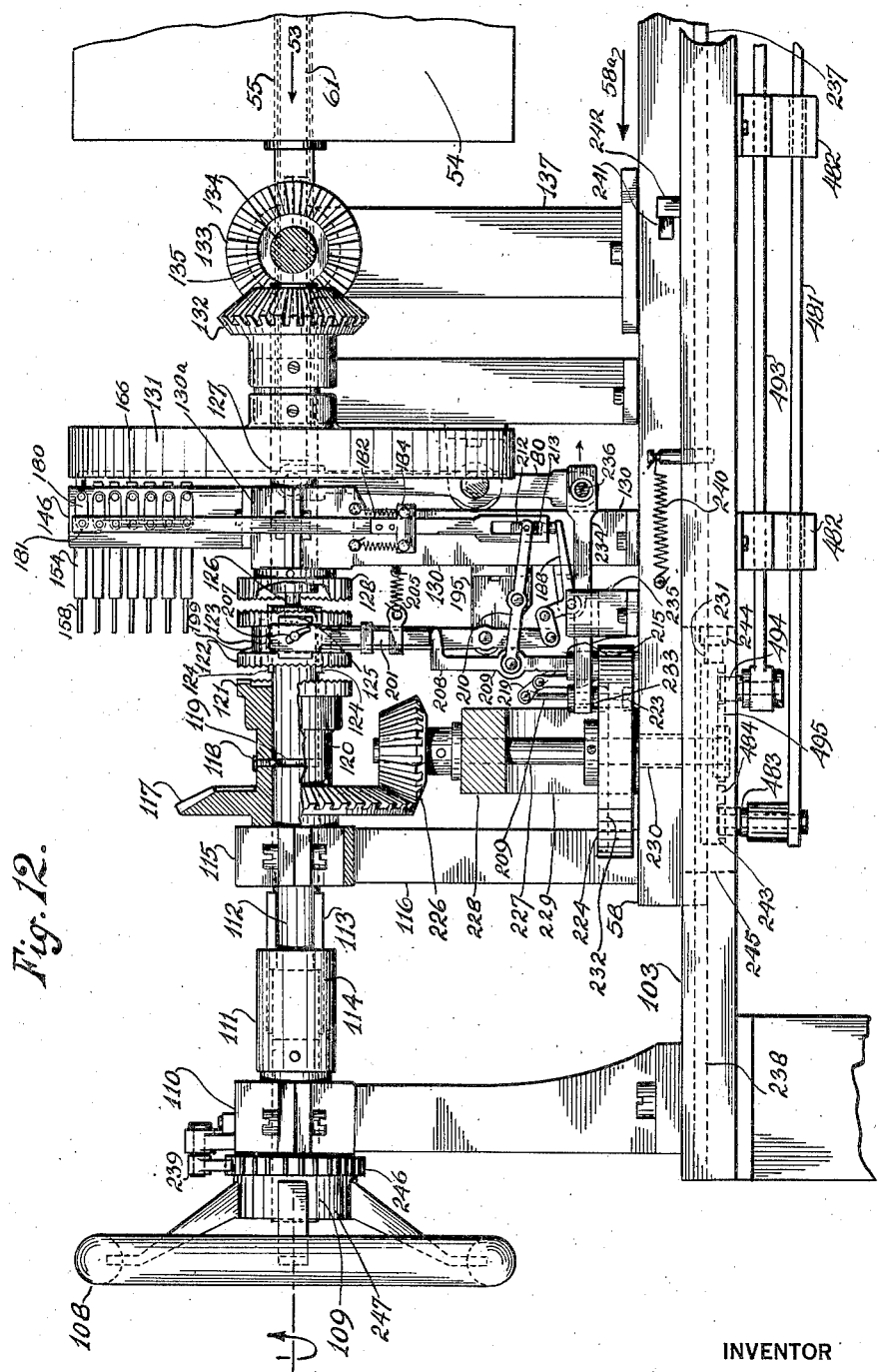

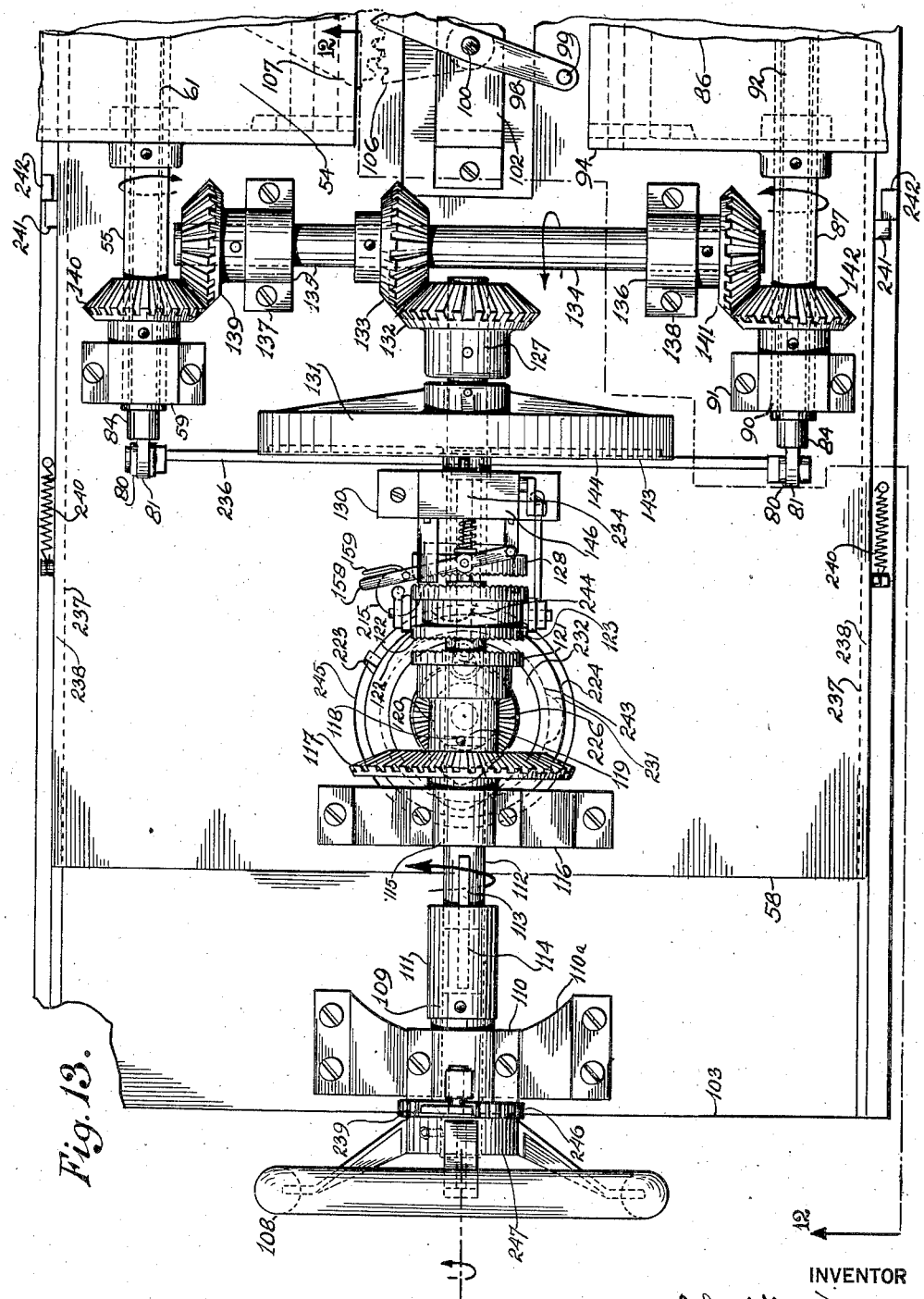

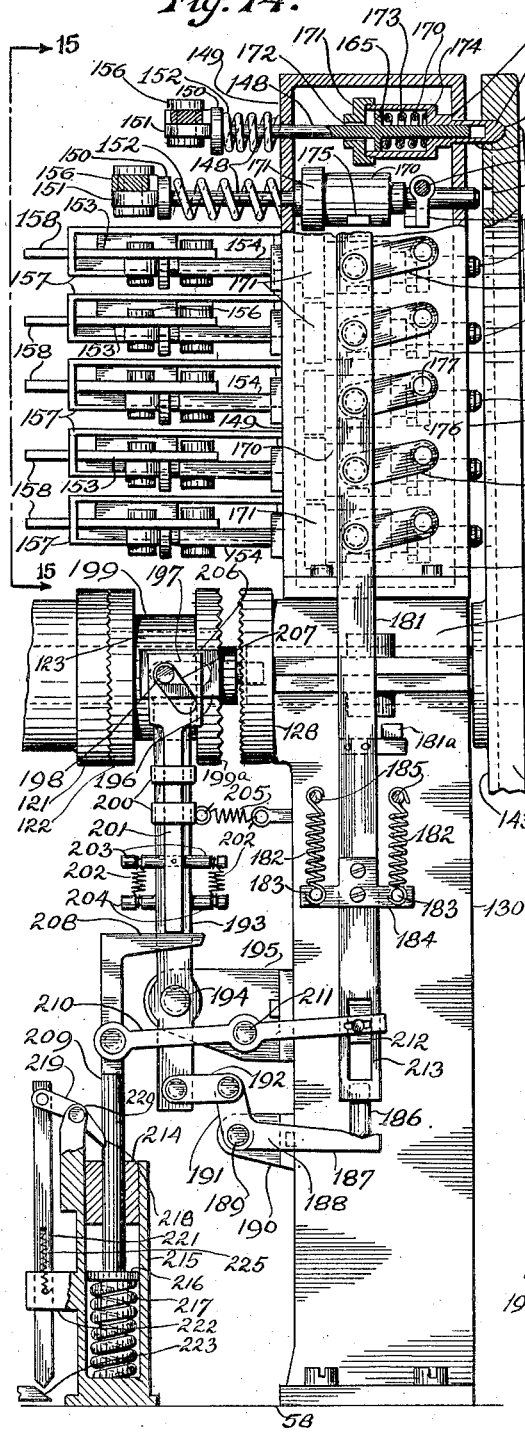
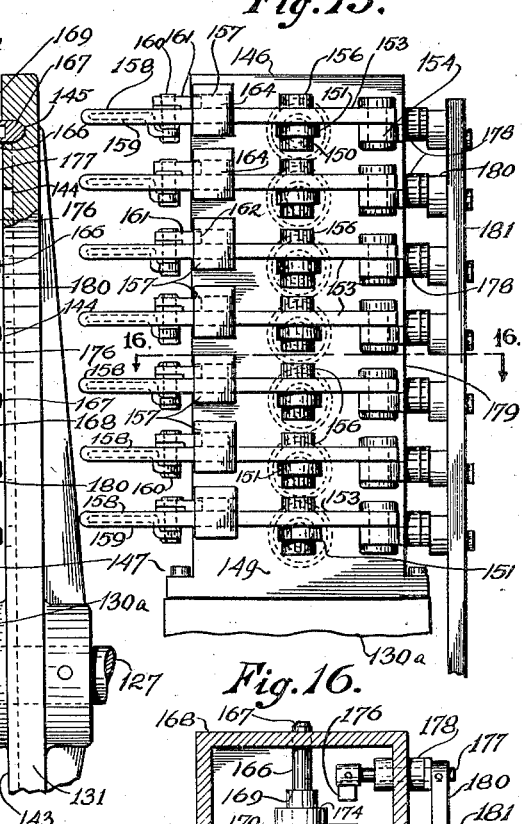
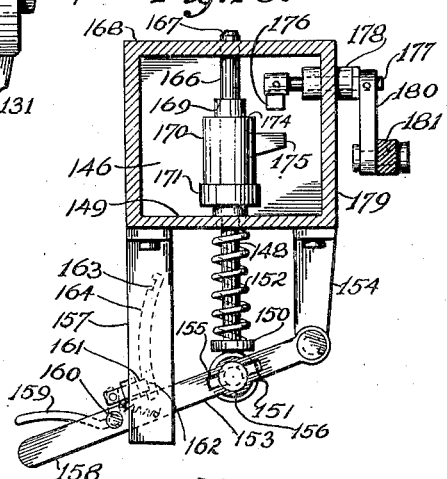
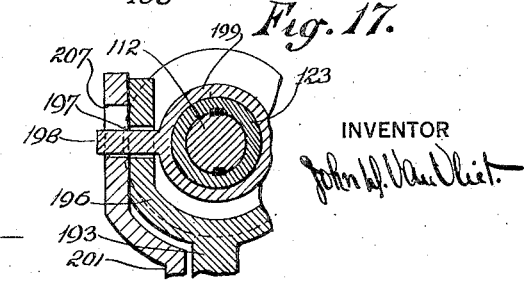

April 8, 1930.  J. D. VAN VLIET  1,754,192
MULTIPOWERPLANT TRANSMISSION FOR AIRCRAFT AND THE LIKE
Filed Sept. 28, 1925  15 Sheets-Sheet 8

INVENTOR
John H. Van Vliet

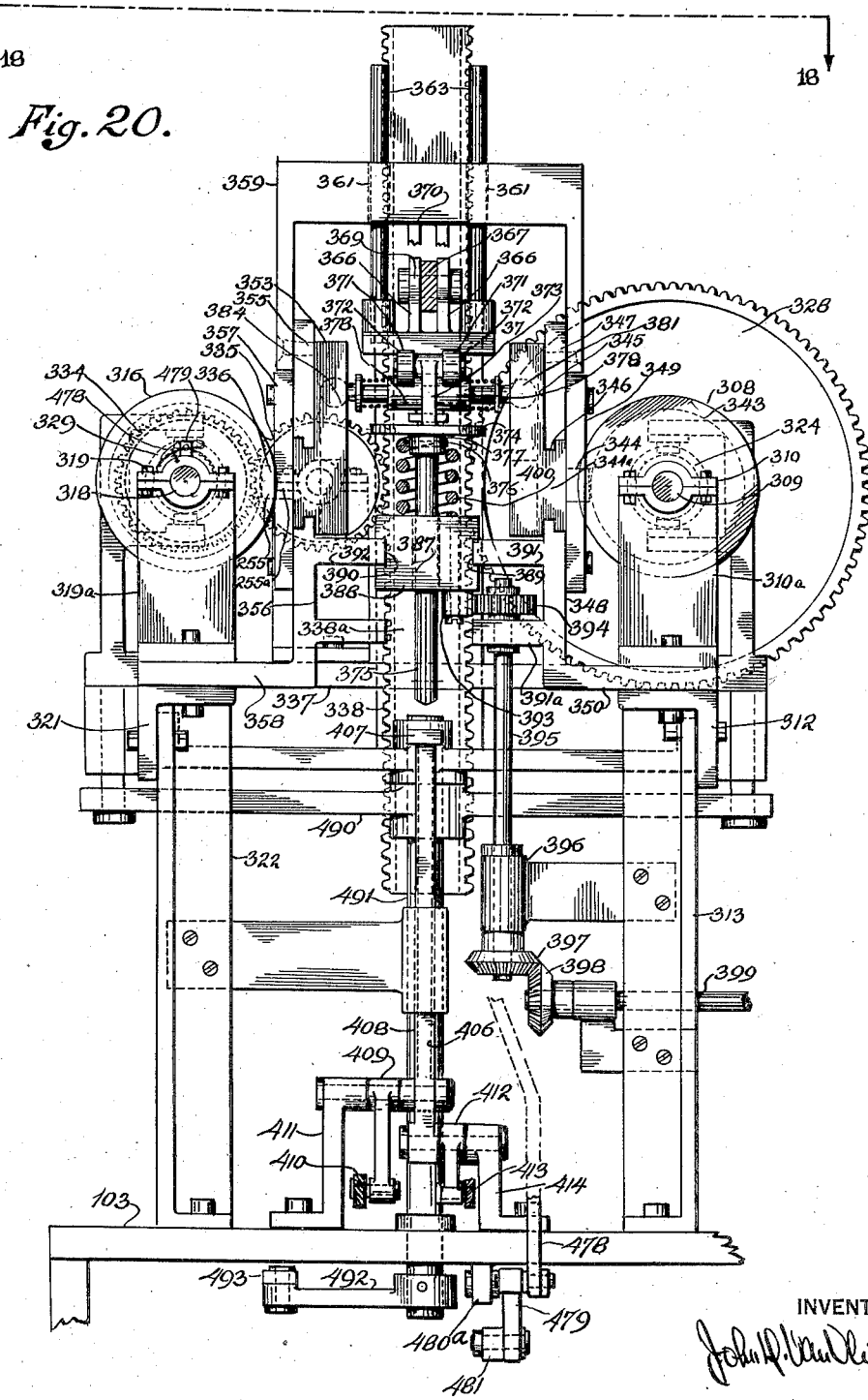

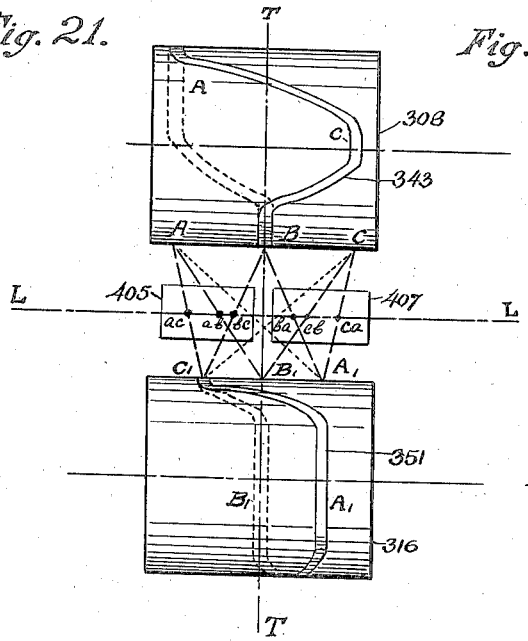
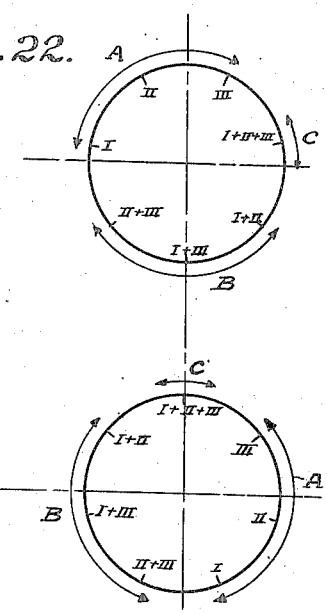
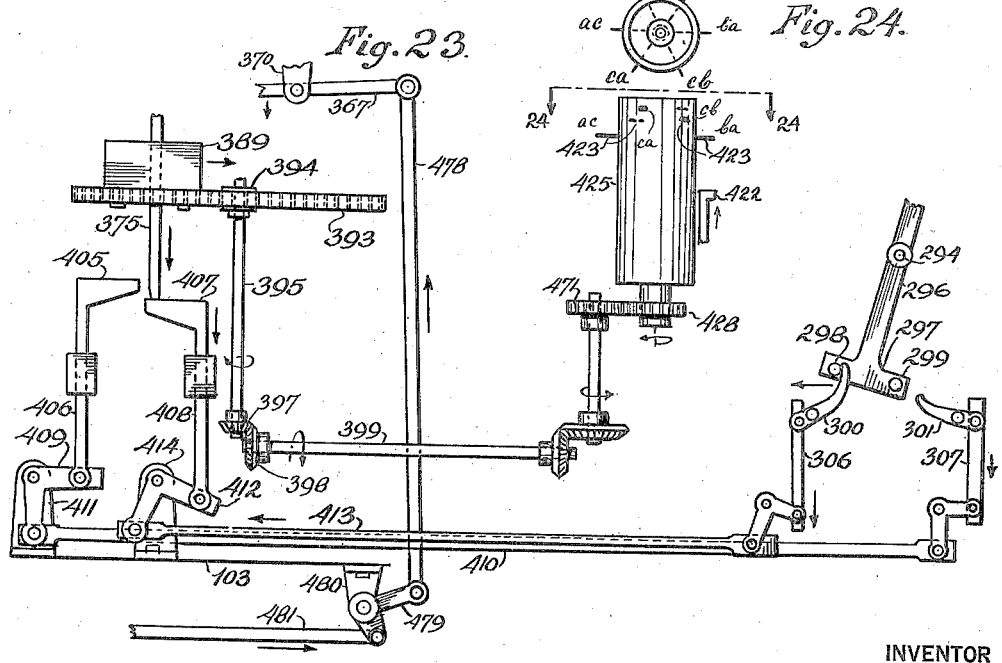

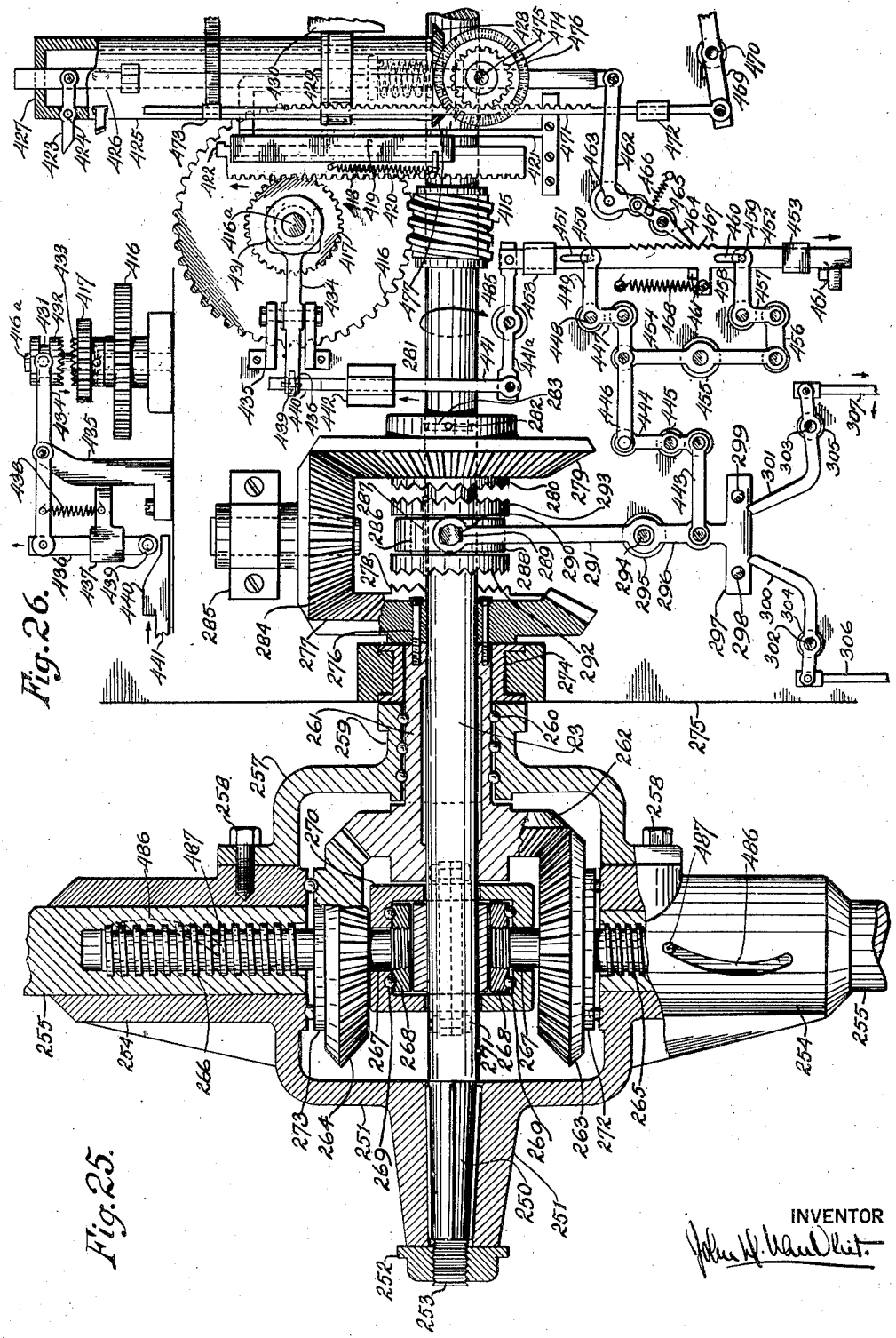

April 8, 1930.  J. D. VAN VLIET  1,754,192
MULTIPOWERPLANT TRANSMISSION FOR AIRCRAFT AND THE LIKE
Filed Sept. 28, 1925  15 Sheets-Sheet 12
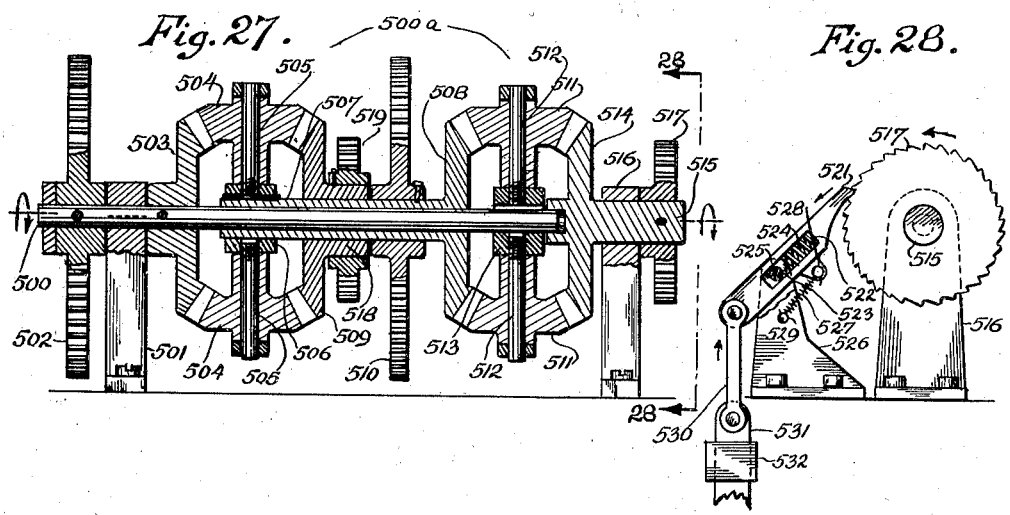
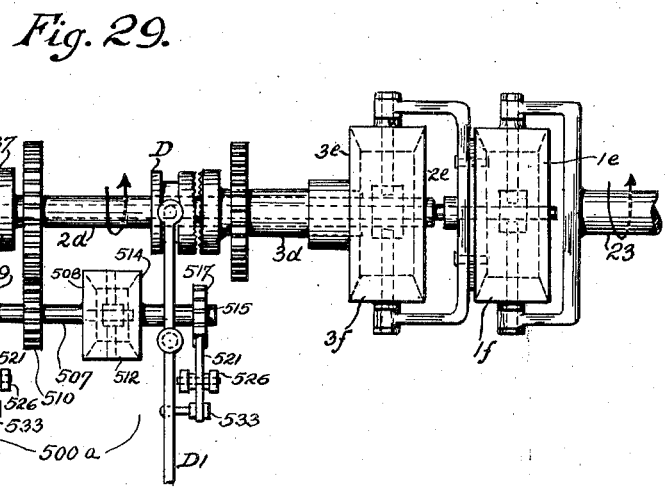
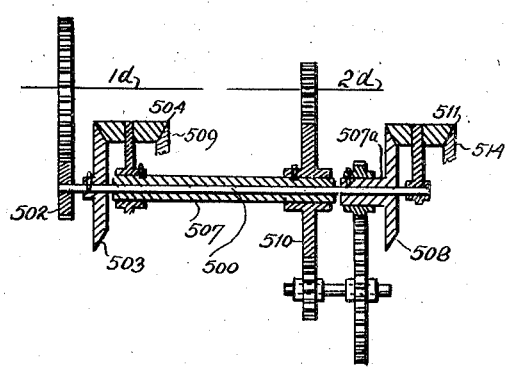
INVENTOR

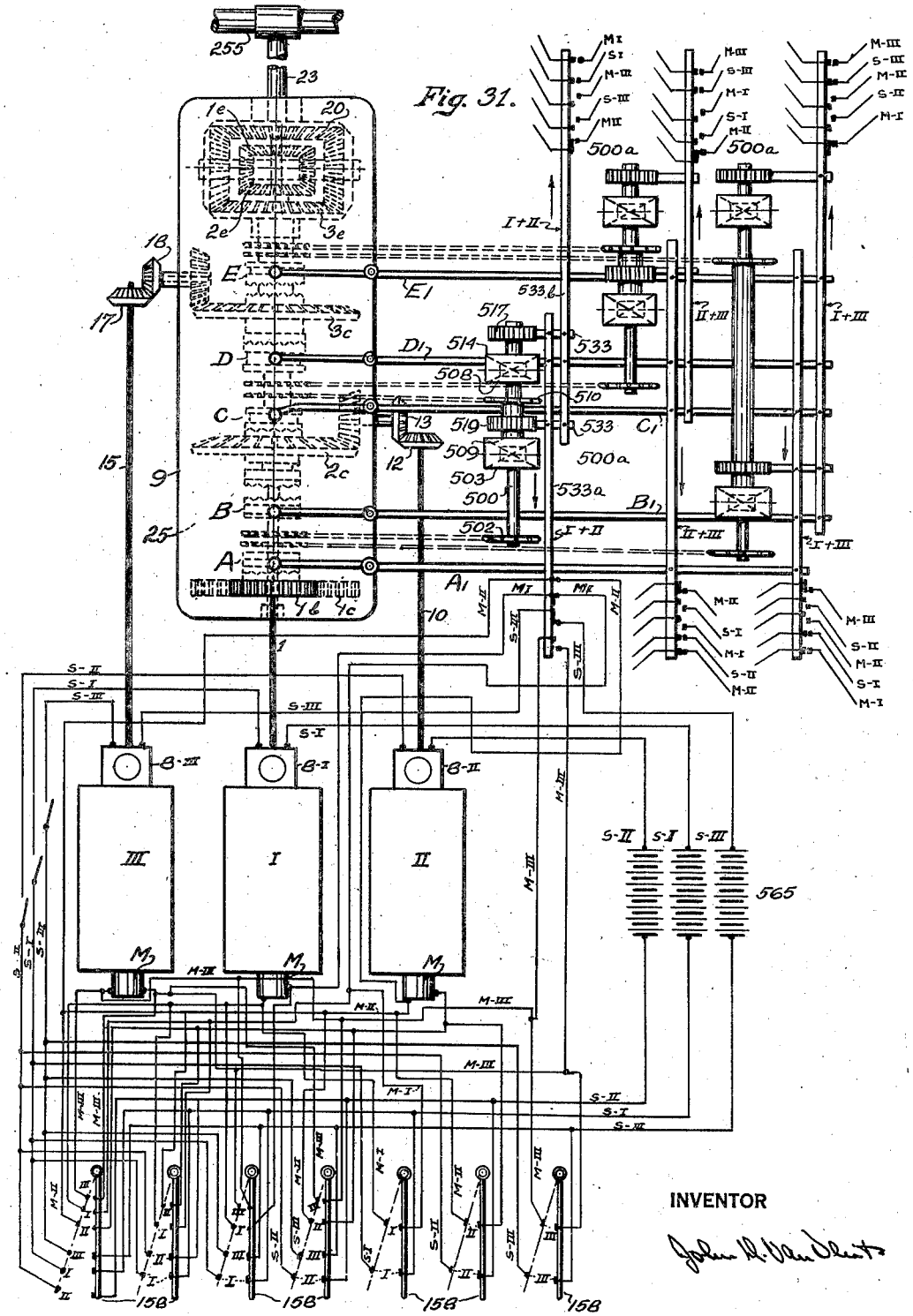

Patented Apr. 8, 1930

1,754,192

UNITED STATES PATENT OFFICE

JOHN DUMANS VAN VLIET, OF SAN FRANCISCO, CALIFORNIA

MULTIPOWER-PLANT TRANSMISSION FOR AIRCRAFT AND THE LIKE

Application filed September 28, 1925. Serial No. 59,185.

My invention relates to the mechanical transmission of power from a plurality of powerplants to a common shaft. The invention is especially, but by no means exclusively, applicable to flying machines equipped with a plurality of engines actuating a single propeller shaft.

One of the objects of the invention is to provide differential means whereby the slowing down or cutting out of one or more of the powerplants will not interfere with the normal functioning of the remaining ones.

Another object is to provide means whereby one or more engines can, at the will of the operator, be instantly connected with or disconnected from the common shaft.

A further object is to provide means whereby the transmission of power from any combination of engines can be instantly changed to that from a different combination, without this causing any appreciable irregularities in the rotative speed of the common shaft.

A still further object is to provide means whereby the implement of propulsion or locomotion adapts itself automatically to the power transmitted.

A still further object is to provide means whereby a reversal of the propulsion means can be effected by the same mechanism and manipulation employed for the other operations.

A still further object of the invention is to provide means for automatically throwing out of combination any defectively functioning powerplant and automatically throwing in a reserve powerplant. The above and other objects of the invention will be pointed out and fully described in the annexed specification.

A practical embodiment of the invention, comprising certain arrangements and combinations, has been depicted in the accompanying drawings, but I wish it to be explicitly understood that I do not limit myself to these particular designs and arrangements, since these may be greatly modified by amplification and adaptation to different kinds of vehicles, all of such adaptations and modifications however, falling within the scope of the invention as covered by the appended claims.

Reference is to be had to the following drawings in which:

Fig. 5 is an explanatory diagram of the clutch control mechanism.

Fig. 6, Fig. 7, Fig. 8 and Fig. 9 are details of the clutch control mechanism.

Fig. 10 is an explanatory diagram pertaining to the clutch control mechanism.

Fig. 11 is a schematic view of the clutch control arresting device.

Fig. 12 is an elevation of the clutch control actuating mechanism.

Fig. 13 is a plan view of Fig. 12.

Fig. 14, Fig. 15, Fig. 16 and Fig. 17 are details of the clutch control actuating mechanism.

Fig. 20 is a front elevation of Fig. 18 and also shows additional details of the propeller adjusting mechanism.

Fig. 21, Fig. 22, Fig. 23 and Fig. 24 are explanatory diagrams pertaining to the propeller adjusting mechanism.

Fig. 25 is a diagrammatic lay-out of other parts of the propeller adjusting mechanism.

Fig. 26 is a detail in Fig. 25.

Fig. 27 and Fig. 28 show the automatic reversing differentials and the mechanism for shifting the clutch levers.

Fig. 29 shows an application of the automatic clutch shifting means, and a modification of the compound differential gearing.

Fig. 30 is an explanatory diagram showing the transmission ratio for the automatic clutch controls.

Fig. 31 shows a wiring diagram in connection with the compound differential transmission, the automatic clutch controls, the starting means of the power units, and the manual control.

Figure 1:
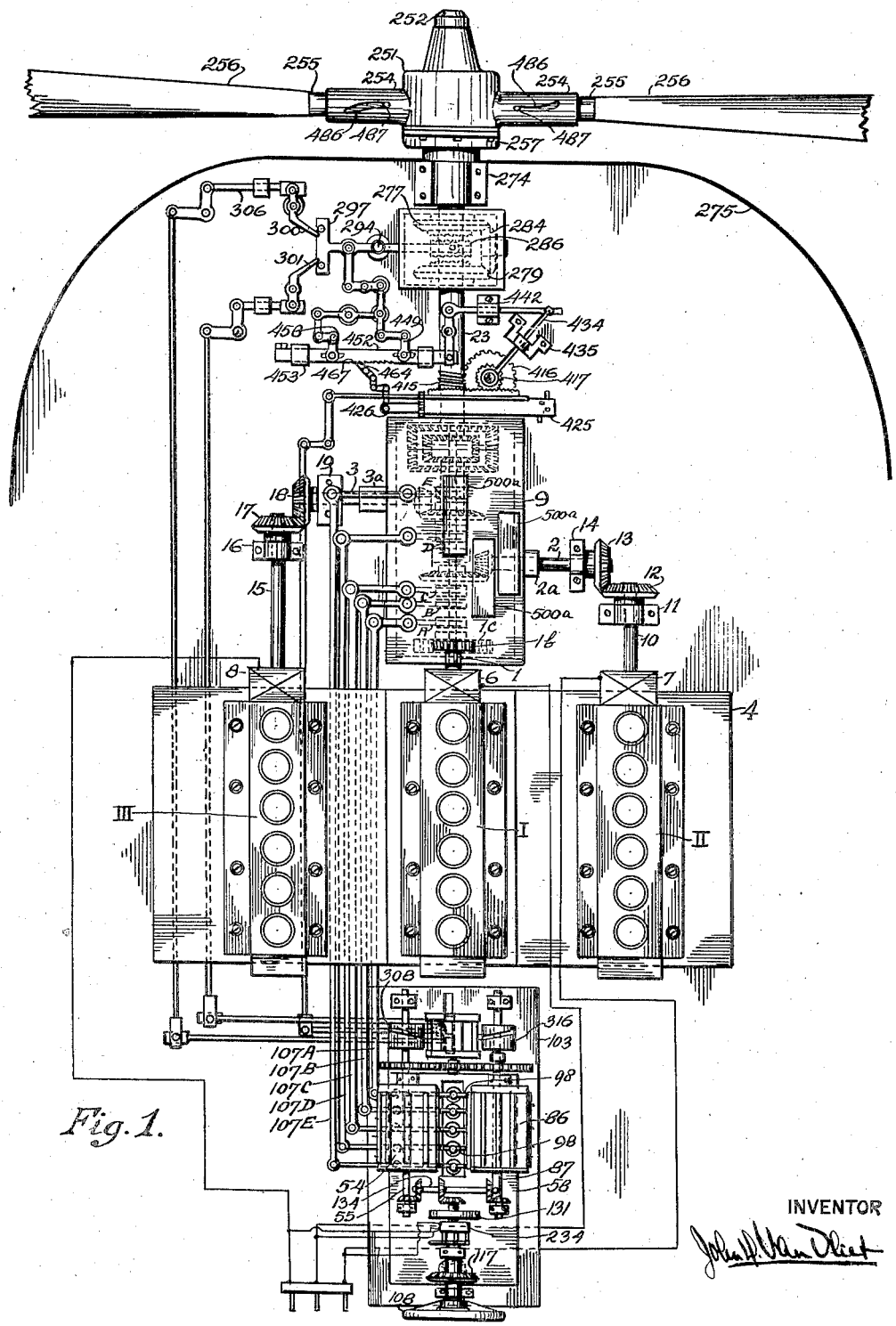
Fig. 1 shows a schematic lay-out of a multiple power-unit installed in an airplane and actuating an adjustable propeller.

In some classes of automotive vehicles a plurality of powerplants can be employed to great advantage inasmuch as the power required for propulsion or locomotion may vary considerably under different conditions. In some instances a single powerplant may be sufficient to propel the vehicle, whereas under different conditions it may be expedient or even imperative to utilize the combined power of all powerplants available.

As an example of this alternative I would cite the case of the twin- or multiple-screw steamship in which each screw is actuated by an individual engine. Maximum velocity is obtained by having engines turning at full speed, whereas steering and manœuvering is effected by stopping, slowing down or reversing one or more of the screws at one side or the other of the median line of the vessel. In a ship the slowing down or even the failure of one of the powerplants has no more serious effect than that of retarding her progress. the eccentric thrust of the screws being easily counter-acted by the rudder.

In other types of vehicles however, and more particularly in airplanes which depend on their powerplants for sustentation as well as forward speed, the defective functioning of any of the powerplants is a much more serious matter which may, and often does, entail disastrous consequences.

Several types of airplanes are at present being operated in which the motive power is furnished by a plurality of powerplants, each actuating its individual propeller independently from the others; the powerplants with their propellers being usually arranged symmetrically with reference to the length axis of the machine, so that the resultant tractive effort coincides with this axis so long as the individual tractive efforts of all the propulsion means remain equal. Should these tractive efforts vary individually, the machine would evince a tendency to veer toward the side of the least tractive effort and would deviate from its intended course; this deviation would have to be counter-acted by the rudder. Thus, maintaining a straight course in the event of an imperfect functioning of any of the laterally installed powerplants with an attendant decrease of the power output, has to be accomplished by evoking the additional resistance set up by the rudder action. Although this additional resistance may be comparatively slight, yet the method is hardly compatible with efficiency and in some instances has been known to produce undesirable results.

Although at the present-day aero-motors have been developed to a high degree of perfection, yet they are not infallible and still require the skill and knowledge of an expert to keep them in running order, and trouble may arise from a variety of sources.

A plurality of powerplants will give complete satisfaction when the resultant tractive effort coincides at all times with the median line of the machine; a satisfactory solution of the problem may be found in the combination of a plurality of powerplants, each capable of functioning independently from the others and jointly as well as individually adapted to actuate an adjustable propeller, the axis of rotation of which coincides with the fore-and-aft axis of the machine.

This arrangement can be extended by providing the airplane with groups of engines, each group actuating its own propeller, the engine groups then taking the place of the individual engines now used in the multi-motor planes.

The use of a plurality of engines is of particular value in long-distance flight, when the initial weight of the fuel may be such as to require the combined power of all engines. The fuel consumption during the first stage of the trip being necessarily considerable, the weight will diminish rapidly until the use of one of the engines can be dispensed with. The journey can then be continued with only part of the available powerplants in actual operation.

It may also be found advantageous to use each engine only part of the time required for the trip, and keep one engine in reserve for emergencies. A different combination of engines would then be in operation in alternate succession, thus reducing the wear per engine and affording the opportunity to inspect such engine or engines which are temporarily out of combination.

Emergencies may arise which demand the instant use of all engines combined and the emergency may be of such a nature as to make it imperative that this combination be put in operation without loss of time.

Since all engines actuate but a single propeller, it is evident that in shunting from one amount of power to another the forward speed of the machine will be materially affected and that a propeller of characteristics designed for a given speed and horsepower will not be able to do itself justice under the greatly varying conditions imposed upon it. It will therefore be necessary to adjust the propeller as to diameter and pitch in accordance with the horsepower it is intended to absorb for a given combination of powerplants and with the resultant speed of the airplane, and it is desirable that this adjustment should take place automatically and practically simultaneously with the change in horsepower.

Another highly desirable feature to be considered is that the shunting from one combination of powerplants to another be contrived with least conscious effort on the part of the operator, for in an emergency the matter of a few seconds delay may spell disaster. The pull at a lever and the turning of a wheel should accomplish the desired result and thereafter the mechanism should require no further attention on the part of the operator, who should then be able to direct his efforts to the inspection of the engine or engines which have just been shunted out of action. Furthermore, the transmission of power from the various engines to the common shaft must be contrived in such a way that a variation in the speed of any of the individual engines does in no way interfere with the normal functioning of any of the others. Once the powerplant with transmission and propulsion means has been adjusted for a desired combination, it should be impossible for anyone to change the combination by inadvertently touching a lever or grasping a control wheel, which might occur for instance during a sharp bank in the case of an airplane or in a heavy sea in the case of a vessel. The control mechanism therefore should be proof against accidental disarrangement and at all times ready for service at the selection of the operator.

In the case of an airplane, the checking of the landing speed is a desirable feature and the transmission mechanism should therefore preferably include means whereby the action of the propulsion means can be reversed. Since it is moreover commendable to avoid an unnecessary multiplicity of parts and to reduce the number and nature of the manipulations to be remembered by the operator to a minimum, the reversal of the propulsion means should be effected in a manner similar to that of the other operations, and by means of the same mechanism.

The above outlined problems and requirements have been duly considered and the ways and means in and by which they have been solved constitute my invention.

The drawings present an illustration of the invention as applied to a combination of three powerplants. From the description it will be evident that the invention can be adapted to any number of powerplants and that I do not limit myself to three. The powerplants may be internal combustion engines, steam engines, electric motors, turbines, wind turbines, jet-propulsion plants or any other power-producing or power-transforming machine or driving agency.

Figure 2:
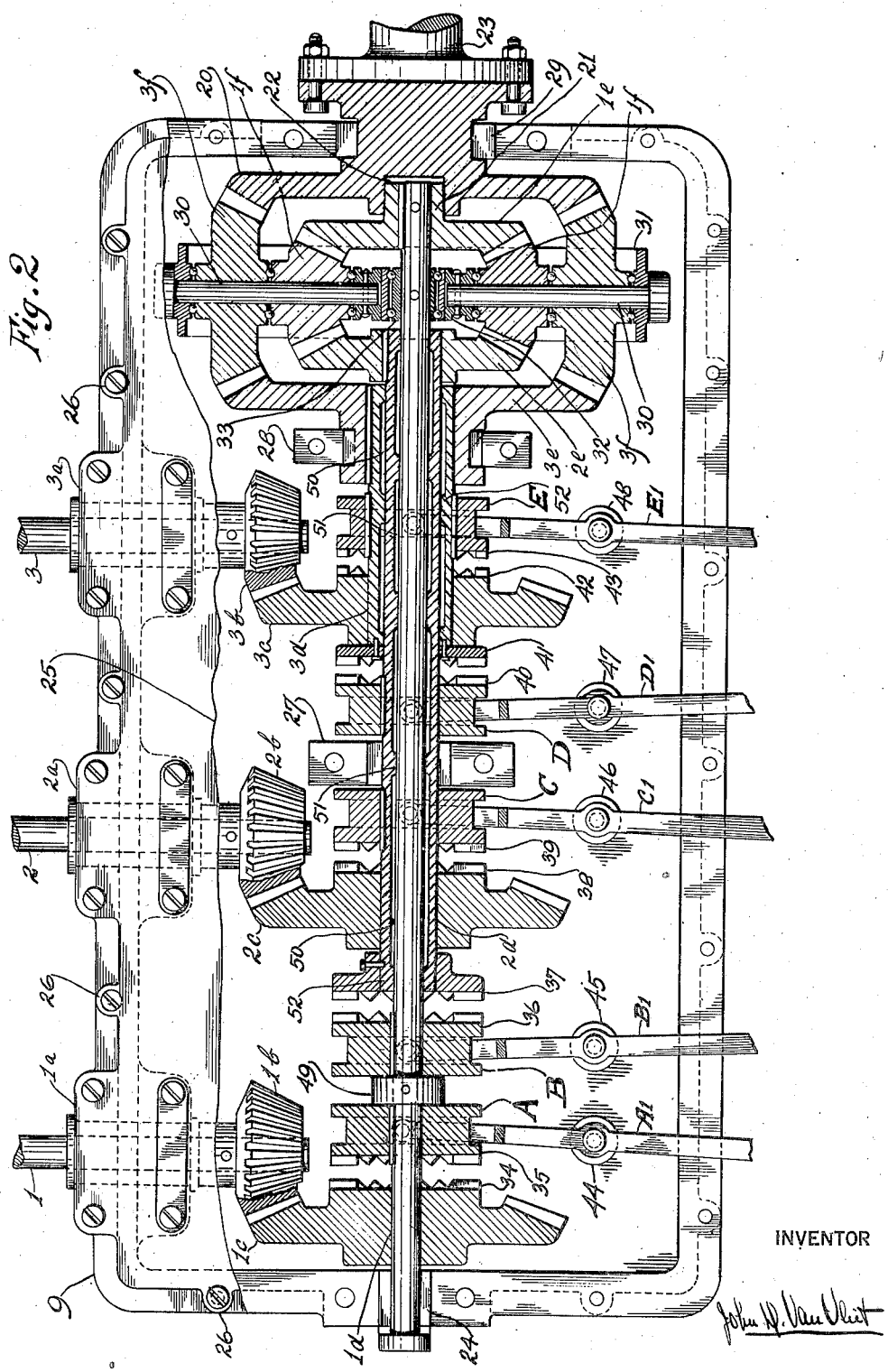
Fig. 2 shows a compound differential transmission, the top of the gear case being broken away, and the gearing and shafting shown partly in section.

Fig. 1 represents a diagrammatic layout of a three-engine installation in an airplane. All detail not bearing directly on the invention has been omitted. The powerplants I, II and III, to which hereinafter I shall refer simply as engines, provided with the self-starters 6, 7 and 8 respectively, are anchored to frame 4 which is secured to the structural members of fuselage 275. Engine I has the crankshaft extension 1 carrying the spurgear $1^b$ meshing with the spurgear $1^c$ on the shaft $1^d$ mounted in the differential gear box 9. Fig. 2 represents a detailed view of the transmission housing 9 in which a modification of the transmission from engine I is shown by shaft 1, which is supported in bearing $1^a$, and carries bevel pinion $1^b$ meshing with bevelgear rotatably mounted on shaft $1^d$. Supported in the bearing 11, engine II has the crankshaft extension 10, which carries the bevelgear 12 meshing with bevelgear 13 on shaft 2. The shaft 2 is rotatable in bearing 14 and in bearing $2^a$ of the differential gear housing 9.

Fig. 2 shows a modification of this arrangement, the shaft 2 and the bearing $2^a$ being here shown at the opposite side of the gear housing. Shaft 2 has the bevel pinion $2^b$ meshing with the bevelgear $2^c$ mounted free on the sleeveshaft $2^d$. The sleeveshaft $2^d$ is rotatably mounted on the shaft $1^d$.

Engine III has the crankshaft extension 15 which is supported in bearing 16 and carries the bevelgear 17 meshing with bevelgear 18 secured on shaft 3. Shaft 3 is rotatable in bearing 19 and in bearing $3^a$ of the gear housing 9. Shaft 3 carries the bevelgear $3^b$ in mesh with bevelgear $3^c$ which is rotatably mounted on the sleeveshaft $3^d$. The sleeveshaft $3^d$ is rotatably mounted on shaft $2^d$. On shaft $1^d$ is secured the sungear $1^e$ which by the planetgears $1^f$ associates with the sungear $2^e$ secured on shaft $2^d$.

On shaft $3^d$ is secured the sungear $3^e$ which by means of the planetgears $3^f$ associates with the power transmitting sungear 20. The hub 21 of sungear $1^e$ has bearing in the hub 22 of the sungear 20 which actuates the power delivery shaft 23. In the drawing the power delivery shaft is shown directly connected to the sungear 20. It is understood however, that any suitable transmission means may be interposed between these two elements and that I do not limit myself to the particular construction shown in Fig. 2.

Shaft $1^d$ is supported in the bearing 24 of the gear housing which has the cover 25 secured to it by such means as the bolts 26. The sleeveshaft $2^d$ is supported in the bearing 27, sungear $3^e$ is supported in bearing 28 and the power transmitting sungear 20 is supported in bearing 29 of the gear housing. The planet gears $2^f$ and $3^f$ are journaled on the radial spider shafts 30 secured in the spider frame 31 and in the annular bearing 32 journaled on the ball bearing race 33 mounted on shaft $1^d$.

Gear case 9 contains a suitable lubricating and heat-absorbing fluid 540 which by the pump 541 is forced through the ducts 542 and 543 to the header 544 of the oil-cooler 545. From the header 544 the fluid passes through the thin copper tubes 546 to the header 547 and returns by way of the duct 548 to the gear case 9. Water from the radiator 549 circulates between the copper tubes 546 and thus reduces the temperature of the lubricating fluid. The oil pump 541 can be driven by the power delivery shaft 23 by means of gearing, or a chain transmission can be employed such as sprocket 550 on the power shaft driving sprocket 551 on the pumpshaft 555 by means of the chain 552. An alternative means for driving the oil-pump is represented by the propeller 553 mounted on shaft 554 which by clutch 556 can be put in driving relation to pumpshaft 555.

The continuous forced circulation of the lubricating fluid through the oil-cooler prevents overheating of all bearings and journals of the differential transmission. It is also understood that provision has been made to prevent or minimize leakage of the lubricating matter through the bearings to the outside and that any of the matter which may escape is collected and by mechanical means such as pumps and the like, is returned to the interior of the gearbox. A temperature-indicator, draining cocks and like accessories are also understood to be incorporated in the installation. Anti-friction devices, such as ball-bearings and the like are employed wherever advisable, a few of which are shown in Fig. 2 which represents a cross-section through the differential transmission. Shafts $2^d$ and $3^d$ have the reduced section 50 to lessen the friction and the supporting sections 51 and 52 should run on ball-bearings or similar devices. The bearings 27, 28 and 29 may be integral with box 9 or else may be fastened to the bottom thereof by means of bolts and the like.

Shaft $1^d$ has slidingly keyed on it the clutch A, the face 35 of which engages with clutch-face 34 of bevelgear $1^c$. Clutch A is operated by the lever $A^1$ turnable on the pivot-bearing 44. On shaft $1^d$ is also slidingly keyed clutch B, the clutchface 36 of which engages with clutchface 37 of shaft $2^d$. Clutch B is operated by lever $B^1$ turnable on the pivotbearing 45. Collar 49, fixedly mounted on the shaft $1^d$, separates clutches A and B and limits their position when not engaged. Shaft $2^d$ has slidingly keyed on it clutch C, the clutchface 39 of which engages with clutch face 38 of bevelgear $2^c$. Clutch C is operated by lever $C^1$ turnable on pivotbearing 46. Shaft $2^d$ has also slidingly keyed on it clutch D the face 40 of which engages with the clutch face 41 of shaft $3^d$. Clutch D is operated by lever $D^1$ turnable on pivotbearing 47.

Shaft $3^d$ has slidingly keyed to it clutch E the face 43 of which engages with clutch-face 42 of bevelgear $3^c$. Clutch E is operated by lever $E^1$ turnable on pivotbearing 48.

For a system of three engines, designated by I, II, and III respectively, the following combinations are possible:

I and II running in unison, III at rest.
I and III running in unison, II at rest.
II and III running in unison, I at rest.
I, II and III running in unison.
I running, II and III at rest.
II running, I and III at rest.
III running, I and II at rest.

The position of the clutches for these combinations is as follows: For I and II running in unison, III at rest, clutch A is shifted to the left, engaging bevelgear $1^c$ and thus actuating shaft $1^d$ and sungear $1^e$. Clutch B is shifted to the left, shafts $1^d$ and $2^d$ being thus enabled to operate independently. Clutch C is shifted to the left, engaging bevelgear $2^c$ and actuating shaft $2^d$ and sungear $2^e$. Clutch D is thrown to the right thus locking shaft $2^d$ with shaft $3^d$. Clutch E is shifted to the right, disengaging bevelgear $3^c$ from shaft $3^d$. Sungears $2^e$ and $3^e$ rotate in unison at the same R. P. M. as shaft $2^d$ and since planet gears $3^f$ and $1^f$ are journaled on the same spidershafts 30, they will turn in unison about the axis of the sungears, and through the planet gears $3^f$ locking with sungear 20 will cause the power delivery shaft 23 to turn at the same speed as shaft $1^d$.

For I and III running in unison, II being at rest, clutch A is shifted to the left, engaging with bevelgear $1^c$ and thus actuating shaft $1^d$ and sungear $1^e$. Clutch B is shifted to the right, locking shaft $1^d$ with shaft $2^d$. Clutch C is shifted to the right, disengaging bevelgear $2^c$ from shaft $2^d$. Clutch D is shifted to the left allowing relative rotation between shafts $2^d$ and $3^d$. Clutch E is shifted to the left in engagement with bevelgear $3^c$, thus actuating shaft $3^d$ and sungear $3^e$. Sungears $1^e$ and $2^e$ are thus locked together and rotate in unison, and the resultant R. P. M. of shaft 23 will then be twice that of sungear $1^e$ minus that of $3^e$.

For II and III running in unison with I at rest, clutch A is shifted to the right, thus disengaging bevelgear $1^c$ from shaft $1^d$. Clutch B is shifted to the right locking shaft $1^d$ with shaft $2^d$. Clutch C is shifted to the left and engages bevelgear $2^c$, thus actuating shaft $2^d$ and sungear $2^e$. Clutch D is shifted to the left, allowing relative rotation between shafts $2^d$ and $3^d$. Clutch E is shifted to the left and engages bevelgear $3^c$ with shaft $3^d$, thus actuating sungear $3^e$. The relative speeds of shaft 23 then is the same as in the previous case.

For I, II and III running in unison, clutch A is shifted to the left, as are also clutches C and E. Clutches B and D are also shifted to the left, allowing relative rotation between the three shafts $1^d$, $2^d$ and $3^d$. The radial spider shafts then turn around the axis of the transmission shafts at a rate equal to half the sum of the R. P. M. of the sungears $1^e$ and $2^e$. The resultant R. P. M. of shaft 23 is then equal to the R. P. M. of the sungears $1^e$ and $2^e$ minus the R. P. M. of sungears $3^e$.

For engine I running, engines II and III being both at rest, clutch A is shifted to the left, and clutch B is shifted to the right, locking shafts $1^d$ and $2^d$. Clutch C is shifted to the right. Clutch D is shifted to the right thus locking shafts $2^d$ and $3^d$, and clutch E is also shifted to the right. The three shafts are thus locked together and the power from shaft 1 is transmitted to sungear 20 by the locked differentials.

For engine II running, engines I and III being both at rest, clutch A is shifted to the right, shaft $1^d$ is locked with shaft $2^d$ by shifting clutch B to the right, clutch C is shifted to the left, thus engaging bevelgear $2^c$ with shaft $2^d$ and actuating sungear $2^e$; clutch D is shifted to the right locking shafts $2^d$ and $3^d$, and clutch E is sifted to the right. The power from shaft 2 is then transmitted to the propeller shaft by the locked differential as in the preceding case.

For engine III running, engines I and II being both at rest, clutch A is shifted to the right, clutch B is shifted to the right, thus locking shafts $1^d$ and $2^d$; clutch C is shifted to the right; clutch D is shifted to the right locking shafts $2^d$ and $3^d$, and clutch E is shifted to the left engaging bevelgear $3^c$ with shaft $3^d$, thus actuating sungear $3^e$. The power of shaft 3 is then transmitted to the propeller shaft by the locked differentials as in both preceding cases.

From the above it is apparent that a great many combinations in the position of the clutches are likely to be called for. These positions are tabulated as follows:

| Clutch | I and II | I and III | II and III | I and II and III |
|---|---|---|---|---|
| A | Left | Left | Right | Left |
| B | Left | R | R | L |
| C | Left | R | L | L |
| D | Right | L | L | L |
| E | Right | L | L | L |

In order to facilitate the shunting from one combination of engines to another and make this operation largely automatic, a special control has been devised which obviates the chances of error on the part of the operator, and by means of which the required change of combination can be effected in a minimum of time.

The cylindrical frame collectively designated by 54 (Fig. 3) is fixedly mounted on the hollow shaft 55 rotatable in the bearing 56 of the support 57 is mounted on the movable base-plate 58, and is also supported in bearing 59 of support 60 which is likewise mounted on the movable base-plate 58.

The rod 61 is slidably received by the hollow shaft 55, relative rotation between said rod and shaft being prevented by pin 62 fixed in rod 61 and protruding through slot 63 of shaft 55.

The plates 64 are fitted in the slots 65 of rod 61 and have the lugs 66 which are fastened by bolts or the like to the arms 67 of rings 68, which are slidably mounted on shaft 55. Rings 68 have the lugs 69 to which are pivotally connected the arms of the bell-cranks 70 pivoted on pin 71 at the end of brackets 72 of the spider ring 73 fixedly mounted on shaft 55. The arms 74 of the bell-cranks 70 are pivotally connected with the lugs 75 of racks 76 which are slidably guided in the slots 77 of the end plates 78. The end plates 78 have fixed mounting on the hollow shaft 55 and are connected by the spacer bars 79, thus forming a cylindrical frame rotatable with shaft 55. For the sake of brevity the cylindrical frames are hereinafter referred to as drums.

The rod 61 can be moved in the direction of the arrow by means of the forked lever 80 pivotally connected to the lug 81 of the cylindrical stub 82 which is revolvably held in the recess 83 of the cap 84 screwed or otherwise suitably fastened on rod 61.

The racks 76, provided with the fingers 85, are normally retracted so that the said fingers do not protrude beyond the circumference of the drum. By moving the rod 61 in the direction of arrow, the bell-cranks 70 cause the racks to move outward, thus making the fingers protrude outwardly beyond the circumference of the drum.

The cylindrical frame or drum collectively designated by the numeral 86 is in all respects similar to the one designated by 54 and has the end plates 94, connected by spacer bars, fixedly mounted on the hollow shaft 87 which slidably receives the rod 92 actuated by the lever 93. The drum 86 has the movable racks

| I | II | III |
|---|---|---|
| Left | R | R |
| R | R | R |
| R | L | R |
| R | R | R |
| R | R | R |

95 provided with the fingers 96, and the means for moving the racks inward and outward are the same as those employed in drum 54. Both drums are symmetrically arranged with respect to the pivoted levers 98 which have the pins 97 in line of engagement with the racks. The levers 98 are mounted on the shafts 100 which are rotatable in the bearings 101 of the frame 102 and also in the bearings 105 of the fixed base 103 on which the frame 102 is supported by means of the supports $102^a$.

The collars 104 hold the shafts 100 in vertical adjustment.

The shafts 100 have leverage connection with the clutch levers $A^1$, $B^1$, $C^1$, $D^1$ and $E^1$ by such means as the gear segments 106 meshing with the gear segments 107 mounted on the clutch levers; it is understood that any other adequate means may be employed.

The fingers 85 of the racks 76 engage with the pins 97 of the levers 98, whereas the fingers 96 of the racks 95 engage with the pins 99 of the levers 98.

The drums 54 and 86 are rotatable in opposite directions and their rotation is effected in such a manner that they always stop, each with a selected rack in alinement with the levers 98, each rack being provided with a set of fingers for the corresponding combination of engines. The number of the racks in each drum corresponds to the number of engine combinations possible. There being seven combinations possible with three engines, not counting the reversing position, there are accordingly seven racks shown in the drawings, which suffices for the purpose of illustration. For four engines, the number of combinations would be fourteen necessitating a corresponding number of racks in each drum. The number of levers 98 corresponds to the number of clutches employed in the differential transmission mechanism; accordingly there are five of these levers shown in Fig. 2.

Figure 3:
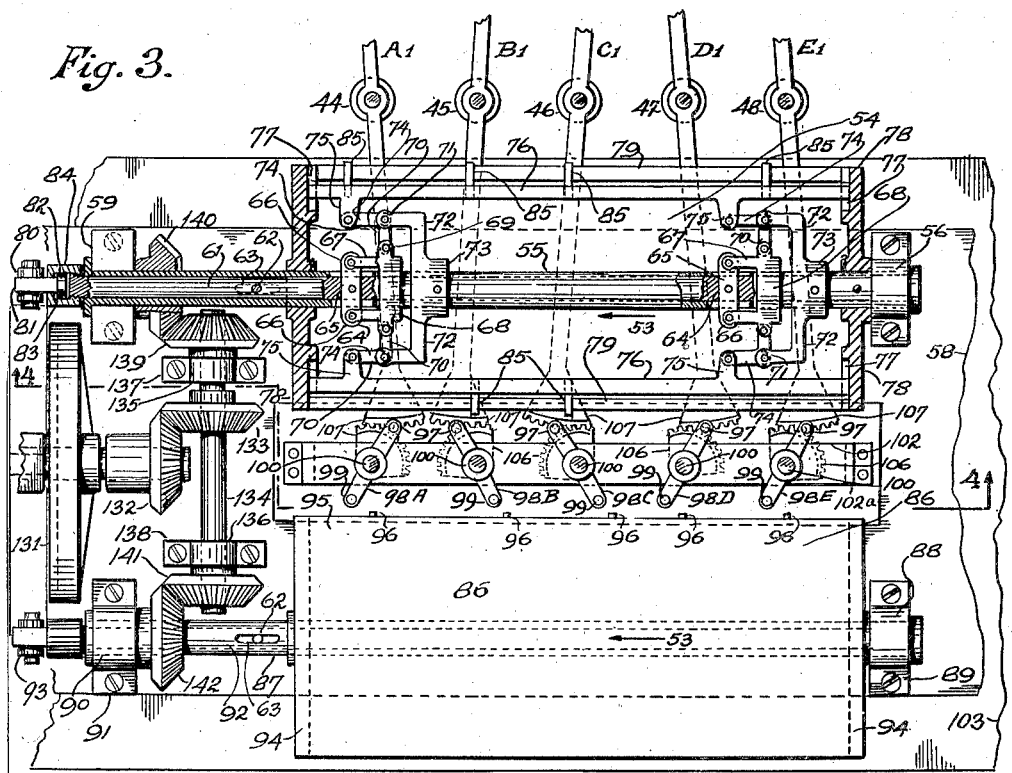
Fig. 3 shows a portion of the clutch control.
Figure 4:
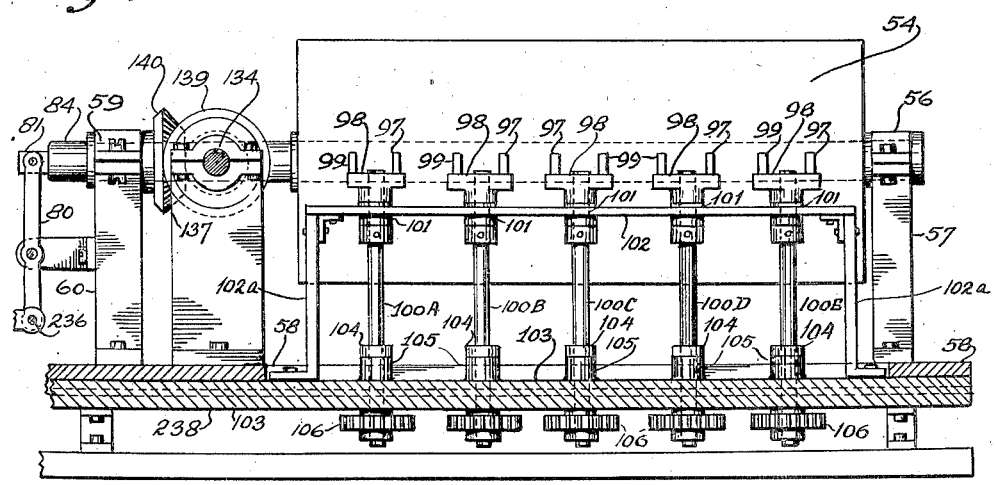
Fig. 4 is a section through Fig. 3 taken along the line 4—4.

When it is desired to shunt from one combination of engines to another, the drums are turned until the racks for the new combination are in alignment with levers 98 and the rods 61 and 92 are then pulled forward, causing the fingers of the racks to protrude. The movable base 58 on which the drums are mounted is then moved forward, causing the fingers to engage with the levers 98 and turning these levers with their corresponding gears 106 actuating the gearsegments 107 of the clutch levers. The total number of fingers of both racks is always equal to the number of clutches. The levers 98 are turned in one direction by the fingers of one rack and in the opposite direction by the fingers of the other rack, thus causing the clutches to be shifted either to the right or to the left as required by the combination to be effected. Fig. 10 gives a diagrammatic presentation of the racks with fingers for the corresponding combinations. In Fig. 3 the levers 98 are in position for combination I and III. After the clutches have been shifted the drumbase and drums are slid back to their original position and the fingers are disengaged from the levers by retracting the racks. Should a different combination be desired, for instance II, the fingers 85A for rack 76–II will then turn lever 98A. Finger 85B however will not engage, since the lever 98B is already in position. Fingers 85D and 85E will turn levers 98D and 98E and finger 96C will turn lever 98C in a direction the reverse of that of the other levers. The clutches A, B, C, D and E will then be arranged accordingly, those of the clutches which are already in the required position being of course left undisturbed.

In Fig. 1, which represents a diagrammatic assembly of a three-engine installation, the differential gear-box containing the clutches is shown forward of the engines, whereas the drums are placed to the rear; the connection between the clutch levers and the drum levers being effected by the rods 107A, 107B etc., according to the clutch to which each lever pertains. This differentiation between parts of the same number by appending the letters A, B, etc., which designate the clutches to which the parts pertain, has been followed throughout this specification.

By means of the above described arrangement, the work of shifting the clutches has been reduced to the operation of setting the drums for the desired combination and shifting the base-plate on which the drums are mounted. This is effected by the mechanism, shown in Figs. 12 and 13.

The handwheel 108 is fixedly mounted on the shaft 109 turning in the bearing 110 of support 110$^a$ which is mounted on the fixed base-plate 103. The shaft 109 has the sleeve 111, pinned or otherwise fixedly fastened to it, in which slidably fits the end of the shaft 112 which is held in unrotatable relation therewith by the splines 113 sliding in the slots 114 of the sleeve.

The shaft 112 rests in the bearing 115 of the support 116 fastened to the movable base 58 which is slidably mounted on the fixed base 103. At the other side of the bearing is mounted the bevelgear 117 rotatable on the shaft 112, but prevented from sliding thereon by the pin or bolt 118 engaging with the circular groove 119 in shaft 112. The bevelgear 117 has the hub 120 with the clutch rim 121 engaging with rim 122 of clutch 123 which is slidably mounted on shaft 112 and held in splined relation therewith by the keys 124. Into the socket 125 of shaft 112 fits the extension-stub 126 of shaft 127 on which is fixedly mounted the clutchrim 128. Shaft 127 is supported in bearing 130$^a$ of support 130 mounted on the sliding base 58. Mounted on shaft 127 at the other side of the bearing is the drum-control-disc 131 and the bevelgear 132 engaging with bevelgear 133 on tansverse shaft 134, which is supported in bearings 135 and 136 of the supports 137 and 138 respectively, and which has the bevelgear 139 engaging with bevelgear 140 on shaft 55 of drum 54 and the bevelgear 141 engaging with 142 on shaft 87 of drum 86. This arrangement causes the drums to turn in opposite directions, as shown by the arrows. This opposed rotation is not strictly necessary but has been preferred in the embodiment shown, on account of the simplicity of transmission, obviating a duplication of shaft 134 and gear 133. The drum-control-disc 131, Fig. 11, has the face 143 with the concentric grooves 144, the number of grooves being equal to the number of racks in each drum. Each groove having the socket 145; the angular spacing of the sockets as well as their angular sequence corresponding to the angular spacing of the racks in the drums and the sequence of the racks with reference to each other.

On the bearing 130ᵃ is mounted the control frames 146 by means of bolts 147, the control frame serving as a container for a number of manipulable pins engageable with the grooves and sockets of the control disc 131. Each pin is actuated as follows: (Figs. 14, 15 and 16). The pin 148 passes slidingly through the frame plate 149 of the control frame 146 and has collar 150 and eye 151 integral with it, the coilspring 152 being interposed between collar 150 and the frame plate 149. The hand-lever 153 is pivoted on the brackets 154 fastened to the frame plate 149 and has the slot 155 through which passes the pin 156, holding lever 153 in slidable relation with eye 151 of pin 148. The end of the lever 153 slidably engages with bracket 157 fastened to frame plate 149 and has the handgrip 158 provided with lever 159 pivoted on pin 160 and operating the stop pin 161 resiliently engageable with either of the notches 162 and 163 of the segment 164. By drawing lever 159 towards the handgrip 158 the stop pin 161 is disengaged from the notch 162 and the lever 153 can be pushed inward toward the frame plate 149, thereby also moving the pin 148 inward. The pin 148 has the collar 165 integral with it and is slidably received in the sleeve 166 of the disc-stop pin 167 which passes through the frame plates 168 of the control frame. The sleeve 166 has the shoulder 169 and is widened out to form the container 170 which has the cap 171 screwed or otherwise removably secured over its extremity, the pin 148 passing slidingly through hole 172 in cap 171. The coilspring 173 interposed between the collar 165 of pin 148 and bottom 174 of container 170. When pin 148 is pressed inward, disc-stop pin 167, by the action of spring 173, is forced outward from frame plate 168 and engages with the corresponding groove 144 on control disc 131. As the disc 131 by manipulation of the handwheel 108 is made to revolve, the socket 145 of the groove finally comes in line with stop pin 167 which is then immediately urged into the socket by further action of coil spring 173. The disc 131 however cannot be made to revolve unless clutch rim 199ᵃ of clutch 123 is in engagement with clutchrim 128 of shaft 127. This is effected automatically by handlever 153 in the following manner. The container 170 has the transversely extending lug 175 engageable with lever 176 fixedly mounted on pin 177 rotatable in bearing 178 of side-plate 179 of control frame 146. On pin 177 is mounted the lever 180 pivotally connected with rod 181 which by the springs 182 hooked to the studs 183 of the crosspiece 184 and to the studs 185 fastened in support 130 is held in resilient relation to the latter. When the lever 180 is pushed back by the lug 175, which takes place as soon as pin 167 drops into socket 145, the rod 181 will move down. The rod 181 has at its lower extremity the stud 186 bearing on the arm 187 of bell-crank 188 pivoted on the pin 189 of bracket 190; the arm 191 of the bellcrank pivotally engaged with link 192 connected with lever 193 pivoted on pin 194 in bearing bracket 195 fastened to or integral with bearing support 130. The clutchlever 193 has the fork 196 provided with the slots 197 through which passes the pin 198 of the clutch sleeve 199. The clutchlever 193 has the brackets 200 guiding the sliding rod 201. The clutchlever 193 and the rod 201 are held in resilient relation to one another by the coilsprings 202 hooked to the pins 203 of the rod and to the pins 204 of the clutch lever 193.

The clutchlever 193 (Fig. 14) is also held in resilient relation with the support 130 by the spring 205. The top 206 of rod 201 is broadened and has the slantingly disposed slot 207 through which passes the pin 198 of clutch sleeve 199. The rod 201 bears on arm 208 of the plunger shaft 209 actuated by the lever 210 pivoted on the pin 211 in bracket 195. Lever 210 carries the block 212 at its extremity which slidingly engages with the slot 213 of the rod 181. The plunger shaft 209 passes slidingly through top cover 214 of cylinder 215 mounted on the sliding base 58, and has the collar 216 and the coilspring 217 interposed between this collar and the bottom of cylinder 215. Plunger shaft 209 has the notch 218 engageable with pawl 219 pivoted on bracket 220 fastened to or integral with cylinder 215. The pawl 219 is actuated by rod 221 sliding vertically in guides 222 and intermittently lifted by beveled lug 223 of the cam 224. The spring 225 keeps the pawl 219 in contact with the plunger rod 209.

The gear 117 (Fig. 12) meshes with bevel gear 226 fixedly mounted on the vertical shaft 227 which turns in bearing 228 of support 229 and in bearing 230 of the movable base 58. On shaft 227 is mounted the horizontal cam 224 having the camtrack 232 in which engages roller 233 mounted at the extremity of lever 234 sliding in the horizontal guide 235 and pivotally connected with rod 236 which connects the levers 80 thus actuating in unison rods 61 and 92 of drums 54 and 86 respectively. Cam 224 has the salient beveled lug 223 periodically engaging with pushrod 221 of the quick-releasing device hereinbefore described (Fig. 13).

The movable base 58 has the ledges 237 slidingly engaging with the grooves 238 of the fixed base 103. The springs 240 keep bases 58 and 103 in resilient relation, the normal relative position of both being determined by the lugs 241 of the upper base 58 in contact with the stop 242 of the lower base 103.

On shaft 227 is also fixedly mounted the cam 243 which has the eccentric portion 231 and operates in the aperture 245 of the lower base 103, the eccentric portion 231 periodically engaging with the lug 244 of aperture 245: the period of engagement determining the extent and duration of the travel of the upper base 58 in relation to the lower base 103 is secured to the framework of the body of the vehicle.

The operation of the mechanism thus far described is as follows: When it is desired to use a different combination of engines, the lever 158 pertaining to the desired combination and which should be plainly marked as such, is moved until stopped by the catchpin 161 engaging with notch 163 of segment 164. The pin 166 is thereby pushed into the corresponding groove 144 of the control disc 131 and is held in resilient relation therewith by the coilspring 173 in the container 170, the lug 175 of which is then about to engage with lever 176. As the shafts 127 and 112, when coupled, are prevented from turning by the pin 166 of the previous combination being in engagement with its corresponding socket in disc 131, the lever 158 pertaining to the previous combination is withdrawn to its non-operative position as shown in Fig. 16, thus disengaging the corresponding pin 166 from its socket. By means hereinafter explained the clutch 199 is then thrown to the right, the clutchrim 199ª engaging with clutchrim 128 of shaft 127, the shafts 127 and 112 being thus coupled together and turning in unison, forming for the time being, a single shaft. The handwheel 108 is then turned in the direction of the arrow, it being prevented from turning in the opposite direction by the pawl 239 mounted on the bearing 110 and in resilient engagement with the ratchet wheel 246 fastened on hub 247 of the handwheel. Since shaft 112 is coupled to shaft 127 on which is fixedly mounted the disc 131, the disc will rotate in unison with the shafts, the pin 166 then running in its corresponding groove 144, until it engages with the socket 145 into which it is urged by the action of the coilspring 173. As shaft 127 turns, the drums 54 and 86 likewise revolve but in opposite directions to one another by bevel gear 132 meshing with bevel gear 133 on transverse shaft 134 which transmits its motion to the drumshafts 55 and 87 by the bevel gear 139 meshing with bevel gear 140 and by bevel gear 141 meshing with 142. As soon as pin 166 has been urged into socket 145, the rotation of the disc and drums is arrested. Since the angular spacing and sequence of the sockets in the disc correspond to the angular spacing and sequence of the racks in the drums, the drums always stop in such a position as to bring the required set of racks in alinement with levers 98. The forcing of pin 166 into the socket 145 causes the lug 175 to engage with and turn lever 176 which causes the rod 181 to descend and turn the bellcrank 188 which through link 192 turns lever 193 on its pivot 194 and moves clutchsleeve 123 and clutch 199 to the left until clutchrim 122 engages with clutchrim 121 of bevel gear 117. Shafts 112 and 127 are then disengaged and able to rotate independently, whereas bevel gear 117, which is revolvably mounted on shaft 112, is then held in fixed relation therewith. As shaft 112 continues to turn, bevel gear 117 rotates with shaft 112 and thus imparts through bevel gear 226 a rotary motion to vertical shaft 227 and consequently to cam 224, the camtrack 232 of which engaging with camroller 233 causes lever 234 to move in the direction of the arrow and to actuate by transverse rod 236 the levers 80 which makes the rods 61 and 92 in the hollow drumshafts move outward in unison, thus operating the mechanism, hereinbefore described, for positioning the drumracks. The cam 243 on shaft 227 then engages with the eccentric positioning 244 of the aperture 245 of the lower base 103 which causes the upper base 58 to move in the direction of the arrow. As the drums are mounted on the base 58, the fingers 85 and 96 of the racks then engage with the pins 97 and 99, respectively, of the levers 98 and effect the shifting of the clutches in the differential transmission in the manner hereinbefore explained. As soon as the shifting of the clutches is accomplished, cam 224 causes the racks to be retracted to their non-operative position and directly afterwards cam 243 releases the upper base which by springs 240 is brought back to its normal position as determined by the stop 242. I do not limit myself to this construction and the shifting of the base 58 may be effected by a closed cam the camtrack of which is in permanent engagement with a pin and roller mounted on base 58, thus eliminating the retracting spring means.

As the upper base 58 with the entire shifting mechanism moves with respect to the lower base 103 and the handwheel is mounted on the lower base, the shafts 110 and 112 are kept in slidable splined relation by the sleeve 111 and the splines 113. This arrangement, although not strictly necessary, has been preferred in order to keep the handwheel stationary in a fore- and aft-direction during manipulation by the operator. When the cycle of operations pertaining to the shifting of the differential clutches is completed, the beveled lug 223 of cam 224 engages with rod 225 and lifts it high enough to disengage pawl 219 from notch 218 in plunger rod 209 which is then by the action of spring 217 forcibly pushed up, the arm 208 of plunger rod 209 raising rod 201 slidably mounted on clutchlever 193, the slanting slot 207, engaging with pin 198 of the clutch sleeve 199, forcing the clutch to move to the left midway between clutchrims 121 and 128, thus disengaging bevelgear 117 and rendering cams 224 and 243 non-operative. Shaft 112 then runs free, that is, at the end of the operation the handwheel becomes automatically disengaged and can be turned without affecting the shifting mechanism in any way.

By releasing the pawl 219 the rod 209 moves upwards and lever 210 turns around its pivot 211 so that block 212 in slot 213 of rod 181 is brought to its lowest position. At the end of the cycle the rod 181 is down and the block 212 rests on the lower sill of the slot 213. In order to enable the disc to revolve, the pin 167 is retracted which at the same time releases lever 176, allowing the rod 181 to be moved up by the action of the springs 182. As the rod 181 moves up, the block 212 is raised, turning lever 210 anticlockwise and depressing the plungerrod 209 until notch 218 engages with pawl 219 which keeps the plungerrod in position. The sliding-rod 201 by the action of the springs 202 has also been lowered and the clutch 199 has been moved to the left. The upward travel of rod 181 has caused the lever 193 to move in clockwise direction through the action of the spring 205, moving the clutch 199 to the right, the rightward movement of the clutch exceeding the previous movement to the left, so that immediately on retracting pin 167 clutchrim 199ª is in engagement with clutchrim 128, which puts the mechanism in an operative condition. So long as the shunt lever for the previous combination is not retracted, the wheel 108 runs free. The manipulations required of the operator are therefore as follows: Throw in shunt lever for the desired combination, retract lever for the previous combination, and turn the handwheel until it runs free. It is obvious that these manipulations can be accomplished in very little time and that the use of the above described mechanism eliminates any chances of error in the correct positioning of the transmission clutches.

The propeller shaft 23 has the splined taper end 250 carrying the propeller hub 251 which is locked in position by the nut 252 on the threaded stud 253. The propeller hub 251 has the radially disposed sleeves 254 slidably receiving the shanks 255 of the propeller blades 256. The hub 251 has the rear cover 257 removably secured to it by the bolts 258 or by any other adequate means. The cover 257 has the sleeve 259 which serves as a bearing for the sleeve hub 261 of the pilot bevelgear 262, the ball bearings 260 being interposed between the sleeve 259 and the sleeve hub 261. The pilot gear 262 meshes with the bevelgears 263 and 264 secured on the screw shafts 265 and 266 respectively. The screw shafts 265 and 266 are in threaded engagement with the shanks 255 of the propeller blades. The ends of the screw shafts 265 and 266 are rotatably received in the housing 270 and held in position radially by the removable collars 268, the ball bearings 269 being interposed between the collars and the inside of the housing in order to reduce the friction occasioned by the centrifugal pull of the blades. The housing 270 consists of two parts locked together by such means as the bolts 271.

The housing 270 is concentric with the propeller shaft and spacedly mounted thereon so that the housing is capable of motion in a radial direction with respect to the propeller shaft. The propeller shaft and the propeller hub are thus relieved from the strains occasioned by the centrifugal force acting on the propeller blades. The centrifugal force acts directly on the housing 270 and is prevented from acting on the propeller shaft by the spaced mounting of the housing.

The propeller hub is thus in the main subjected only to the stresses occasioned by the torque of the propeller in a transverse plane and to the bending stresses in a fore-and-aft plane as occasioned by the thrust of the blades. The strain on the propeller shaft and hub occasioned by gyroscopic precession is also considerably lessened since a great portion of this strain is transferred to the housing, the coupling bolts of which will then be subject to combined shear and tension.

By reason of the spaced mounting of the housing on the propeller shaft the propeller blades are mutually balanced against spontaneous radial displacement by centrifugal force. It is obvious, of course, that due precautions should be taken to initially insure a perfect radial adjustment of the blades.

The housing however may also be fixedly secured to the propeller shaft, in which case the propeller hub will be relieved of a great portion of the stresses due to torque and thrust.

The bevelgears 263 and 264 have the hubs 272 and 273 respectively in thrust-bearing engagement with the inner faces of the sleeves 254 of the propeller hubs, as a precautionary measure against any radial displacement of the housing 270. Under normal conditions these bearings should not be subject to any thrust.

The sleeve hub 261 of the pilot bevel gear 262 is rotatively mounted on the propeller shaft 23, the friction set up during relative rotation of propeller shaft and pilot gear during the adjustment of the blades being lessened by employing bushings, ball-bearings, and the like, which however have been omitted from the drawing as obvious details. The sleeve hub 261 of the pilot gear is supported in the thrust bearing 274 mounted in the fuselage frame 275, and has the bevelgear 277 secured to it by such means as the bolts 276, the bevelgear 277 having the clutch rim 278. This arrangement is shown in Fig. 25 and Fig. 1. The bevelgear 279 having the clutch rim 280 is rotatively mounted on the shaft 23 and is held against axial displacement by the pin 282 engaging with the groove 283 in the shaft. Bevelgears 277 and 279 mesh with bevelgear 284 rotatably mounted in bearing 285 secured to the fuselage. Intermediate bevelgear 277 and 279 is the double-faced clutch 286 slidably mounted by the spline keys 287 on the shaft 23. The clutch 286 is rotatable in the sleeve 288 which has the studs 289 engaging in the slots 290 of the forked lever 291. The clutch rims 292 and 293 of the clutch are engageable with the clutchrims 278 and 280 respectively.

Figure 32:
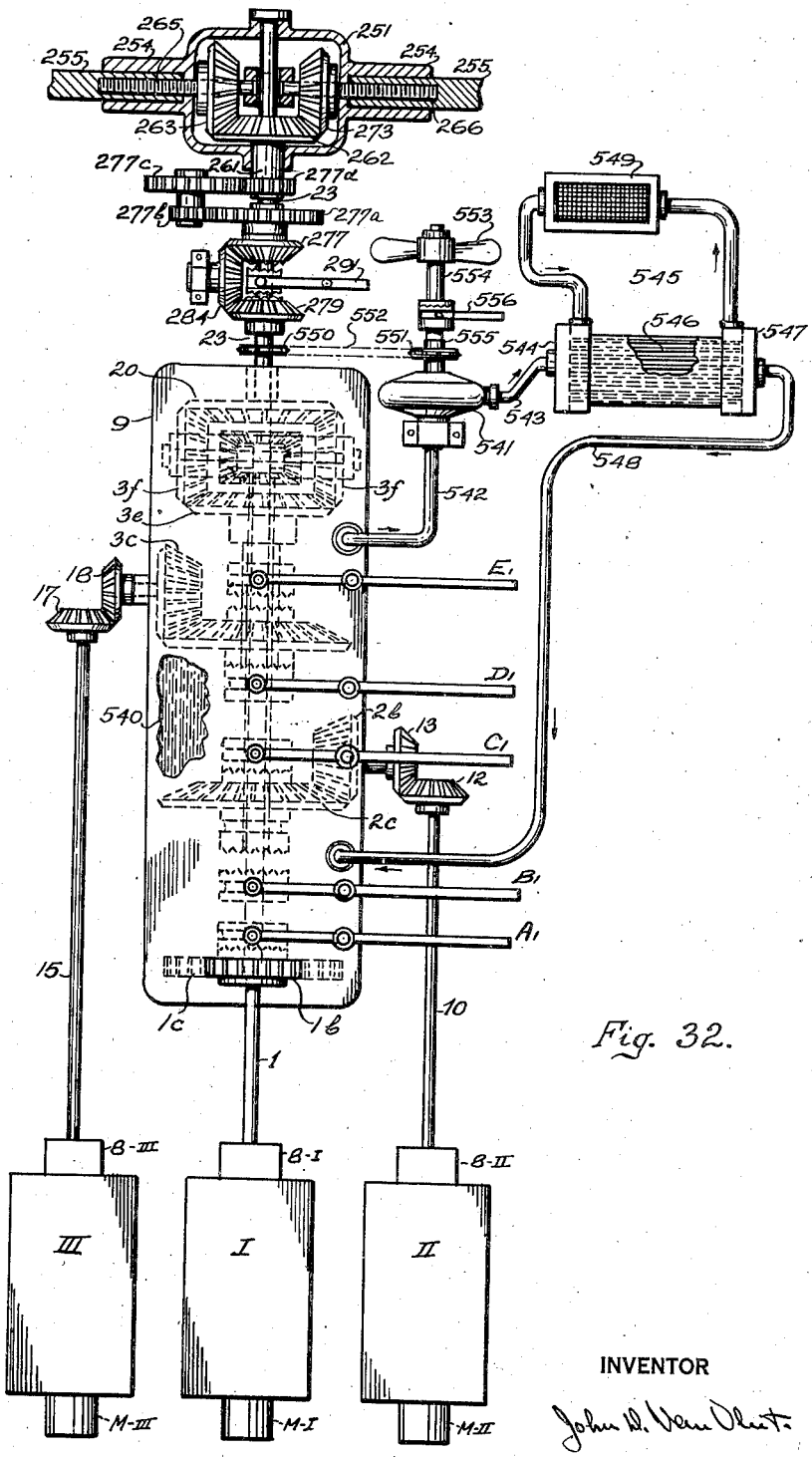
Fig. 32 shows in combination the compound differential transmission, a modification of the propeller adjusting mechanism, and an oil cooling and circulating device.

In Fig. 1 and Fig. 25 the pilot gear 262 is thus shown directly connected to the bevelgear 277 as illustrative of means for selectively rotating the pilot gear in either direction for the purpose of adjusting the propeller blades. It is obvious that gear 277 should revolve slower than the pilot gear 262 since the adjustment of the blades can only be accomplished by relative rotation between the pilot gear and the propeller shaft 23, which has the effect of also rotating the bevel gears 263 and 273. The arrangement shown in Fig. 25 would therefore be operative in one sense only. The proper arrangement is correctively illustrated in Fig. 32, which shows the reduction gearing $277^d$, $277^c$, $277^b$, and $277^a$ interposed between the bevelgear 277 and the pilot gear 262, the gear $277^d$ being fixedly mounted on the hub 261 of the pilot gear, and the gear $277^a$ being fixedly connected with the bevelgear 277, so that both these last named gears are jointly turnable on shaft 23.

The clutch lever 291 is pivoted about pin 294 on the support 295 and has the arm 296 carrying the crossmember 297 provided with the studs 298 and 299. The studs are engageable with the levers 300 and 301 pivoted about the pins 302 and 303 in the supports 304 and 305 respectively. The levers 300 and 301 are operatively connected by the rods 306 and 307 with the mechanism which automatically controls the adjustment of the propeller.

Figure 18:
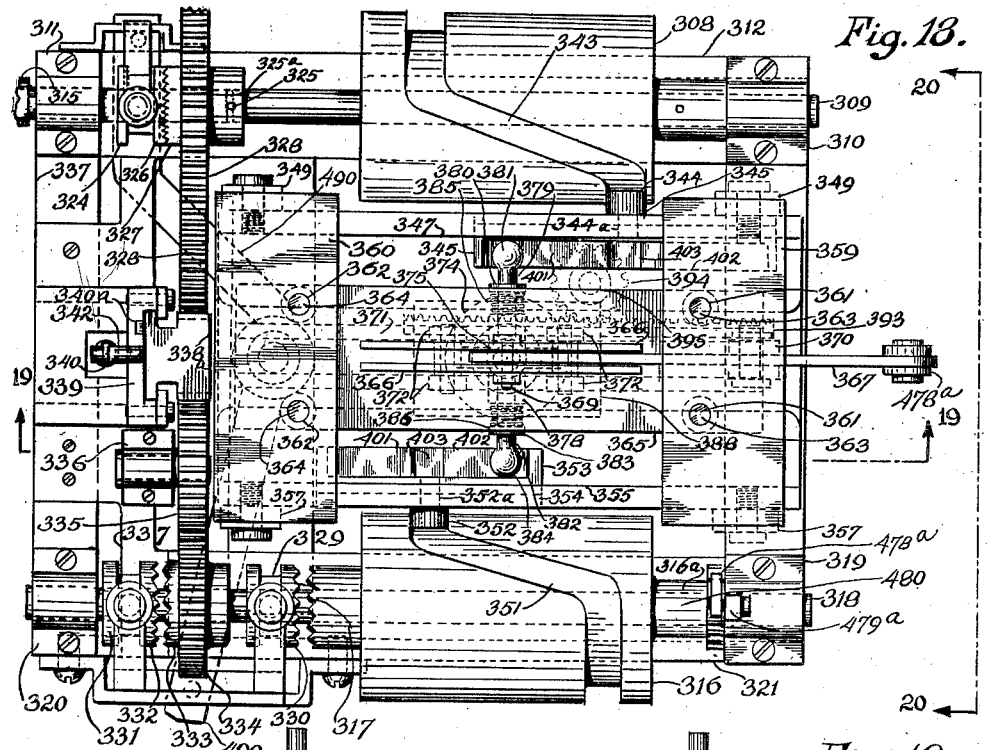
Fig. 18 is a plan view of part of the propeller adjusting mechanism.
Figure 19:
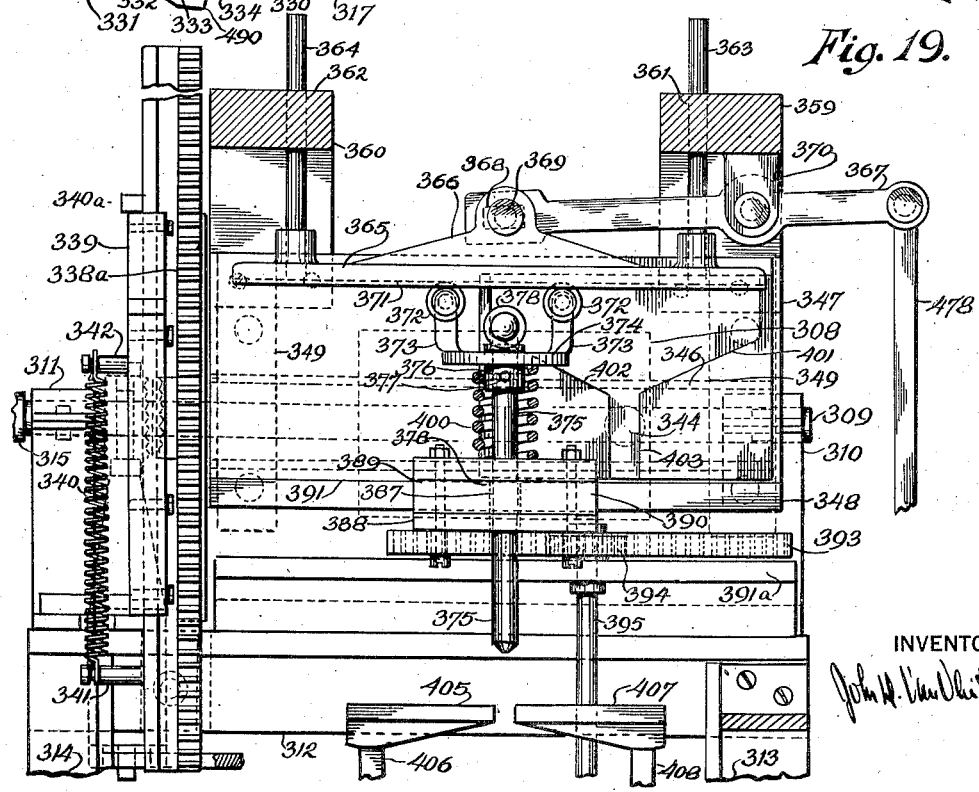
Fig. 19 is a sectional elevation of Fig. 18.

The automatic propeller control is based on the differential action of two opposed rotary cams, designated by the numerals 308 and 316 respectively. The embodiment presented in Fig. 18, Fig. 19 and Fig. 20 shows the cam 308 secured on shaft 309 rotatable in the bearings 310 and 311, the said bearings being fixedly mounted on the bracket 312 supported on base 103. The camshaft 309 has axially slidable connection with shaft 55 of the rotary frame 54 by means of the splined sleeve 315.

The cam 316, which is arranged opposite cam 308, has the clutch rim 317 and is mounted on shaft 318. The shaft 318 is rotatable in the bearings 319 and 320 mounted on the bracket 321 which by the supports 322 and 323 is secured to the fixed base 103.

The clutch 324 having the clutch rim 326 is slidably splined on shaft 309 and adapted to engage the clutch rim 327 integral with gear 328. The gear 328 is rotatable on shaft 309 and held against axial displacement by means such as collars or the pin 325 engaging with groove $325^a$ of the shaft.

On the shaft 318 is slidably splined the clutch 329 having the clutchrim 330 engageable with the clutchrim 317 of cam 316. On the shaft 318 is also slidably splined the clutch 331 having clutchrim 332 engageable with clutchrim 333 of gear 334 rotatable on shaft 318. Gear 334 meshes with the intermediate gear 335 rotatable in bearing 336 fixed on the transverse bracket 337 which is secured to brackets 312 and 321.

The gears 328 and 335 mesh with the double rack 338 slidable in the guide bracket 339. The spring 340 fastened to the stud 342 in the guide bracket and to the stud 341 in the rack keeps rack and guide in resilient relation and provides the means for retracting the rack to its initial position subsequent to the declutching of the gears 328 and 325. The cam 308 has the track 343 which receives the roller 344 rotatable on pin $344^a$ mounted on the slidable member 345 which is provided with the guide tongue 346. The guide tongue 346 is slidably received by the frames 347 and 348 which are joined by the bracing pieces 349. The frame 348 has the extension 350 secured to bracket 312 on which rests the bearing support $310^a$.

The cam 316 has the track 351 receiving the roller 352 rotatable on pin $352^a$ mounted on the sliding member 353 which has the guide tongue 354. The guide tongue 354 is slidably received by the frames 355 and 356 which are joined by the bracing pieces 357.

The frame 356 has the extension 358 secured to the bracket 321 on which is mounted the bearing support $319^a$.

The frames 355 and 347 carry the brackets 359 and 360 provided with the guide holes 361 and 362 respectively which slidably receive the rods 363 and 364 secured to the plate 365. The plate 365 is vertically movable by the lever 367 which has the slot 368 receiving the pin 367 mounted in the lugs 366, the lever 367 being fulcrumed in the lugs 370 of the bracket 359.

The underside of the plate 365 has the grooves 371 which serve as guides for the rollers 372 mounted in the brackets 373 of the collar 374. The collar 374 is rotatably mounted on the rod 375 by such means as the setpin 376 engaging with the circular groove 377. The collar 374 has the horizontally disposed sleeve 378 in which are slidably retained the bars 379 and 382 having the collars 383 and the preferably globular ends 381, the springs 385 and 386 being interposed between the collars and the sleeve 378 whereby the bars 379 and 382 are urged outward.

The rod 375 is slidable in the guide hole 387 of the movable carriage 388 which has the grooves 389 and 390 slidably engaging with the tongues 391 and 392 of the frames 348 and 356 respectively. Secured to the carriage 388 is the rack 393 in mesh with pinion 394 secured on shaft 395. The shaft 395 has bearing in the ledge 391$^a$ and in the bracket 396 fastened to support 313 and carries the bevelgear 397 which meshes with bevelgear 398 on the shaft 399.

The globular ends 381 and 384 of the bars 379 and 382 engage with the sloping ledges 401 and 402 and with the vertical guide slots 403 of the sliding members 345 and 353 respectively and are kept in resilient contact with the inside walls thereof by the springs 385 and 386.

The pin 375 in its lowest position engages with either the arm 405 of pushrod 406 or with arm 407 of pushrod 408 according to the position of the block 388 will be subsequently explained. Pushrod 406 has connection with bellcrank 409 actuating controlrod 410 and pivoted in bracket 411 mounted on the stationary plate 103. Pushrod 408 has connection with bellcrank 412 actuating control rod 413 and pivoted in bracket 414 fastened to the stationary plate 103.

The adjustment of the propeller's pitch and diameter is automatically effected by the turning of the propeller shaft 23 which has fixedly mounted on it or in any suitable manner associated with it the worm 415 meshing with the wormgear 416 fixedly mounted on shaft 416$^a$ on which is revolvably mounted the pinion 417 meshing with rack 418 slidable in the guide 419 and held in resilient relation thereto by the spring 420, the guide 419 being mounted by bracket 421 on members integral with or pertaining to the fuselage 275.

As the worm 415 revolves, the pinion 417 moves the rack 418 in the direction of the arrow until the lug 422 of the rack engages with lever 423 which is fulcrumed on pin 424 secured in cylinder 425. The lever 423 has operating connection with the rod 426 which has guided bearing in the endplates 427 and 428 of the cylinder 425. The cylinder 425 is rotatably mounted in the annular bearing 429 of bracket 430 secured to members of the fuselage. The shaft 416$^a$ has slidingly keyed on it the clutch 431 which has the clutchrim 432 adapted to engage with clutchrim 433 of pinion 417. The clutch 431 is operable by lever 434 pivoted in the bracket 435 and has connection with rod 436 slidable in guide 437 and held in resilient relation thereto by spring 438. Rod 436 has the roller 439 engageable with cam 440 of rod 441 slidable in guide 442.

The lever 296 has following connection by link 443 with lever 444 which is pivoted on pin 445 and is connected by link 446 to the bell crank 447 mounted on pin 448. The arm 449 of bell crank 447 is provided with pin 450 which engages in slot 451 of the movable member 452 slidably mounted in the guide brackets 453. The link 446 has connection with lever 454 which is pivoted on pin 455 and actuates bell crank 457 by link 456. The arm 458 of the bell crank 457 has the pin 459 engaging in slot 460 of the member 452. The guide brackets 453 are secured to suitable parts of the fuselage or engine room, and the non-operative position of the member 452 is determined by the stop 461. The rod 426 actuates bell crank 462 which is pivoted on pin 463 and operates pawl 464 pivoted on pin 465, the spring 466 holding the pawl in engagement with the ratchet 467 carried by the member 452. The springmeans 468 tend to retract the member 452 to its non-operative position.

The cylinder 425 is turned by the lever 469 pivoted on pin 470 actuating the rack 471 which is guidedly mounted in brackets 472 and 473 and which meshes with gear 474 mounted on shaft 475. The shaft 475 carries the bevelgear 476 in mesh with bevelgear 477 mounted on or otherwise suitably associated with cylinder 425.

The operation of the propeller adjustment device is as follows: When, by turning the handwheels 108, the drum 54 on shaft 55 and drum 94 on shaft 92 are put in position to shift the clutches in the differential transmission for the desired combination, the shaft 54, which is in splined relation to shaft 309, causes cam 308, which is keyed on shaft 309, to turn, the cam rotating to the same extent as the drums. The camtrack 343 is so disposed over the surface of the cam 308 as to present three dwells, which are equally spaced longitudinally in the direction of the length axis of the cam, their relative angular positions corresponding to engine combination, I, II and III for single engines, I and II, I and III, and II and III for two engines, and I, II and III for the combination of three powerplants, the angular spacing of the dwells corresponding to the angular spacing of the same combinations of racks in the shift drums.

The principle of this device is applicable to any number of power plants the number of dwells always corresponding to the number of power plants.

The same disposition of dwells has been applied to the camtrack 351 of cam 316 but in a reverse angular sequence since the dwells correspond to the disposition of the racks in drum 94 which turns in a direction opposed to that of drum 54. The longitudinal sequence of the dwells on cam 316 is also the reverse of that of the dwells on cam 308, the longitudinal spacing of the dwells being moreover slightly less than on cam 308.

Cam 308 is always in simultaneous turning relation with shaft 55, whereas cam 316 is rotatably mounted on shaft 318 and revolves only with this shaft when clutch 329 is in engagement with clutchrim 317. The pawl 478$^a$ engaging with ratchet wheel 480 secured on hub 316$^a$ of cam 316 keeps this cam stationary when the other cam is being rotated. Fig. 21 represents diagrammatically the two cams 308 and 316 with their respective camtracks and dwells, Fig. 22 giving the angular relation of the dwells. The dwells have been designated by A, B and C for cam 308 and A$^1$, B$^1$ and C$^1$ for cam 316, A being the dwell for one engine, B for two engines combined and C for three engines combined. The arms 405 and 407 of the propeller control levers are positioned in the vertical plane through the axis of symmetry LL. It is seen that the lines AC$^1$, BC$^1$ and AB$^1$ cross the line LL to the left of the transverse median line TT and that the lines BA$^1$, CB$^1$, and CA$^1$ cross the line LL to the right of TT. Thus, when changing to a lower horsepower, the position of the pin 375 represented by the points $ac$, $ab$ and $bc$ will be above arm 405, and when changing to a higher horsepower the position of the pin, 375 represented by points $ba$, $cb$ and $ca$ will be above arm 407. When changing to a different combination of the same number of engines the diagonals cross on the line TT and neither one of the control arms will be actuated. In that case no propeller-adjustment will take place since none is required. While cam 308 is being turned in conjunction with drum 54, cam 316 remains stationary; the cam 308 will therefore present the dwell of the new combination of engines, whereas the cam 316 still presents the dwell for the previous combination, the sliding pieces 345 and 353 occupying the positions governed by the dwells of their respective cams. The globular heads 381 of bar 379 and 384 of bar 382 are constantly pressing against the walls of their respective sliding pieces. As soon as the cam 308 has shifted its sliding piece 345 to the new position, lever 367 moves the plate 365 down, which forces the pin 375 downward through the carriage 388 and compresses the spring 400.

The heads 381 and 384 will then engage with the sloping sides 402 and 401 of their respective sliding pieces and will be guided into the vertical slots 403; the disposition of the crosshead 378 then correspond to one of the diagonals in Fig. 21 and the exact location of the pin 375 will correspond to one of the points $ab$, $ac$ etc. As the plate 365 continues to descend and the carriage 388 slides on the ledges 392 and 391, the rollers 372 of the collar 374 travel in the grooves 371 of the plate 365, thus preventing the pin from being jammed in the block and the crosshead from being turned by the action of the spring 400. The pin 375 finally engages with either one of the arms 405 or 407 which then actuates the diameter-adjusting device. Lever 367 is actuated by rod 478 having connection with bellcrank 479 on bracket 480$^a$ mounted on plate 103 and operatively connected with rod 481 sliding in the guides 482. Rod 481 has the roller 483 engaging with camtrack 484 of camdisc 243. (Fig. 25.) Lever 406 is operatively connected with lever 306 (Fig. 25) which is retracted in the direction of the arrow when lever 406 is pressed down. This causes lever 300 to engage with pin 298 on crosspiece 297. Lever 291 is then turned and clutch 286 is shifted to the right, the clutchrim 293 engaging with clutchrim 280 of bevelgear 279. Since clutch 286 is slidably keyed on propeller shaft 23 which turns in the direction of the arrow 485, the bevelgear 279 will then turn with it in the same direction while the bevel gear 277 will rotate in the opposite direction. The screws 266 will then move the propellerblade shanks outward and the diameter of the propeller will be correspondingly increased.

The levers 301 and 302 engaging with the pins 298 and 299 of the crossmember 297 as shown in the drawing are presented as a concrete example of means for alternately shifting the clutch to one side or the other; the arrangement is intended to illustrate the differential action of the propeller controlling mechanism. It is obvious that the operation of the clutch lever can be effected by a diversity of devices all tending to produce the same result, in view of which I wish it to be understood that I do not limit myself to the particular means shown in the drawing.

Lever 407 is operatively connected with lever 307. When the pin 375 presses the lever 407 down, which occurs when the power delivered to the propeller shaft is diminished, lever 307 is retracted in the direction of the arrow and thus causes lever 301 to engage with pin 299 on the cross-member 297, thereby actuating lever 291 which shifts clutch 286 to the left. Clutchrim 292 then engages with clutchrim 278 of bevelgear 277 whereby this gear will then turn in the same direction as the propeller shaft. Bevelgear 277 actuates the pilot bevelgear 262 in mesh with bevelgears 263 and 264 by which the screws 265 and 266 are turned. The propeller blades will then move radially inward whereby the diameter of the propeller is correspondingly diminished. Since the increase or decrease of the propeller diameter is co-ordinated with an increase or decrease of the power delivered to the propeller and this entails a corresponding increase or decrease of the resultant speed of the machine, it is desirable that the pitch of the propeller be modified accordingly.

A modification of the propeller pitch would also require a corresponding modification of the helicoidal conformation of the blades, which in a propeller of the size suited to three or more engines would entail considerable constructional complications. A practical alternative is found in the modification of the angle of attack of the blades in accordance with the variable horsepower transmitted and with the correspondingly varied speed of the machine. The angle of attack of the blades is automatically adjusted in the following manner. The hubs 254 have the slots 486, of which there may be several, into which slidingly fit the studs 487 which are secured in a suitable manner to the blade shanks 255. The slots are so conformed as to turn the propeller blades around their radial axes when the shanks travel up or down in the sleeves. The angle of incidence of the blades is thus increased or decreased by the angular variation of the slots 486. Diameter, pitch and angle of attack of the propeller blades are thus simultaneously varied in accordance with the horsepower the propeller is to absorb and with the airspeed of the machine.

As has been pointed out, the mechanism for changing the diameter of the propeller is actuated by the rotating power-delivery shaft; the amount of increase or decrease of the diameter being proportional to the number of turns made by the power-delivery shaft during the period of change. This is effected by a timing device controlling the clutch 286, the clutch being thereby automatically disengaged as soon as the required change of diameter has been accomplished. The change in the number of powerplants as presented in Fig. 21 is from 1 to 3 for point $ca$, from 1 to 2 for point $Ca$ and from 2 to 3 for point $cC$, all to the right of the transverse median line TT; and from 2 to 1 for point $aC$, from 3 to 2 for point $Cc$, and from 3 to 1 for point $ac$ to the left of line TT.

In regulating the diameter of the propeller the controlling factor is the difference between the number of powerplants in use and the number of powerplants next to be used; this difference must determine the number of turns of the propeller shaft during the shift. Referring to Fig. 18, the rack 393 is fastened to and travels with the carriage 388. When the carriage is brought to rest by the heads 381 and 384 engaging with the vertical slots 403, the pinion 394 has been turned part of a revolution and has through bevel gears 397 and 398, operatively connected to rack 471, turned the cylinder 425 to a corresponding position. In Fig. 23 a gear having the same numeral 471 has been substituted for the rack 471.

The rod 426 is actuated by the levers 423, as hereinbefore described. The number of these levers corresponds to the number of stations $ab$, $bc$, etc., on the median line of symmetry LL between the differential cams 308 and 316, and the angular sequence of these levers 423 corresponds to the linear sequence of the said stations. The distance from each lever 423 to the lug 422 in its nonoperative position is proportional to the number of turns of the propeller shaft required to bring the propeller diameter in accord with the horsepower available. For instance, when pin 375 is at station $ac$ it implies that the power transmitted has been changed from three engines to one engine. The cylinder 425 has then been turned so as to bring lever 424$^{ac}$ in line with rack 418. The rack will then be raised by pinion 417 which revolves with shaft 416$^a$ carrying wormgear 416 actuated by worm 415 on the propeller shaft. Pinion 417 (Fig. 26) is freely mounted on shaft 416$^a$ but has been brought in co-operation therewith by clutch 431 having clutch-rim 432 which is made to engage with the pinion 417 in the following manner. When clutch 286 is shifted to the left and made to engage with bevelgear 277, the arm 449 of bell crank 477 will move down; the pin 450, which is normally in engagement with the bottom of slot 451, will then move bar 452 down in the direction of the arrow. The arm 458 of the bellcrank 457 however, will move upward and will therefore not be in operative engagement with the bar 452. As bar 452 moves down, rod 441 will move up, by the action of the intermediate lever 441$^a$, the cam 440 then raising rod 436 which causes the clutch to engage with pinion 417. Thus, as soon as the parts effecting the change in diameter are put in operation, the timing device is likewise switched in. When clutch 286 is moved to the right and made to engage with bevel gear 279, the arm 449 of bellcrank 447 is raised and the pin 450 is no longer in operative engagement with bar 452. The arm 458 of bell crank 457 however moves down and the pin 459 pressing on the bottom sill of slot 460 causes bar 452 to move down also, clutch 431 being thrown in engagement with pinion 417 as before. Regardless of which way the clutch is shifted, bar 452 always moves down and the timing device is switched in.

The bar 452 is locked in position by the pawl 464 engaging with the ratchet 467. It is released when the lug 422 of the rack 418 engages with the lever 423 which depresses rod 426 and disengages the pawl 464, the bar 452 being subsequently brought back to its original position as determined by the stop 461 by the spring 468. The upward movement of the bar disengages clutch 431 of the timing device and clutch 286 of the change-diameter mechanism. The expressions "up" and "down" as used above refer to the movements of the parts with reference to each other as they are shown on the schematic lay-out in Fig. 25 and should not be taken literally, the relative position of the parts being amenable to considerable variations.

The following action has taken place in the differential cam-control shown in Figs. 18, 19, and 20. As soon as pin 375 has depressed either one of the rods 406 and 408, it is raised again by the action of the spring 400, the plate 365 being raised at the same time by the lever 478 controlled by cam 243. The rack 338 has been raised by the gear 328 and remains in this position so long as gear 328 remains engaged with clutch 324. After pin 375 has been raised, clutch 324 is disengaged by lever 490 mounted on shaft 491 turnable by lever 492 actuated by rod 493 which has roller 494 engaging with cam-track 495 of cam-disc 243. Lever 490 also operates simultaneously clutches 331 and 329 engaging respectively with gear 334 and clutchrim 317 of cam 316. On disengaging clutch 324 and engaging clutches 331 and 329, the rack 338 is retracted downward by the spring 340 until stopped by the stoplug 340$^a$, which through intermediate gear 335, meshing with the rack and with gear 334, causes the cam 316 to revolve so that the dwell positioned in the plane through the center lines of the cams corresponds with the dwell of cam 308, the transmission ratio of the gears associated with the rack being such that both cams execute the same angle of rotation. The clutches 331 and 329 disengage immediately after cam 316 has assumed its new position and clutch 324 engages with gear 328, so that the mechanism is ready for the next shift with the sliding piece 353 in the position for the engine combination now in operation.

All of the above described operations take place automatically and are included in the cycle of operations induced by turning the handwheel 108, after the shunt lever for the desired engine combination has been set, and the lever for the previous combination has been retracted.

The entire mechanism as described and schematically presented in the drawings is of course amenable to considerable variations in the disposition of the various units. The timing device and the change-diameter device may in any suitable way be associated with the propeller shaft and need not be directly mounted on the same, nor is it required that the differential cams 308 and 316 be mounted in continuation of the shift drum shafts; my claims are therefore based in the relation of the parts and their co-ordinated action rather than in their dispositions and conformity as shown in the drawings.

For the various releasing devices as described any suitable trip-mechanism may be substituted. It is obvious that the means as presented will in practice be subjected to considerable modification and refinement. I wish it to be clearly understood that the various lever- and release-devices shown in the drawings are intended to represent a concrete embodiment of suitable means rather than a definite design.

The mechanism hereinbefore described enables the operator to shunt from one combination of engines or powerplants to any other combination of his selection as required by the exigencies of the case, and the shunting can be performed while the engines are in operation. The engine or engines which are thereby thrown out of running combination are either automatically stopped, or can be stopped after the new combination has gone into effect; the new reserve engine or engines which are thrown into combination are also automatically started.

It may occur however, that one or more of the engines or power units in running combination develops a defect and ceases to function properly. If this defectively functioning power unit slows down only slightly, the difference in R. P. M. will be taken care of by the differential transmission with an attendent increase in gear friction. In extreme cases however, the engine or power unit may suddenly cease to function entirely. If this condition were allowed for even a very limited period of time, the effect would be highly detrimental, and in certain instances directly adverse, to the forward motion of the vehicle, which in the case of an airplane would entail disastrous results. The effects of a sudden cutting-out of one or more power units running in combination have been tabulated below, with special reference to the differential transmission mechanism shown in Fig. 2.

Case 1. All three engines are running and transmitting their combined power to the propeller shaft. Engine I suddenly cuts out. Shaft 1$^d$ then ceases to revolve as does also sungear 1$^e$. Spider 30 revolves at one half the angular speed of sungear 2$^e$. Sungear 3$^e$ keeps on turning. Assuming that all engines turn at the same speed, the angular velocity of sungear 20 will be nil; that is, the propeller stops turning.

Case 2. All three engines running. Engine II cuts out. Propeller stops.

Case 3. All three engines running. Engine III cuts out. Propeller is accelerated.

Case 4. All three engines running. Engines I and II cut out. Propeller reverses its direction of rotation.

Case 5. All three engines running. Engines I and III cut out. Propeller continues at reduced speed.

Case 6. All three engines running. Engines II and III cut out. Propeller continues at reduced speed.

Case 7. Engines I and II running in combination, shaft $3^d$ being clutched to shaft $2^d$. Engine I cuts out. Propeller stops.

Case 8. Engines I and III running, as before. Engine II cuts out. Propeller stops.

Case 9. Engines I and III running, shaft $2^d$ clutched with shaft $1^d$. Engine I cuts out. Propeller accelerated.

Case 10. Engines I and III running as before. Engine III cuts out. Propeller accelerated.

Case 11. Engines II and III running, shaft $1^d$ clutched to shaft $2^d$. Engine II cuts out. Propeller reverses.

Case 12. Engines II and III running as before. Engine III cuts out. Propeller stops.

It is obvious that the irregularities tabulated above can be instantly remedied by shunting to another operative combination of engines. Since the human element, however would then enter into the maintenance of continued locomotion and safety depend to a great extent upon the alertness of the operator, especially in cases 3 and 9 in which the reversing of the propeller may entail undesirable consequences unless instantly corrected automatic means are provided whereby, in the event of a sudden cutting out, of one or more of the engines in operation, the differential transmission is immediately adjusted in accordance with the next adequate combination of engines, so that the tractive effort continues without interruption, thus giving the operator ample time to adjust the levers of the switch frame whereby the control mechanism is put in condition for the next selective shunting.

Figs. 27, 28, 29 and 31 illustrate the means whereby the transmission mechanism is automatically adjusted. In Fig. 29 these means are applied to the shafts $1^d$ and $2^d$ of a differential transmission which differs from the one shown in Fig. 2 in that the differential gearing for two of the shafts is connected tandem fashion with a differential gearing for these two shafts and the third shaft, the resultant turning moment of each individual differential gearing being transmitted to the next differential gearing through the spider frame in which the planet gears are journaled. This arrangement can be extended in series for any number of transmission shafts, the power delivery shaft being then always connected in driven relation to the spider frame last in sequence. This modification has the advantage over the type of compound differential gearing shown in Fig. 2 in that it entirely obviates any stopping or reversal of the power delivery shaft and the propulsion means. It has however the disadvantage of involving more weight, being less compact, and of requiring a special mechanism for the reversing of the power delivery shaft and propulsion means, this mechanism having to be separate from the power delivery shaft and designed to reverse the angle of incidence of the propeller blades. In the case of a three engine installation preference is therefore given to the differential gearing shown in Fig. 2.

Referring to Fig. 27, it is seen that shaft 500 supported in bearing 501 is driven from transmission shaft $1^d$ through spurgears 502 and 520, and has fixedly mounted on it sungear 503 meshing with planetgears 504 which are journalled on the spidershafts 505 fixed in the annular housing 506 which is keyed or otherwise fixedly mounted on the sleeveshaft 507 of the sungear 508. Rotatable on the sleeveshaft 507 is the sungear 509 meshing with the planetgears 504. The sleeveshaft 507 has also fixedly mounted on it the spurgear 510 driven from the transmission shaft $2^d$. Sungear 508 meshes with the planetgears 511 journalled on the spidershaft 512 secured in the annular housing 513 which is fixedly mounted on shaft 500. Planetgears 511 mesh with sungear 514 which has hub 515 revolvably mounted in bearing 516. On the hub 515 of the sungear 514 is fixedly mounted the ratchet wheel 517. On hub 518 of sungear 509 is fixedly mounted the ratchet wheel 519.

Shafts $1^d$ and $2^d$ turn in the same direction as indicated by the arrows 520 and so long as both shafts turn in unison the twin differentials will also turn in unison. If shaft $1^d$ suddenly stops, the spider 512 also stops turning and the rotation of sungear 514 is reversed. Sungear 503 also stops so that the rotation of sungear 509 is accelerated in its original direction. If shaft $2^d$ suddenly stops turning, the spider 505 will likewise stop, and the rotation of sungear 509 is reversed accordingly. Sungear 508 likewise stops so that the rotation of sungear 514 is accelerated in its original direction.

Thus, the rotation of ratchetwheel 517 is reversed when shaft $1^d$ stops and the rotation of ratchetwheel 519 is reversed when shaft $2^d$ stops.

For each permutative pair of shafts there are thus two rotating elements which each reverse their rotation under certain conditions. By making these rotating elements actuate a system of levers in operative connection with the self-starters and magnetos of the powerplants and with the clutch-levers of the differential transmission, the reversing action can be utilized to automatically connect or disconnect the required powerplants. The mechanism whereby the reversing action actuates the levers shown in Fig. 28 merely represents a concrete embodiment of means and I wish it to be understood that I do not limit myself to the particular means shown since many other devices may be substituted which produce the same result.

Each ratchet wheel engages with pawl 521 having slot 522 in which slidingly fits the block 523 which is held in resilient relation to the upper sill of the slot by the spring 524. Fixed in or integral with block 523 is the pin 525 revolvably mounted in bearing bracket 526. The spring 527 is hooked on pin 528 of the pawl and on pin 529 of the bracket 526, thus keeping the pawl in contact with the ratchet wheel. Pawl 521 by link 530 is operatively connected with rod 531 slidable in guides 532 and operatively connected, by means such as bellcrank 533, to the levers B' and D'. As soon as the direction of rotation of the ratchet wheel is reversed, the pawl is pressed down in the direction of the arrow which causes the rod 531 to move upward and shift the respective clutchlever. This will lock the two drive shafts together and automatically puts the transmission differential in an operative condition, thus obviating the necessity of any manual adjustments by the operator.

As hereinbefore explained, the sudden stopping of one of the differential transmission-shafts may cause a reversing of the rotation of the power delivery shaft and of the propeller. Although a readjustment of the transmission mechanism, by means hereinafter described, takes place almost immediately, this condition is nevertheless undesirable. The possibility of reversal of the propulsion means has therefore been eliminated by gearing the differential transmission shafts to the shafts of the automatic adjustment differentials in such ratio that the rotative speed of the driven sungears of both adjustment differentials is considerably in excess of the rotative speeds of their spider frames, inasmuch as the reversal of the ratchet wheels 517 will occur when the speed of the spiderframes is less than half the speed of the sungears. This arrangement may be modified to suit any predetermined speed ratio of the corresponding differential transmission shafts. A sudden stopping of one of these transmission shafts would occur only in rare instances and would in all probability be preceded by an appreciable slowing down of this shaft. As soon as the speed ratio of the two transmission shafts reaches a predetermined minimum then, the adjustment of the transmission mechanism the next adequate combination of power units is automatically effected before the defective engine cuts out entirely.

The intermediate gearing whereby this is accomplished is shown in Fig. 30. It is understood that instead of the gears shown any other suitable transmission means may be employed.

Figure 33:
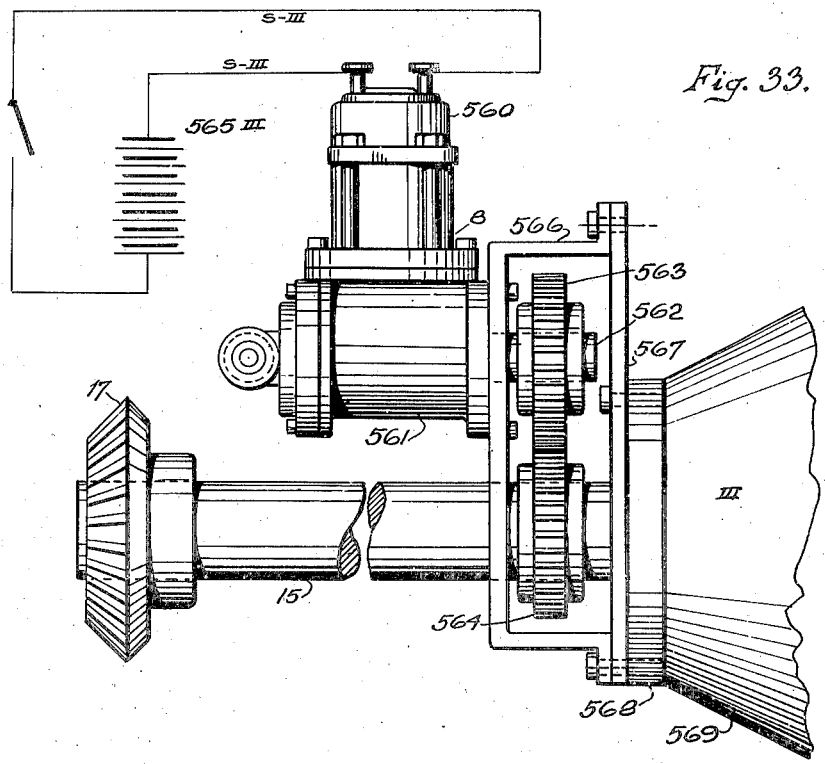
Fig. 33 shows a starter for a power unit mounted on the frame thereof.
Figure 34:
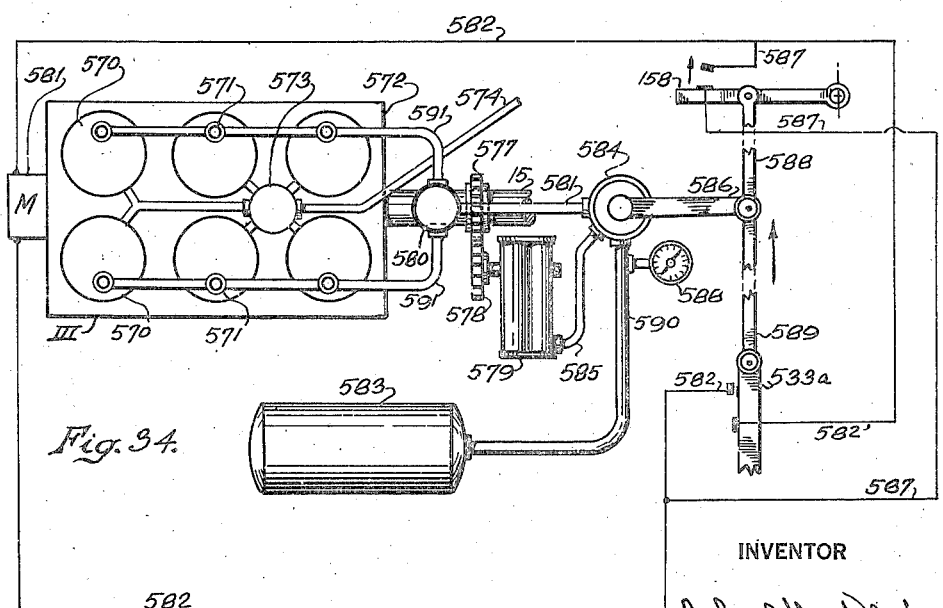
Fig. 34 shows a compressed air starter installation operated by the automatic clutch control and the manual control.

The means whereby the stopping and starting of the engines or power units is accomplished, either manually or automatically, is shown in Figs. 31, 33 and 34. The differential transmission enclosed in the housing 9 has the clutch levers $E^1$, $D^1$, $C^1$, $B^1$ and $A^1$, for the purpose hereinbefore described, in connection with the automatic reversing differentials $500^a$, there being one set of reversing differentials for each combinable set of clutch levers. Each set of reversing differentials has the reversable rotary members 517 and 519 which by suitable lever connections operate the movable members $533^a$ and $533^b$ respectively in the manner hereinbefore described and illustrated in Figs. 27, 28, 29 and 30.

The power units I, II, and III have the starting means 8 (I), 8 (II), and 8 (III) respectively and are provided with the magnetos M (I), M (II) and M (III). The starters may be of any available type, such as the electric inertia starter shown in Fig. 33, which has the housing 560 containing an electric motor actuated by the battery 565. This motor actuates a reduction gearing contained in the housing 561 which has the delivery shaft 562 revolving at a speed of from 30 to 40 R. P. M. The starter is mounted on the bracket 566 secured to the flanged member 567 which is fastened to the flange 568 of the fixed frame or crankcase 569 of the power unit. Suitable transmission means, such as the gear 563 on the starter shaft 562 meshing with the gear 564 on the power unit shaft 15, keeps the latter shaft in driven relation to the starter. Means are contained within the starter mechanism whereby the starter reduction gearing is automatically disengaged when the power unit shaft has attained a certain rotative speed under its own power.

Referring to Fig. 31, it is seen that the main circuits for the starters are shunted to the starting switches on the levers 158 of the clutch control in accordance with the combination of power units for which each of these levers is intended. The levers 158 are also provided with switches shunted to the main magneto circuits in combination similar to those of the starting switches. By moving the selected lever 158 the transmission clutches will be shifted and arranged in accordance with the desired combination of power units and simultaneously the corresponding starter- and magneto circuits will be closed. Should the new combination contain a power unit already in operation during the previous combination, the starter of this power unit will then of course not be put into operation, since the automatic disengaging mechanism is still effective. The magneto circuit for this power unit is already closed and the magneto will therefore not be affected.

In addition, magneto circuits and starter circuits are also shunted in desired combinations to the switches operated by the movable members $533^a$ and $533^b$ which are actuated by the automatic reversing differentials $500^a$. In order to avoid undue complication of the wiring diagram, complete wiring to the members 533ª has been shown only for the power unit combination I plus II, the reversing differential 500ª becoming operative when power unit II begins to function defectively to such extent as to make it necessary to throw this unit out of combination and to replace it with the reserve unit III. Through the action of the reversing differentials the member 533ª will be moved in the direction of the arrow, thus opening the switch for the shunt circuit M (II) which renders magneto M (II) inoperative and stops the defective power unit 11. The circuit S—II for starter 8 (II) will likewise be opened which will prevent the starter from commencing to operate the moment the rotative speed of the power unit shaft has decreased to less than 40 R. P. M. The shunt circuit S—III for starter 8 (III) is closed, as is also the shunt circuit for the magneto M (III) which puts power unit III in running condition. The switch for magneto M (I) remains closed, and the new combination of power units I+III has thus been automatically substituted for the previous combination I+II. A similar system of wiring has been applied to all movable members 533ª actuated by the corresponding reversing differentials, the switches for the magnetos and starters of the defective engines being opened, whilst the switches for the reserve power units are being closed, thus throwing the reserve unit or units into running combination. Suitable lever connections between the movable members 533ª and the corresponding clutch levers shift the clutches in position for the desired combination, whereby any reversal of the differential power delivery shaft is obviated. The operator should arrange the levers 158 for the new combination as soon as convenient, especially when no provision has been made for automatic reaction from the clutch levers to the control levers, such as shown in Fig. 34. Instead of an electric starter an air starting system may be employed as shown in Fig. 34. The power unit including the frame or crankcase 572 is provided with the magneto 581 in circuit 582 with the switch on lever 533ª actuated by the reversing differentials as hereinbefore described; the circuit 582 is shunted to the switch on lever 158. Levers 158 and 533ª have operating connections 588 and 589 respectively with the lever 586 controlling the three-way airvalve 584 which by the ducts 581, 585 and 590 communicates with the airstarter carburetor 580, the aircompressor 579 and the compressed-airtank 583 respectively, the airtank being provided with the pressure gauge 588. The aircompressor is actuated by transmission means such as the gears 578 on the compressor shaft meshing with gear 577 on the delivery shaft of the power unit. The starter carburetor 580 communicates by ducts 591 and the checkvalves 571 with the cylinders 570 of the power unit. Manual operation of the lever 158, or automatic shifting of the member 533ª, will turn the lever 586 of the air valve which permits a charge of compressed air and gas to be taken into the cylinders. When the power unit is fairly started and running under its own power the airstarter system is automatically thrown out of combination and its function replaced by that of the regular carburetor 573 which by duct 574 communicates with the fuel tank. By the switches on the levers 158 and 533ª the magneto circuit is closed as soon as the airvalve 584 is opened and the spark is cut by moving either one of those levers in a reverse direction. The lever 586 of the airvalve does not necessarily have to be operated by mechanical means as shown, but may be operated electrically if desired, in which case the wiring diagram will be similar to that shown in Fig. 31.

Having thus described my invention, I claim:

1. The combination of a plurality of power units, a plurality of concentrically mounted rotary shafts, driving means between said power units and said shafts, a compound differential gearing actuated by and co-operative with said shafts, a power delivery shaft actuated by said compound differential gearing, and means associated with said driving means and said rotary shafts for reversing the rotation of said power delivery shaft.

2. The combination of a plurality of power units, a plurality of concentrically mounted rotary shafts, driving means between said power units and said shafts, means for rendering said driving means operative or inoperative, a compound differential gearing actuated by and co-operative with said shafts, a power delivery shaft actuated by said compound differential gearing, and means co-operative with said second named means for reversing the rotation of said power delivery shaft.

3. The combination of a plurality of power units, a plurality of concentrically mounted rotary shafts, driving means between said power units and said shafts, means for rendering said driving means operative or inoperative, means for effecting driving relation between said shafts, a compound differential gearing actuated by and co-operative with said shafts, a power delivery shaft actuated by said compound differential gearing, and means for selectively operating said second and third named means whereby the rotation of the power delivery shaft is reversed.

4. In an automotive vehicle, the combination of a plurality of power units, a plurality of concentrically mounted rotary shafts, driving means between said power units and said shafts, means for rendering said driving means operative or inoperative, means for effecting driving relation between said shafts, a compound differential gearing actuated by and co-operative with said shafts, a power delivery shaft actuated by said compound differential gearing, propulsion means co-operative with said power delivery shaft, and means for selectively operating said second and third named means whereby the rotation of said power delivery shaft and said propulsion means is reversed.

5. In an automotive vehicle, a plurality of powerplants each capable of operating independently from the others, propulsion means capable of being adjusted to the amount of power transmitted, means for effecting driving relation between any of said powerplants and said propulsion means, means for effecting driving relation between a different selected combination of said powerplants and said propulsion means, and means controlled by said last-named means adjusting said propulsion means to the amount of power transmitted.

6. The combination of a plurality of powerplants, a plurality of concentrically mounted rotary shafts, driving means between said powerplants and said shafts, a compound differential gearing actuated by and co-operating with said shafts, and a power delivery shaft actuated by said compound differential gearing.

7. The combination of a plurality of powerplants, a plurality of concentrically mounted rotary shafts, driving means between said powerplants and said shafts, means for rendering said driving means operative, a compound differential gearing actuated by and co-operating with said shafts, and a power delivery shaft actuated by said compound differential gearing.

8. The combination of a plurality of powerplants, a plurality of concentrically mounted rotary shafts, driving means between said powerplants and said shafts, means for rendering said driving means operative, means for locking said shafts in simultaneous turning relation, a compound differential gearing actuated by and co-operative with said shafts, and a power delivery shaft actuated by said compound differential gearing.

9. The combination of a plurality of powerplants, a plurality of concentrically mounted rotary shafts, driving means between said powerplants and said shafts, means for rendering said driving means operative, means for locking said shafts in simultaneous turning relation, means for selectively operating said two last named means, a compound differential gearing actuated by and co-operative with said shafts, and a power delivery shaft actuated by said compound differential gearing.

10. The combination of a plurality of powerplants, with a power transmission device adapted to transmit the power of any combination of said powerplants, comprising a plurality of concentrically mounted rotary shafts, driving means between said powerplants and said shafts, means for rendering said driving means operative, means for locking said shafts in simultaneous turning relation, means for selectively operating said two last named means, a compound differential gearing actuated by and co-operative with said shafts, a power delivery shaft actuated by said compound differential gearing and a housing inclosing and supporting said transmission device.

11. The combination of a plurality of powerplants with a power transmission mechanism adapted to transmit the power of any combination of said powerplants, comprising a plurality of concentrically mounted rotary shafts, driving means between said powerplants and said shafts, means for rendering said driving means operative, means for locking said shafts in simultaneous turning relation, means for selectively operating said two last named means, a compound differential gearing actuated by and co-operative with said shafts, a power delivery shaft actuated by said compound differential gearing, a housing inclosing and supporting said transmission mechanism, a lubricating fluid contained in said housing, a device for cooling said lubricating fluid, and means for circulating said lubricating fluid through said cooling device.

12. The combination with a power transmission device of the kind described, including a plurality of driven shafts, driving means actuating said shafts, means for rendering said driving means operative, and means for effecting driving relation between said shafts; of mechanism for simultaneously operating said second and third named means.

13. The combination with a power transmission device of the kind described, including a plurality of driven shafts, driving means actuating said shafts, means for rendering said driving means operative or inoperative, and means for connecting or disconnecting said shafts in or out of simultaneous turning relation, of mechanism for selectively and simultaneously operating said second and third-named means.

14. The combination of a plurality of power units, and a power transmission device including a plurality of rotary shafts, driving means between said power units and said shafts, means for rendering said driving means operative or inoperative, means for connecting or disconnecting said shafts in or out of simultaneous turning relation, a compound differential gearing co-operating with said shafts, and a power delivery shaft actuated by said compound differential gearing, with mechanism for selectively and simultaneously operating said second- and third-named means whereby any of said power units are instantly thrown into or out of combination.

15. The combination of a plurality of driven shafts, driving means actuating said shafts, means for rendering said driving means operative, means for effecting driving relation between said shafts, lever means associated with said second- and third-named means, a movable member adapted to engage with said lever means, and means for moving said member into operating engagement with said lever means whereby said first and second named means are simultaneously operated.

16. The combination of a plurality of rotary shafts, driving means actuating said shafts, means for rendering said driving means operative or in-operative, means for effecting driving relation between said shafts, pivoted lever-means operably associated with said second- and third-named means, two movable members each adapted to engage with said pivoted lever-means, arranged at either side thereof, and means for moving said members simultaneously into operating engagement with said pivoted lever-means whereby said second- and third-named means are operated and said driving means and shafts connected or disconnected.

17. The combination of a plurality of rotary shafts, driving means for actuating said shafts, means for rendering said driving means operative or in-operative, means for effecting driving relation between any of said shafts, pivoted lever means operably associated with said two movable frames positioned one at each side of said pivoted lever means, a plurality of longitudinally disposed members, each of said members adapted to engage with a selected combination of pivoted lever means, means for arranging said movable frames whereby a member of each frame adapted to the selected combination is brought in alinement with said pivoted lever means, and means for simultaneously moving said frames whereby said alined members are brought into operating engagement with said pivoted lever means and said second and third named means operated in selected combination and direction.

18. The combination with a power transmission device of the kind described, including driving elements, driven elements and clutch means for effecting driving relation between any of said elements, of mechanism for selectively operating any of said clutch means simultaneously, said mechanism comprising: a plurality of pivoted levers operably connected with said clutch means, two rotary frames arranged at either side of said pivoted levers, each frame having a plurality of members adapted to engage with different combinations of said pivoted levers, means for rotatingly arranging said frames whereby a member of each frame adapted to the selected combination is brought in alinement with said pivoted levers, and means for shifting said rotary frames in the direction of their axis of rotation whereby said alined members are brought into actuating engagement with the corresponding pivoted levers, thereby operating said clutch means in selected combination and direction.

19. The combination with a power transmission device of the kind described, including driving elements, driven elements and clutch means for effecting driving relation between any of said elements, of mechanism for operating said clutch means in selected combination and direction, said mechanism comprising: a plurality of pivoted levers each having operating connection with the corresponding clutch means, two cylinder-like rotatable frames disposed at either side of said pivoted levers, each frame including a rotatable shaft, end frames concentrically mounted thereon, and longitudinally disposed members, each adapted to engage with a selected combination of said pivoted levers, associated with said end frames; means for rotatingly arranging said cylinder like frames whereby a member of each frame adapted to the selected combination is brought in alinement with said pivoted levers; and means for simultaneously shifting said frames in the direction of their axis of rotation whereby said alined longitudinal members are brought into actuating engagement with the corresponding pivoted levers and said clutch means operated in selected combination and direction.

20. The combination with a power transmission device of the kind described, including driving elements, driven elements, and means for effecting driving relation between any of said elements, of mechanism for selectively operating said means, said mechanism comprising: a plurality of pivoted levers operably connected with said means; two cylinder-like rotatable frames disposed at either side of said pivoted levers, each of said frames including a rotatable shaft, end frames disposed transversely thereto and concentrically mounted thereon, a plurality of longitudinally disposed members mounted in guided relation to said end frames and radially movable thereto, each of said longitudinal members being adapted to engage with a selected combination of said pivoted levers; means for rotatingly arranging said frames whereby a longitudinal member of each frame adapted to the selected combination is brought in alinement with said pivoted levers; means for shifting said longitudinal members radially outwardly in line of contact with said pivoted levers; and means for shifting said cylinder-like frames in the direction of their rotational axis whereby said alined longitudinal members are brought into actuating engagement with the corresponding pivoted levers and said first-named means operated in selected combination and direction.

21. The combination with a power transmission device having a plurality of power units, a plurality of rotary shafts, driving connections between said power units and said shafts, clutch-means co-operative with said shafts for rendering said driving connections selectively operative or in-operative, clutch-means for effecting driving relation between any of said shafts, a compound differential gearing actuated by and co-operative with said shafts, and a power delivery shaft actuated by said compound differential gearing, of mechanism for operating any of said clutch means in selected combination and direction whereby any of said power units can be thrown into or out of combination, said mechanism comprising: a plurality of pivoted lever-means operably connected with said clutch-means, two movable frames arranged at either side of said pivoted lever means, each frame having a plurality of longitudinally disposed members, each adapted to engage with a selected combination of said pivoted lever-means, means for arranging said frames whereby a member of each frame adapted to the selected combination is brought in alinement with said pivoted lever-means, and means for shifting said frames whereby said alined members are brought into actuating engagement with the selected pivoted lever-means and said clutch-means operated in selected combination and direction.

22. The combination with a power transmission device of the kind described, including driving elements, driven elements, and means for effecting driving relation between any of said elements, of mechanism for operating said means in any selected combination and direction, said mechanism comprising: a plurality of pivoted lever means operably connected with said first-named means, two cylinder-like rotatable frames disposed at either side of said pivoted lever means, end frames comprising a rotatable sleeve shaft, end-frames concentrically mounted thereon, a plurality of longitudinally disposed members in guided relation associated with said end-frames and radially movable thereto, each longitudinal member being adapted to engage with a selected combination of said pivoted levers, a shaft slidable in and turnable with said sleeve shaft, and lever means operably connecting said slidable shaft with said longitudinal members; means for rotatively arranging said cylinder-like frames whereby a longitudinal member of each frame is brought in alinement with said pivoted lever means; means for moving said slidable shafts in the direction of their axis whereby said longitudinal members are shifted outward in line of contact with said pivoted lever means; and means for shifting said frames and longitudinal members in the direction of their rotational axis whereby the alined longitudinal members are brought into actuating engagement with the selected pivoted lever-means and said first-named means operated in selected combination and direction.

23. The combination with a power transmission device of the kind described, including driving elements, driven elements and means for effecting driving relation between any of said elements, of mechanism for operating any of said means in selected combination and direction, said mechanism comprising: a plurality of pivoted levers operably connected with said means, two cylinder-like rotatable frames disposed at either side of said pivoted levers, each frame comprising a rotatable slotted sleeve shaft, end-frames disposed transversely thereto and concentrically mounted thereon, each end-frame being provided with radially disposed guide members, a plurality of longitudinally disposed members, each adapted to engage with a selected combination of said pivoted levers slidably received in said radially disposed guide members, a shaft slidable in and turnable with said sleeve shaft provided with lugs extending outward through the slots in the sleeve shaft in guided relation thereto, annular members associated with said lugs encompassing said sleeve shaft, lever connections between said longitudinal members and said annular members, and brackets fixedly mounted onto said sleeve shaft and end-frames in which said lever connections are mounted; means for rotatingly arranging said cylinder-like frames whereby a longitudinal member of each frame adapted to the selected combination is brought in alinement with said pivoted levers; and means for shifting said cylinder-like frames along their rotational axis whereby said alined longitudinal members are brought into actuating engagement with said pivoted levers and said first-named means operated in selected combination and direction.

24. The combination with a power transmission device of the kind described, including driving elements, driven elements, and means for effecting driving relation between any of said elements, of mechanism for operating said means in selected combination and direction, said mechanism comprising: a plurality of pivoted levers operably connected with said means, two cylinder-like rotatable frames disposed at either side of said pivoted levers, each frame including a rotatable shaft, end-frames concentrically mounted on said shaft, and a plurality of longitudinal members each adapted to engage with a selected combination of said pivoted levers; and means for rotatively arranging said cylinder-like frames whereby a longitudinal member of each frame adapted to the selected combination is brought in alinement with said pivoted levers, such means comprising: a rotatable master shaft, transmission means cooperative with said master shaft and with the shafts of said cylinder-like frames, and means for arresting the rotation of said master shaft on alinement of said selected longitudinal members with said pivoted levers.

25. The combination with a power transmission device of the kind described, including driving elements, driven elements and means for effecting driving relation between any of said elements, of mechanism for operating said means in selected combination and direction, said mechanism comprising: a plurality of pivoted levers operably connected with said means, two cylinder-like rotatable frames arranged at either side of said levers, each frame including a rotatable sleeve shaft, end-frames concentrically mounted thereon, a plurality of longitudinally disposed members, each adapted to engage with a selected combination of said pivoted levers, a shaft slidable in and turnable with said sleeve shaft, and lever means operably connecting said slidable shaft with said longitudinal members; means for rotating said cylinder-like frames whereby a longitudinal member of each frame adapted to the selected combination is brought in alinement with said pivoted levers, such means comprising: a rotatable master shaft, transmission means co-operative with said master shaft and said sleeve shafts, and means for arresting the rotation of said master shaft on alinement of said selected longitudinal members with said pivoted levers; means co-operative with said master shaft for moving said slidable shafts whereby said longitudinal members are moved outwardly in line of contact with said pivoted levers; and means co-operative with said master shaft for shifting said cylinder-like frames along their rotational axis whereby said longitudinal members are brought into operating contact with said pivoted levers and said first-named means operated in selected combination and direction.

26. The combination with a power transmission device of the kind described including driving elements, driven elements and means for effecting driving relation between any of said elements, of mechanism for operating said means in selected combination and direction, said mechanism comprising: a plurality of pivoted levers operably connected with said means, two cylinder-like rotatable frames arranged at either side of said pivoted levers, each frame including a rotary shaft, side frames concentrically mounted on said shaft and a plurality of longitudinally disposed members associated with said end frames, each of said longitudinal members being adapted to engage with a selected combination of said pivoted levers; means for simultaneously rotating said cylinder-like frames, said means comprising a rotatable master shaft, transmission means co-operative with said master shaft and the shafts of said cylinder-like frames; and means for selectively arresting the rotation of said master shaft and cylinder-like frames when a member of each frame adapted to the selected combination has been brought in alinement with said pivoted levers, said means comprising: a rotary body actuated by and co-operative with said master shaft, said rotary body, having a plurality of sockets arranged at progressively increasing radial distances from the center and in an angular sequence, corresponding to the angular sequence of the longitudinal members in each frame, a plurality of manipulable stop pins arranged in alinement with the rotational track of said sockets, lever means resiliently associated with each stop pin for urging the said stop pin in contact with the rotary body, and resilient means automatically urging the stop pin into the corresponding socket on alinement therewith, whereby the rotation of said rotary body, master shaft and cylinder-like frames is arrested.

27. A plurality of power units, starting means for each of said power units, a power delivery shaft, differential transmission means adapted to transmit the power of any of said power units, to said power delivery shaft, means for selectively controlling said differential transmission means whereby any of said power units can be thrown in or out of the combination, automatic means co-operative with said differential transmission means whereby any defectively operating power unit is thrown out of combination, and means co-operative with said selective controlling means controlling said starting means.

28. In an automotive vehicle, a plurality of power units, starting means for each of said power units, a power delivery shaft, differential transmission means adapted to transmit the power of any of said power units to said power delivery shaft, propulsion means in driven relation to said power delivery shaft, means for selectively controlling said differential transmission means whereby any of said power units can be thrown in or out of combination, means selectively reversing said propulsion means, and means co-operative with said third-named means controlling said starting means.

29. In an automotive vehicle, a plurality of power units, starting means for each of said power units, a power delivery shaft, differential transmission means adapted to transmit the power of any of said power units to said power delivery shaft, propulsion means in driven relation to said power delivery shaft, means for selectively controlling said differential transmission means whereby any of said power units can be thrown in or out of combination, means selectively reversing said propulsion means, automatic means co-operative with said differential transmission means whereby any defectively operating power unit is thrown out of combination, and means co-operative with said fourth-named means controlling said starting means.

30. In an automotive vehicle, a plurality of power units, a power delivery shaft, differential transmission means adapted to transmit the power of any of said power units to said power-delivery shaft, adjustable propulsion means in driven relation to said power delivery shaft, means selectively controlling said differential transmission means whereby any of said power units can be thrown in or out of combination, and means co-operative with said last-named means adjusting said propulsion means to the power transmitted.

31. In an automotive vehicle, a plurality of power units, a power delivery shaft, differential transmission means adapted to transmit the power of any of said power units to said power delivery shaft, adjustable propulsion means in driven relation to said power delivery shaft, means selectively controlling said differential transmission means whereby any of said power units can be thrown in or out of combination, automatic means co-operative with said differential transmission means whereby any defectively operating power unit is thrown out of combination, and means co-operative with said two last-named means adjusting said propulsion means to the power delivered.

32. In an automotive vehicle, a plurality of power units, starting means for each of said power units, a power delivery shaft, differential transmission means adapted to transmit the power of any of said power units to said power delivery shaft, adjustable propulsion means in driven relation to said power delivery shaft, means selectively controlling said differential transmission means whereby any of said power units can be thrown in or out of combination, means co-operative with said selectively controlling means controlling said starting means, automatic means co-operative with said differential transmission means whereby any defectively operating power unit is thrown out of combination and means co-operative with said three last-named means adjusting said propulsion means to the power delivered.

33. In an automotive vehicle, a plurality of power units, starting means for each of said power units, a power delivery shaft, differential transmission means adapted to transmit the power of any of said power units to said power delivery shaft, adjustable propulsion means in driven relation to said power delivery shaft, means selectively controlling said differential transmission means whereby any of said power units can be thrown in or out of combination, means controlling said differential transmission means whereby said adjustable propulsion means are reversed, means co-operative with said selectively controlling means controlling said starting means, automatic means co-operative with said differential transmission means whereby any defectively operating power unit is thrown out of combination and means co-operative with said controlling and reversing means automatically adjusting said propulsion means to the power delivered.

34. A plurality of power units, a power delivery shaft, differential transmission means adapted to transmit the power of any of said power units to said power delivery shaft, starting means associated with each of said power units respectively and with said differential transmission means, and means for selectively controlling said differential transmission means whereby any of said power units can be thrown into or out of combination.

35. In an automotive vehicle, the combination of a plurality of power units, a power delivery shaft, differential transmission means adapted to transmit the power of any of said power units to said power delivery shaft, starting means associated with each of said power units and said differential transmission means, propulsion means in driven relation to said power delivery shaft, and means for selectively controlling said differential transmission means whereby any of said power units can be thrown into or out of combination.

36. A plurality of power units, a power delivery shaft, differential transmission means adapted to transmit the power of any of said power units to said power delivery shaft, starting means associated with each of said power units and said differential transmission means, means for selectively controlling said differential transmission means whereby any of said power units can be thrown into or out of combination, and means co-operative with and actuated by said differential transmission means whereby any defectively operating power unit is automatically thrown out of combination.

37. The combination with a rotary shaft, of a propeller comprising a hub detachably mounted on and turnable with said rotary shaft, propeller-blades having shanks slidably received in said hub, means holding said blades and shanks against axial rotation, a housing in axial alinement with said rotary shaft, and means anchoring said shanks in said housing whereby the propeller-blades are held against radial displacement.

38. The combination with a rotary shaft, of a propeller comprising a hub detachably mounted on and turnable with said rotary shaft, propeller blades having shanks slidably received in said hub, means holding said shanks against axial rotation, members in positive connection with and axially alined with said shanks, a housing in axial alinement with said rotary shaft, and means anchoring said members in said housing whereby said propeller-blades and shanks are held against radial displacement.

39. In an automotive vehicle, the combination of a plurality of power units, a power delivery shaft, differential transmission means adapted to transmit the power of any of said power units to said power delivery shaft, starting means associated with each of said power units and said differential transmission means, means for selectively controlling said differential transmission means whereby any of said power units can be thrown into or out of combination, adjustable propulsion means in driven relation associated with said power delivery shaft, and means co-operative with said controlling means adjusting said propulsion means to the power delivered.

40. In an automotive vehicle, the combination of a plurality of power units, a power delivery shaft, differential transmission means adapted to transmit the power of any of said power units to said power delivery shaft, starting means associated with each of said power units and said transmission means, means for selectively controlling said differential transmission means whereby any of said power units can be thrown into or out of combination, means co-operative with and actuated by said differential transmission means whereby any defectively functioning power unit is automatically thrown out of combination, adjustable propulsion means in driven relation associated with said power delivery shaft, and means co-operative with said controlling means and with said automatic means adjusting said propulsion means to the power delivered.

41. The combination with a rotary shaft, of a propeller comprising a plurality of blades in radial relation to said rotary shaft, means mounted on and turnable with said shaft receiving said blades and holding them against centrifugal and thrust forces, and means separate and distinct from said first-named means and in independent relation to said rotary shaft holding said blades against centripetal forces, both of said means including ball bearings.

42. The combination with a rotary shaft, of a propeller comprising a hub including a frontal portion concentric with and having splined mounting on said rotary shaft, and a rear portion concentric with said rotary shaft detachably secured to said frontal portion, propeller blades having shanks slidably received in said hub, means associated with said shanks and hub holding said propeller blades against rotation about their radial axis, a housing concentric with said rotary shaft, and means in positive connection with said shanks anchoring said shank to said housing whereby said propeller-blades are held against radial displacement.

43. The combination with a rotary shaft, of a propeller comprising a hub including a frontal portion concentric with and having splined mounting on said rotary shaft, and a rear portion concentric with said rotary shaft detachably secured to said frontal portion, means for locking said frontal portion in fixed relation to said rotary shaft, propeller blades having shanks slidably received in said hub, means associated with said shanks and hub holding said propeller-blades against axial rotation, members in positive connection and in axial alinement with said shanks, a housing concentric with said rotary shaft and means detachably anchoring said members in said housing whereby said propeller blades are held against radial displacement.

44. The combination with a rotary shaft, of a propeller comprising a plurality of blades provided with shanks forming the radially inner portions thereof, a hub detachably mounted on and turnable with said rotary shaft adapted to slidably receive said shanks, means associated with said hub holding said shanks and blades against rotation about their radial axes, a housing concentric with said rotary shaft, and means anchoring said shanks in said housing whereby said shanks and propeller blades are held against radial displacement.

45. The combination with a rotary shaft, of a propeller comprising a plurality of blades provided with shanks forming the radially inner portions thereof, a hub detachably mounted on and turnable with said rotary shaft adapted to slidably receive said shanks, means associated with said hub holding said shanks and propeller blades against rotation about their radial axes, a housing concentric with said shaft and in inherently movable relation thereto, members in positive connection with said shanks, and means anchoring said members in said housing whereby said propeller blades are held against radial displacement.

46. The combination with a rotary shaft of a propeller comprising a hub detachably mounted on and turnable with said rotary shaft, a pair of radially opposed propeller blades, each blade being provided with a shank forming the radially inner portion thereof slidably received in said hub, and means connecting said shanks whereby said propeller blades are rotationally mutually balanced by centrifugal force.

47. The combination with a rotary shaft, of a propeller comprising a plurality of blades, each blade integrally provided with a shank forming the radially inner portion thereof, a hub mounted on and turnable with said shaft adapted to slidably receive said shanks, means associated with said hub holding said shanks and blades against rotation about their radial axes, and means connecting said shanks whereby said propeller blades are mutually balanced by centrifugal force.

48. The combination with a rotary shaft, of a propeller comprising a plurality of blades, each blade provided with a shank forming the radially inner portion thereof, a hub mounted on and turnable with said shaft adapted to slidably receive said shanks, means associated with said hub holding said shanks and blades against rotation about their radial axes, a member in axial alinement with said rotary shaft and in inherently movable relation thereto, and means anchoring said shanks to said member whereby said propeller blades are mutually balanced by centrifugal force.

49. The combination with a rotary shaft, of a variable-incidence propeller comprising a hub mounted on and turnable with said rotary shaft, propeller blades having shanks rotatably received in said hub, gear means co-operative with said shanks for axially rotating said propeller blades whereby their angle of incidence is varied, and gear means selectively actuated by said rotary shaft for driving said first-named gear means, said second named gear means being concentric with said rotary shaft.

50. In a propeller-driven vehicle, the combination with a rotary shaft, of a variable-incidence propeller comprising a hub mounted on and turnable with said rotary shaft, propeller blades having shanks rotatably received in said hub, gear means co-operative with said shanks for axially rotating said propeller blades whereby their angle of incidence is varied, means including gearing concentric with and actuated by said rotary shaft for driving said first-named means, and means operable in said vehicle controlling said second-named means.

51. The combination with a rotary shaft, of a variable-diameter propeller comprising a hub mounted on and turnable with said rotary shaft, propeller blades having shanks slidably received in said hub and means including gearing concentric with and actuated by said rotary shaft for radially displacing said propeller blades.

52. The combination with a rotary shaft, of a propeller comprising a hub mounted on and turnable with said rotary shaft, propeller blades having shanks slidably received in said hub, a housing concentric with said rotary shaft, means anchoring said shanks in said housing whereby said propeller blades are held against spontaneous radial displacement, and means associated with said shanks and actuated by said rotary shaft for moving said propeller blades radially inward or outward.

53. The combination with a rotary shaft, of a propeller comprising a hub mounted on and turnable with said rotary shaft, propeller blades having shanks slidably received in said hub, means associated with said shanks and said hub holding said propeller blades against axial rotation, a housing concentric with said rotary shaft, means anchoring said shanks in said housing whereby said propeller blades are held against spontaneous radial displacement, and means associated with said shanks and actuated by said rotary shaft for selectively moving said propeller blades inward or outward.

54. The combination with a rotary shaft, of a variable-diameter propeller comprising a hub mounted on and turnable with said rotary shaft, propeller-blades having shanks slidably received in said hub, means associated with said shanks and said hub for holding said propeller blades against axial rotation, a housing concentric with said rotary shaft, members axially alined with and in rotatable threaded engagement with said shanks, means rotatably anchoring said members in said housing whereby said propeller-blades are held in mutually balanced relation against spontaneous radial displacement, gear means mounted on said members, gear means rotatably mounted on said rotary shaft co-operative with said first-named gear means, and means co-operative with said rotary shaft for actuating said second named gear means whereby the propeller blades are selectively moved radially inward or outward.

55. The combination with a rotary shaft, of a variable diameter propeller comprising a hub mounted on and turnable with said shaft, propeller-blades having shanks slidably received in said hub, radial guiding means associated with said hub and said shanks holding said propeller blades against axial rotation, members axially alined with and in rotatable threaded engagement with said shanks, means rotatably anchoring said members in said housing whereby said propeller-blades are held in mutually balanced relation against spontaneous radial displacement, gear means mounted on said members, gear means rotatably mounted on said rotary shaft co-operative with said first-named gear means, and gear means actuated by said rotary shaft in driving relation to said second named gear means whereby said propeller blades can be selectively moved inward or outward.

56. In a propeller-driven vehicle, the combination with a rotary shaft, of a variable diameter propeller comprising a hub including a frontal portion concentric with and in splined relation mounted on said rotary shaft and a rear portion in concentric relation to said rotary shaft detachably attached to said frontal portion, means for locking said frontal portion in fixed relation with said rotary shaft, propeller blades having shanks slidably received in said hub, radially diverging guiding means associated with said shanks and said hub for holding said propeller blades against axial rotation, members axially alined with and in rotatable threaded engagement with said shanks, a housing concentrically encompassing said rotary shaft, means rotatably anchoring said members in said housing whereby said propeller blades are held in mutually balanced relation against spontaneous radial displacement, rotary transmission means co-operative with said members, rotary transmission means rotatably mounted on said rotary shaft in driving relation to said first-named rotary transmission means, and means for effecting driving relation between said shaft and said last-named transmission means whereby said propeller-blades can be selectively moved radially inward or outward.

57. A rotary shaft, a propeller mounted thereon including radially movable blades, and means including gearing concentric with and actuated by said rotary shaft for selectively moving said blades radially inward or outward.

58. The combination with a rotary shaft, of a variable-incidence and variable-diameter propeller, comprising a hub mounted on and turnable with said shaft, propeller blades having shanks slidably and rotatably received in said hub, a housing concentrically encompassing said rotary shaft, means anchoring said shanks in said housing whereby said propeller blades are held in mutually balanced relation against spontaneous radial displacement, means actuated by said rotary shaft for selectively moving said propeller blades radially inward or outward whereby the diameter of the propeller is varied, and means co-operative with said last-named means turning said propeller blades around their radial axes whereby the angle of incidence of said blades is varied.

59. The combination of a plurality of power units, a plurality of rotary shafts, driving means between said power units and said shafts, means for rendering said driving means operative, means for locking said shafts in simultaneous turning relation, a compound differential gearing actuated by and co-operative with said shafts, and a power delivery shaft actuated by said compound differential gearing.

60. The combination of a plurality of power units, a plurality of rotary shafts, driving means between said power units and said shafts, means for rendering said driving means operative, means for locking said shafts in simultaneous turning relation, means for selectively operating said two last named means, a compound differential gearing actuated by and co-operative with said shafts, and a power delivery shaft actuated by said compound differential gearing.

61. The combination of three independently functionable power-units, three rotary shafts, driving means between said power-units and the corresponding rotary shafts, orbit gears in driven relation to and co-operative with said shafts, planet gears co-operative with said orbit gears, a power delivery shaft, and driving means between one of said orbit gears and said power-delivery shaft.

62. The combination of three independently functionable power-units, three rotary shafts, a power delivery shaft, driving means between said power units and the corresponding rotary shafts, means for selectively rendering any of said driving means operative, orbit gears in driven relation to and co-operative with said shafts, planet gears co-operative with said orbit gears, and driving means between one of said orbit gears and said power-delivery shaft.

63. The combination of three independently functionable power units, three rotary shafts, a power delivery shaft, driving means between said power units and the corresponding rotary shafts, means for selectively rendering any of said driving means operative, means for selectively locking any of said rotary shafts together in simultaneous turning relation, orbit gears in driven relation to and co-operative with said rotary shafts, planet gears co-operative with said orbit gears, and driving means between one of said orbit gears and said power-delivery shaft.

64. The combination of three independently functionable power units, a power-delivery shaft, three rotary shafts, driving means between said power units and the corresponding rotary shafts, means for selectively rendering any of said driving means operative, means for selectively locking any of said rotary shafts together in simultaneous turning relation, means for selectively operating said two last-named means, orbit gears in driven relation to and co-operative with said rotary shafts, planet gears co-operative with said orbit gears, and driving means between one of said orbit gears and said power-delivery shaft.

65. The combination of three independently functionable power-units, a power-delivery shaft, and a transmission mechanism adapted to transmit the combined power of said independently functionable power-units to said power-delivery shaft, said transmission mechanism comprising: three concentrically mounted rotary shafts, driving means between said shafts and the corresponding power units respectively, two opposedly arranged orbit gears mounted on the first and second rotary shaft respectively, a train of planet gears co-operative with said orbit gears, a third orbit gear mounted on the third rotary shaft, a fourth orbit gear of like characteristics mounted opposedly to said third orbit gear, a train of planet gears co-operative with said third- and fourth-named orbit gears, a rotary spider-frame in which both trains of planet gears are journaled, and driving connection between said fourth orbit gear and said power delivery shaft.

66. The combination of three independently functionable power units, a power delivery shaft, and a transmission device adapted to transmit the power of any of said independently functionable power units to said power-delivery shaft, said transmission device comprising: three concentrically mounted rotary shafts, driving means between each of said shafts and said power units respectively, means for selectively rendering any of said driving means operative, means selectively locking any of said rotary shafts in simultaneous turning relation, two opposedly arranged orbit gears mounted on the first and second rotary shaft respectively, a train of planet gears co-operative with said pair of orbit gears, an orbit gear mounted on the third rotary shaft, an orbit gear of like characteristics opposedly mounted to said third named orbit gear, a train of planet gears co-operative with said third- and fourth-named orbit gears, a rotary spider-frame in which all said planet gears are journaled, and driving connection between said fourth named orbit gear and said power delivery shaft.

67. The combination of three independently functionable power-units a power-delivery shaft, and a transmission mechanism adapted to transmit the combined power of said independently functionable power-units to said power delivery shaft, said mechanism comprising: three rotary shafts, driving means between said power units and said rotary shafts respectively, two opposed orbit gears in driven relation to and co-operative with two of the corresponding rotary shafts, a train of planet gears co-operative with said orbit gears, a rotary frame in which said planet gears are journaled, a third orbit gear in driven relation to and co-operative with the third rotary shaft, an orbit gear in driving relation to said power-delivery shaft, a train of planet gears co-operative with said third- and fourth-named orbit gears, a rotary frame in which said last-named planet gears are journaled, and driving connection between said first and second named rotary frames.

68. The combination of three independently functionable power units, a power-delivery shaft, and a transmission mechanism adapted to transmit the power of any of said power-units to said power-delivery shaft, said transmission mechanism comprising: three rotary shafts, driving means between said power units and the corresponding rotary shafts, means for selectively rendering any of said driving means operative, means for selectively locking any of said rotary shafts together in simultaneous turning relation, two opposed orbit gears in driven relation to and co-operative with two of said shafts respectively, a train of planet gears co-operative with said orbit gears, a rotary spider-frame in which said planet gears are journaled, a third orbit gear in driven relation to and co-operative with the third rotary shaft, a fourth orbit gear in driving relation to said power delivery shaft, a train of planet gears co-operative with said third and fourth orbit gears, a rotary frame in which said last-named planet gears are journaled, and driving connection between said spider frame and last-named rotary frame.

69. The combination of three independently functionable power-units, a power-delivery shaft, and a differential transmission device adapted to transmit the combined power of said independently functionable power units to said power-delivery shaft, said transmission device comprising: three concentrically mounted rotary shafts, driving means between each of said shafts and said power units respectively, two opposed orbit gears mounted on the first and second rotary shaft respectively, a train of planet gears co-operative with said orbit gears, a rotary frame in which said planet gears are journaled, a third orbit gear journaled on the third rotary shaft, a fourth orbit gear mounted on said third shaft in opposed relation to said third orbit gear, a train of planet gears co-operative with said third- and fourth-named orbit gears, a rotary frame in which said last named planet gears are journaled, driving connection between said first-named rotary frame and said third orbit gear, and driving connection between said second-named rotary frame and said power-delivery shaft.

70. The combination of three independently functionable power-units, a power-delivery shaft, and a differential transmission device adapted to transmit the power of any of said power units to said power delivery shaft, said transmission device comprising: three concentrically mounted rotary shafts, driving means between each of said shafts and said power-units respectively, means selectively rendering any of said driving means operative, means selectively locking any of said rotary shafts together in simultaneous turning relation, two opposed orbit gears mounted on the first and second rotary shaft respectively, a train of planet gears co-operative with said orbit gears, a rotary frame in which said planet gears are journaled, an orbit gear journaled on the third rotary shaft, a fourth orbit gear mounted on said third rotary shaft and turnable therewith, a train of planet gears co-operative with said third- and fourth-named orbit gears, a rotary frame in which said last-named planet gears are journaled, driving connection between said first-named rotary frame and said third orbit gear, and driving connection between said second rotary frame and said power-delivery shaft.

71. The combination of a plurality of independently functionable power units, a power delivery shaft, and a differential transmission mechanism adapted to transmit the combined power of said independently functionable power units to said power delivery shaft, said transmission mechanism comprising: a plurality of rotary shafts, driving means between said power units and said rotary shafts respectively, a pair opposedly disposed orbit gears in driven relation to two of said shafts respectively, a train of planet gears co-operative with said orbit gears, a rotary spider-frame in which said planet gears are journaled, orbit gears in driven relation to each of the other rotary shafts, orbit gears opposedly disposed to each of said last named orbit gears, planet gears co-operative with each serial pair of orbit gears, rotary spider-frames in which said planet gears are journaled, driving connection between each rotary frame and the orbit gear next in sequence, and driving means between the serially last rotary frame and the power-delivery shaft.

72. The combination of a plurality of power-units, a power-delivery shaft, and a differential transmission device adapted to transmit the power of any of said power units to said power-delivery shaft, said power transmission device comprising: a plurality of rotary shafts, driving means between said power units and said rotary shaft respectively, means for selectively rendering any of said driving means operative, means for selectively locking any of said rotary shafts in simultaneous turning relation, a pair opposedly disposed orbit gears in driven relation to two of said rotary shafts respectively, a train of planet gears co-operative with said orbit gears, a rotary spider-frame in which said planet gears are journaled, orbit gears in driven relation to each of the other rotary shafts respectively, orbit gears opposedly disposed to each of said last named orbit gears, planet gears co-operative with each serial pair of orbit gears, rotary spider-frames for each serial pair of orbit gears wherein said planet gears are journaled, driving connection between each rotary spider-frame and the orbit gear next in sequence, and driving connection between the serially last rotary spider-frame and said power-delivery shaft.

73. The combination of a plurality of independently functionable power units, a power-delivery shaft, and a differential transmission device adapted to transmit the combined power of said power units to said power-delivery shaft, said transmission device comprising: a plurality of concentrically mounted rotary shafts, driving means between said shafts and said power units respectively, opposedly disposed orbit gears mounted on two of said shafts, and turnable therewith, a train of planet gears co-operative with said orbit gears, a rotary spider-frame in which said planet gears are journaled, orbit gears mounted on each of the other rotary shafts and turnable therewith, orbit gears opposedly disposed to said last named orbit gears journaled on said other rotary shafts, planet gears co-operative with each serial pair of orbit gears, rotary spider-frames in which said planet gears are journaled, driving connection between each rotary frame and the freely journaled orbit gear next in sequence, and driving connection between the serially last rotary frame and the power delivery shaft.

74. The combination of a plurality of independently functionable power units, a power delivery shaft, and a differential transmission device adapted to transmit the power of any of said power units to said power delivery shaft, said transmission device comprising: a plurality of concentrically mounted rotary shafts, driving connections between said power units and said shafts respectively, means for selectively rendering any of said driving connections operative or in-operative, means for selectively locking any of said rotary shafts together in simultaneous turning relation, two orbit gears in opposed relation mounted on two of said rotary shafts respectively, a train of planet gears co-operative with said orbit gears, a rotary spider frame in which said planet gears are journaled, orbit gears fixedly mounted on each of the other rotary shafts respectively, orbit gears opposedly disposed to said last named orbit gears journaled on said rotary shafts, planet gears co-operative with each serial pair of orbit gears, rotary spider frames in which said planet gears are journaled, driving connection between each rotary spider frame and the freely journaled orbit gear next in sequence, and driving connection between the serially last rotary spider frame and said power delivery shaft.

75. The combination of two independently functionable power-units, a power delivery shaft, and a differential transmission device adapted to transmit the combined power of said power units to said power delivery shaft, said transmission device comprising: two rotary shafts, driving means between said shafts and said power-units respectively, a pair of opposedly disposed orbit gears in driven relation to said rotary shafts respectively, a train of planet gears co-operative with said orbit gears, a rotary spider frame in which said planet gears are journaled, and driving connection between said rotary spider frame and said power delivery shaft.

76. The combination of two independently functionable power-units, a power-delivery shaft and a differential transmission device adapted to transmit the power of any of said power-units to said power delivery shaft, said transmission device comprising: two rotary shafts, driving connection between said power units and said shafts respectively, means for selectively rendering any of said driving means operative or inoperative, means for selectively locking said rotary shafts together in simultaneous turning relation, a pair of opposedly disposed orbit gears in driven relation to said rotary shafts respectively, a train of planet gears co-operative with said orbit gears, a rotary spider-frame in which said planet gears are mounted, and driving connection between said rotary spider-frame and said power-delivery shaft.

77. The combination of two independently functionable power units, a power delivery shaft, and a differential transmission device adapted to transmit the combined power of said power-units to said power-delivery shaft, said transmission device comprising: two concentrically mounted rotary shafts, driving connection between said power-units and said rotary shafts respectively, a pair of opposedly disposed orbit gears fixedly mounted on said rotary shafts respectively, a train of planet gears co-operative with said orbit gears, a rotary spider-frame in which said planet gears are journaled, and driving connection between said rotary spider-frame and said power-delivery shaft.

78. The combination of two independently functionable power units, a power delivery shaft, and a differential transmission device adapted to transmit the power of any of said power units to said power delivery shaft, said transmission device comprising: two concentrically mounted rotary shafts, driving means between said power units and said rotary shafts, means for selectively rendering any of said driving means operative or inoperative, means for selectively locking said rotary shafts together in simultaneous turning relation, a pair of opposedly disposed orbit gears fixedly mounted on said rotary shafts respectively, a train of planet gears co-operable with said orbit gears, a rotary spider-frame in which said planet gears are journaled, and driving connection between said rotary spider frame and said power delivery shaft.

79. The combination of two rotary shafts, a rotary member in driven relation to said rotary shafts, and means actuated by said shafts for reversing the rotation of said rotary member when the relative rotative speeds of said rotary shafts attain a predetermined ratio.

80. The combination of two rotary shafts, driving means for each of said shafts, means for rendering said driving means operative or in-operative, automatic means co-active with and actuated by said rotary shafts operating said second named means, said automatic means being operable only when the relative rotative speeds of said rotary shafts attain a predetermined ratio, said automatic means including differential gearing.

81. The combination of two rotary shafts, means for effecting simultaneous turning relation between said shafts, means co-active with and actuated by said shafts for automatically operating said first-named means, said automatic means becoming operable only when the relative rotative speeds of said rotary shafts attain a predetermined ratio, said automatic means including differential gearing.

82. The combination of two rotary shafts, driving means for each of said shafts, means for rendering said driving means selectively operative or inoperative, means for effecting simultaneous turning relation between said shafts, and means co-operative with and actuated by said shafts for operating said second- and third-named means when the relative rotative speeds of said rotary shafts attain a predetermined ratio.

83. The combination of two independently functionable power-units, two rotary shafts, driving connections between said power units and said rotary shafts respectively, means for rendering said driving means operative or inoperative, a power-delivery shaft, driving means between said rotary shafts and said power-delivery shaft, and means co-operative with and actuated by said rotary shafts for operating said second named means when the relative rotative speeds of said rotary shafts attain a predetermined ratio.

84. The combination of two independently functionable power-units, two rotary shafts, driving means between said power-units and rotary shafts respectively, means for rendering said driving means operative or inoperative, differential gearing co-operative with and actuated by said rotary shafts, a power-delivery shaft actuated by said differential gearing, and means co-operative with and actuated by said rotary shafts for operating said second-named means when the relative rotative speeds of said rotary shafts attain a predetermined ratio.

85. The combination of two independently functionable power-units, two rotary shafts in driven relation to said power-units respectively, differential gearing co-operative with and actuated by said rotary shafts, a power delivery shaft actuated by said differential gearing, and means co-operative with and actuated by said rotary shafts for throwing any of said power-units into or out of combination when the relative rotative speeds of said rotary shafts attain a predetermined ratio.

86. The combination of two independently functionable power-units, two rotary shafts, driving means between said power units and said rotary shafts respectively, means for rendering said driving means operative or inoperative, means for effecting simultaneous turning relation between said rotary shafts, differential gearing co-operative with and actuated by said rotary shafts, a power delivery shaft actuated by said differential gearing, and means co-operative with and actuated by said rotary shafts for operating said second- and third-named means whereby any of said power-units can be thrown into or out of combination when the relative rotative speeds of said rotary shafts attain a predetermined ratio.

87. The combination of two rotary shafts, rotary members in driven relation to said rotary shafts, and means co-operative with and actuated by said shafts for reversing the rotation of said rotary members when the relative rotative speeds of said rotary shafts attain a predetermined ratio, said means comprising: two differential gearings, each including a pair of opposed orbit-gears, a train of planet gears co-operative with said orbit gears, and a rotary spider frame in which said planet gears are jounraled, driving means between each rotary shaft and an orbit gear of each differential gearing respectively, driving means between the driven orbit gear of each differential gearing and the spider-frame of the other, and driving means between the trailing orbit gear of each differential gearing and said rotary members respectively.

88. The combination with two rotary transmission shafts, and rotary members in driven relation to said rotary transmission shafts, of means co-operative with and actuated by said transmission shafts for reversing the rotation of said rotary members when the relative rotative speeds of said transmission shafts attain a predetermined ratio, said means comprising: a rotary shaft, a sleeve-shaft concentrically mounted on said rotary shaft and relatively rotatable thereto, a differential gearing having an orbit gear fixedly mounted on said shaft, a second orbit gear rotatably mounted on said sleeve-shaft, a train of planet gears co-operative with said orbit gears, and a rotatable spider frame in which said planet gears are journaled, having fixed mounting on said sleeve shaft, a second differential gearing having an orbit fixedly gear mounted on and turnable with said sleeve shaft, a second orbit gear rotatably mounted on said rotary shaft, a train of planet gears co-operative with said orbit gears, and a rotary spider frame in which said planet gears are journaled, having fixed mounting on said rotary shaft; driving means between said rotary transmission shafts and said rotary shaft and sleeve-shaft respectively, and driving connection between the trailing orbit gears of said differential gearings and said rotary members.

89. The combination of three independently functionable power units, three rotary shafts, driving means between said power units and said rotary shafts respectively, means for rendering said driving means operative or inoperative, means for effecting driving relation between any of said rotary shafts, differential gearing co-operative with and actuated by said rotary shafts, a power delivery shaft actuated by said differential gearing, and automatic means co-operative with and actuated by said rotary shafts for operating said second and third named means whereby any of said power units can be thrown into or out of combination when the relative rotative speeds of said rotary shafts attain a predetermined ratio.

90. The combination of a plurality of independently functionable power units, a plurality of rotary shafts, driving means between said power units and said rotary shafts respectively, means for rendering any of said driving means operative or inoperative, means for effecting driving relation between any of said rotary shafts, differential gearing co-operative with and actuated by said rotary shafts, a power delivery shaft actuated by said differential gearing, and automatic means co-operative with and actuated by said rotary shafts for operating said second- and third-named means whereby any of said power units can be thrown into or out of combination when the relative rotative speeds of said rotary shafts attain a predetermined ratio.

91. The combination of two independently functionable power units, two rotary shafts, driving means between said power units and said rotary shafts respectively, means for rendering said driving means operative or inoperative, means for effecting driving relation between said rotary shafts, differential gearing co-operative with and actuated by said rotary shafts, a power delivery shaft actuated by said differential gearing, manually controlled means for operating said second and third named means whereby any of said power units can be selectively thrown into or out of combination, and automatic means co-operative with and actuated by said rotary shafts whereby any of said power units can be thrown into or out of combination when the relative rotative speeds of said rotary shafts attain a predetermined ratio.

92. The combination of three independently functionable power units, three rotary shafts, driving means between said power units and said rotary shafts respectively, means for rendering said driving means operative or inoperative, means for effecting driving relation between any of said rotary shafts, a compound differential gearing cooperative with and actuated by said rotary shafts, a power delivery shaft actuated by said compound differential gearing, manually controlled means for operating said second- and third-named means whereby any of said power units can be selectively thrown into or out of combination, and automatic means co-operative with and actuated by said rotary shafts whereby any of said power units can be thrown into or out of combination when the relative rotative speeds of any of said rotary shafts attain a predetermined ratio.

93. The combination of a plurality of independently functionable power units, a plurality of rotary shafts, driving means between said power units and said rotary shafts respectively, means for rendering any of said driving means operative or inoperative, means for effecting driving relation between any of said rotary shafts, a compound differential gearing co-operative with and actuated by said rotary shafts, and a power delivery shaft actuated by said compound differential gearing, manually controlled means for operating said second and third named means whereby any of said power units can be selectively thrown into or out of combination, and automatic means co-operative with and actuated by said rotary shafts whereby any of said power units are automatically thrown into or out of combination when the relative rotative speeds of said rotary shafts attain a predetermined ratio.

94. The combination with a rotary shaft, of a variable diameter propeller comprising a hub mounted on and turnable with said shaft, propeller blades having shanks slidably received in said hub, means associated with said shanks and hub holding said propeller blades against rotation about their radial axis, a housing axially alined with said rotary shaft, means associated with said shanks anchoring said shanks in said housing whereby the propeller blades are held against spontaneous radial displacement, rotary transmission means co-operative with said shanks, rotary transmission means rotatably mounted on said rotary shaft in driving relation to said first-named transmission means, means normally inoperative for effecting driving relation between said rotary shaft and said last-named transmission means, and means associated with said rotary shaft for rendering said normally in-operative means operative in either rotational direction whereby said propeller blades can be selectively moved radially inward or outward.

95. The combination with a rotary shaft, of a variable diameter propeller comprising a hub mounted on and turnable with said shaft, propeller blades having shanks slidably received in said hub, means associated with said shanks and hub holding said propeller blades against rotation about their radial axis, a housing concentric with and spacedly movable to said rotary shaft, means in positive connection with said shanks anchoring said shanks and blades in said housing whereby said blades are mutually balanced against spontaneous radial displacement, rotary transmission means co-operative with said shanks, rotary transmission means rotatably mounted on said rotary shaft in driving relation to said first-named transmission means, means normally in-operative for effecting driving relation between said rotary shaft and said last-named transmission means, and means associated with said rotary shaft for rendering said normally in-operative means operative in either rotational direction whereby said propeller blades can be moved selectively radially inward or outward.

96. The combination with a rotary shaft, of a variable diameter propeller comprising a hub mounted on and turnable with said shaft, propeller blades having shanks slidably received in said hub, means associated with said shanks and said hub holding said propeller blades against rotation about their radial axis, a housing axially alined with said rotary shaft, means associated with said shanks anchoring said shanks in said housing whereby the propeller blades are held against spontaneous radial displacement, rotary transmission means associated with said shanks, rotary transmission means rotatably mounted on said rotary shaft in driving relation to said first-named transmission means, means normally in-operative for effecting driving relation between said rotary shaft and said last-named transmission means, and manually operated lever means for operating said normally in-operative means in either rotational direction whereby said propeller blades can be selectively moved radially inward or outward.

97. The combination with a rotary shaft, of a variable diameter propeller comprising a hub mounted on and turnable with said shaft, propeller blades having shanks slidably received in said hub, means associated with said shanks and said hub holding said propeller blades against rotation about their radial axis, a housing axially alined with said rotary shaft, means associated with said shanks anchoring said shanks in said housing whereby the propeller blades are held against spontaneous radial displacement, rotary transmission means associated with said shanks, rotary transmission means rotatably mounted on said rotary shaft in driving relation to said first-named transmission means, means normally in-operative for effecting driving relation between said rotary shaft and said last-named transmission means, means associated with said rotary shaft for rendering said normally in-operative means operative selectively in either rotational direction, whereby the propeller blades can be moved radially inward or outward, and means co-operative with said rotary shaft rendering said last named means in-operative whereby the radial movement of the propeller blades is arrested when the adjustment has reached a predetermined amount.

98. The combination with a rotary shaft, of a variable diameter propeller comprising a hub mounted on and turnable with said rotary shaft, propeller blades having shanks slidably received in said hub, means associated with said shanks and hub holding said blades against rotation about their radial axis, a housing concentric with and spacedly movable to said rotary shaft, means anchoring said shanks in said housing whereby said blades are mutually balanced against radial displacement, rotary transmission means co-operative with said shanks, rotary transmission means rotatably mounted on said rotary shaft in driving relation to said first-named transmission means, normally in-operative means for effecting driving relation between said rotary shaft and said second-named transmission means selectively in either rotational direction, whereby said propeller blades can be moved radially inward or outward, lever means for rendering said normally inoperative means operative, and means co-operative with and actuated by said rotary shaft controlling said lever means, whereby said normally in-operative means are rendered in-operative when the radial adjustment of the propeller blades has reached a predetermined amount.

99. The combination with a rotary shaft, of a variable incidence propeller comprising a hub mounted on and turnable with said shaft, propeller blades having shanks rotatably received in said hub, a housing axially alined with said rotary shaft, means associated with said shanks anchoring said shanks in said housing whereby the propeller blades are held against radial displacement, rotary transmission means co-operative with said shanks, rotary transmission means rotatably mounted on said rotary shaft in driving relation to said first-named transmission means, means normally in-operative for effecting driving relation between said rotary shaft and said last-named transmission means, and means associated with said rotary shaft for rendering said normally in-operative means operative in either rotational direction whereby said propeller blades can be selectively turned about their radial axis and their angle of incidence correspondingly varied.

100. The combination with a rotary shaft, of a variable incidence propeller comprising a hub mounted on and turnable with said shaft, propeller blades having shanks rotatably received in said hub, a housing concentric with and spacedly movable to said rotary shaft, means in positive connection with said shanks anchoring said shanks in said housing whereby said propeller blades are mutually balanced against radial displacement, rotary transmission means co-operative with said shanks, rotary transmission means rotatably mounted on said rotary shaft in driving relation to said first-named transmission means, means normally in-operative for effecting driving relation between said rotary shaft and said last-named transmission means, and means associated with said rotary shaft for rendering said normally in-operative means operative in either rotational direction whereby said propeller blades can be selectively turned about their radial axis and their angle of incidence correspondingly varied.

101. The combination with a rotary shaft, of a variable incidence propeller comprising a hub mounted on and turnable with said shaft, propeller blades having shanks rotatably received in said hub, a housing axially alined with said rotary shaft, means associated with said shanks anchoring said shanks in said housing whereby said propeller blades are held against radial displacement, rotary transmission means associated with said shanks, rotary transmission means, shaft mounted on said rotary shaft in driving relation to said first-named transmission means, means normally in-operative for effecting driving relation between said rotary shaft and said last-named transmission means, and manually operated lever means for operating said normally in-operative means in either rotational direction whereby said propeller blades can be selectively turned about their radial axis and their angle of incidence correspondingly varied.

102. The combination with a rotary shaft, of a variable incidence propeller comprising a hub mounted on and turnable with said shaft, propeller blades having shanks rotatably received in said hub, a housing axially alined with said rotary shaft, means associated with said shanks anchoring said shanks in said housing whereby the propeller blades are held against radial displacement, rotary transmission means associated with said shanks, rotary transmission means rotatably mounted on said rotary shaft in driving relation to said first-named transmission means, means normally in-operative for effecting driving relation between said rotary shaft and said last-named transmission means, means associated with said rotary shaft for rendering said last-named means operative selectively in either rotational direction whereby the propeller blades can be turned about their radial axis and their angle of incidence correspondingly varied, and means co-operative with said rotary shaft rendering said last named means in-operative when the angular adjustment of the blades has reached a predetermined amount.

103. The combination with a rotary shaft, of a variable incidence propeller comprising a hub mounted on and turnable with said rotary shaft, propeller blades having shanks rotatably received in said hub, a housing concentric with and spacedly movable to said rotary shaft, means associated with said shanks anchoring said shanks in said housing whereby said propeller blades are mutually balanced against radial displacement, rotary transmission means co-operative with said shanks, rotary transmission means rotatably mounted on said rotary shaft in driving relation to said first-named transmission means, normally in-operative means for effecting driving relation between said rotary shaft and said last-named transmission means selectively in either rotational direction whereby said propeller blades can be turned about their radial axis and their angle of incidence correspondingly varied, levermeans for rendering said normally inoperative means operative, and means co-operative with and actuated by said rotary shaft controlling said levermeans whereby said normally inoperative means are rendered inoperative when the angular adjustment of the propeller blades reaches a predetermined amount.

104. The combination with a rotary shaft, of a variable diameter and variable incidence propeller comprising a hub mounted on and turnable with said shaft, propeller blades having shanks slidably and rotatably received in said hub, guiding means associated with said shanks and said hub for holding said shanks and blades against spontaneous rotation about their radial axis, said guiding means being adapted to impart a rotating movement to said shanks and propeller blades co-operative with relative radial motion between said hub and shanks, members axially alined with and in rotatable threaded engagement with said shanks, means holding said members, shanks and blades against spontaneous radial displacement, rotary transmission means co-operative with said members, rotary transmission means rotatably mounted on said rotary shaft in driving relation to said first-named transmission means, means normally in-operative for effecting driving relation between said rotary shaft and said last-named transmission means, and means associated with said rotary shaft for rendering said normally in-operative means operative in either rotational direction whereby said shanks and propeller blades can be moved radially inward or outward and the diameter and angle of incidence of the propeller blades thus simultaneously varied.

105. The combination with a rotary shaft, of a variable diameter and variable incidence propeller comprising a hub mounted on and turnable with said shaft, propeller blades having shanks slidably and rotatably received in said hub, guiding means associated with said shanks and hub for holding said shanks and propeller blades against spontaneous rotation about their own axis, said guiding means being adapted to impart a rotating movement to said shanks and propeller blades co-operative with relative radial motion between said hub and said shanks, members axially alined with and in rotatable threaded engagement with said shanks, means connecting said members whereby said shanks and blades are mutually balanced against centrifugal displacement, rotary transmission means co-operative with said members, rotary transmission means rotatably mounted on said rotary shaft in driving relation to said first-named transmission means, means normally in-operative for effecting driving relation between said shaft and said second-named transmission means in either rotational direction whereby said shanks and propeller blades can be selectively moved inward or outward and the diameter and angle of incidence of the blades simultaneously varied, and manually operated levermeans for controlling said normally in-operative means.

106. The combination with a rotary shaft, of a variable incidence and variable diameter propeller comprising a hub mounted on and turnable with said shaft, propeller blades having shanks slidably and rotatably received in said hub, means associated with said shanks and said hub for holding said shanks and propeller blades against spontaneous rotation about their radial axis, said means being adapted to impart a rotating movement to said shanks and propeller blades co-operative with relative radial motion between said hub and said shanks, members axially alined with and in rotatable threaded engagement with said shanks, a housing axially alined with said rotary shaft wherein said members are rotatably anchored and whereby all of said members, shanks and blades are mutually balanced against centrifugal displacement, rotary transmission means co-operative with said members, rotary transmission means rotatably mounted on said rotary shaft in driving relation to said first-named transmission means, means normally in-operative for effecting driving relation between said rotary shaft and said second-named transmission means, means associated with said rotary shaft for rendering said normally in-operative means operative in either rotational direction, whereby said shanks and propeller blades can be rotatively moved inward or outward and their diameter and angle of incidence thereby simultaneously varied, and means co-operative with said rotary shaft rendering said last-named means in-operative whereby the radial and angular adjustment of the blades is arrested.

107. The combination with a rotary shaft, of a variable diameter and variable incidence propeller comprising a hub mounted on and turnable with said rotary shaft, propeller blades having shanks slidably and rotatably received in said hub, means associated with said shanks and said hub for holding said shanks and blades against spontaneous rotation about their radial axis, said means being adapted to impart a rotary movement to said shanks and blades co-operative with relative radial motion between said hub and said shanks members axially alined with and in rotatable threaded engagement with said shanks, a housing concentric with and spacedly movable to said rotary shaft, wherein said members are rotatably anchored and whereby all of said members, shanks and blades are mutually balanced against spontaneous centrifugal displacement, rotary transmission means co-operative with said members, rotary transmission means rotatably mounted on said rotary shaft in driving relation to said first-named transmission means, means normally inoperative for effecting driving relation between said rotary shaft and said second-named transmission means, manually operated lever means for rendering said normally in-operative means operative in either rotational direction, whereby said shanks and blades can be selectively moved rotatively inward or outward and the diameter and angle of incidence of the blades simultaneously varied, and means co-operative with said rotary shaft controlling said lever means whereby said normally in-operative means are rendered in-operative when the radial and angular adjustment of the propeller blades reaches a predetermined amount.

108. The combination with a rotary shaft, of a variable diameter and variable incidence propeller, comprising a hub having a frontal portion concentric with and mounted on said rotary shaft and a rear portion in concentric relation to said rotary shaft detachably secured to said frontal portion, propeller blades having shanks slidably and rotatably received in said hub, radial guiding means associated with said shanks and said hub for holding said shanks and propeller blades against spontaneous axial rotation and adapted to impart a rotating movement to said shanks and propeller blades co-operative with relative radial motion between said hub and said shanks, members axially alined with and in rotatable threaded engagement with said shanks, a housing concentric with said rotary shaft, wherein said members are rotatably anchored, rotary transmission means co-operative with said members, rotary transmission means rotatably mounted on said rotary shaft in driving relation to said first-named rotary transmission means, and means for effecting driving relation between said rotary shaft and said last-named transmission means whereby said shanks and propeller blades can be selectively moved radially inward or outward and the diameter and angle of incidence of the propeller blades thus simultaneously varied.

109. The combination with a rotary shaft, of a variable incidence and variable diameter propeller, comprising a hub having a frontal portion mounted on said rotary shaft and a rear portion in concentric relation to said rotary shaft detachably secured to said frontal portion, propeller blades having shanks slidably and rotatably received in said hub, guiding means associated with said shanks and said hub holding said shanks and propeller blades normally against spontaneous axial rotation and adapted to impart a rotating movement to said shanks and propeller blades co-operative with relative radial motion between said hub and said shanks, members axially alined with and in rotatable threaded engagement with said shanks, a housing concentric with and spacedly movable to said rotary shaft wherein said members are rotatably anchored and whereby said propeller blades, shanks and members are held in mutually balanced relation against spontaneous radial displacement, rotary transmission means co-operative with said members, rotary transmission means rotatably mounted on said rotary shaft in driving relation to said first-named transmission means, and means for effecting driving relation between said rotary shaft and said last-named transmission means whereby said shanks and propeller blades can be selectively moved radially inward or outward, thereby simultaneously varying the diameter and angle of incidence of the propeller blades.

110. In an automotive vehicle, the combination of a plurality of power-units, a power delivery shaft, a transmission mechanism adapted to transmit the power of any of said power units to said power delivery shaft, means for selectively controlling said transmission mechanism whereby any of said power units can be thrown into or out of combination, a variable diameter propeller having radially adjustable blades in driven relation associated with said power delivery shaft, and means co-operative with said transmission controlling means for radially adjusting said propeller blades.

111. In an automotive vehicle, the combination of a plurality of power-units, a power delivery shaft, differential transmission means adapted to transmit the power of any of said power units to said power delivery shaft, means for selectively controlling said transmission means whereby any of said power units can be thrown into or out of combination, a variable diameter propeller having radially adjustable blades in driven relation associated with said power delivery shaft, and means co-opertaive with said controlling means for rapidly adjusting said propeller blades.

112. In an automotive vehicle, the combination of a plurality of power units, a power delivery shaft, a transmission mechanism adapted to transmit the power of any of said power units to said power delivery shaft, means for selectively controlling said transmission mechanism whereby any of said power units can be thrown into or out of combination, a variable incidence propeller having angularly adjustable blades in driven relation associated with said power delivery shaft, and means co-operative with said controlling means for rotating said propeller blades about their radial axis whereby their angle of incidence is varied.

113. In an automotive vehicle, the combination of a plurality of power units, a power delivery shaft, differential transmission means adapted to transmit the power of any of said power units to said power delivery shaft, means for selectively controlling said differential transmission means whereby any of said power units can be thrown into or out of combination, a variable incidence propeller having angularly adjustable blades in driven relation associated with said power delivery shaft, and means co-operative with said controlling means for rotating said propeller blades about their radial axis whereby their angle of incidence is varied.

114. In an automotive vehicle, the combination of a plurality of power units, a power a power delivery shaft, a transmission mechanism adapted to transmit the power of any of said power units to said power delivery shaft, means for selectively controlling said transmission mechanism whereby any of said power units can be thrown into or out of combination, a variable incidence and variable diameter propeller having radially and angularly adjustable blades in driven relation associated with said power delivery shaft, and means co-operative with said transmission controlling means for rotating said propeller blades about their radial axis and for moving said baldes radially inward or outward whereby the diameter of the propeller and the angle of incidence of the blades are simultaneously varied in accordance with the power transmitted.

115. In an automotive vehicle, the combination of a plurality of power units, a power delivery shaft, differential transmission means adapted to transmit the power of any of said power units to said power delivery shaft, means for selectively controlling said differential transmission means whereby any of said power units can be thrown into or out of combination, a variable incidence and variable diameter propeller having radially and angularly adjustable blades in driven relation associated with said power delivery shaft, and means co-operative with said controlling means for rotating said propeller blades about their radial axis and for moving said blades radially inward or outward whereby the diameter of the propeller and angle of incidence of the blades are simultaneously varied in accordance with the power transmitted.

116. In an automotive vehicle, the combination of a plurality of power units, a power delivery shaft, a transmission mechanism adapted to transmit the power of any of said power units to said power delivery shaft, means for selectively controlling said transmission mechanism whereby any of said power units can be thrown into or out of combination, a variable diameter propeller having radially adjustable blades in driven relation associated with said power delivery shaft, means actuated by said power delivery shaft for radially adjusting said propeller blades, and means co-operative with said controlling means selectively rendering said last named means operative or in-operative.

117. In an automotive vehicle, the combination of a plurality of power units, a power delivery shaft, differential transmission means adapted to transmit the power of any of said power units to said power delivery shaft, means for selectively controlling said differential transmission means whereby any of said power units can be thrown into or out of combination, a variable diameter propeller having radially adjustable blades in driven relation associated with said power delivery shaft, means actuated by said power delivery shaft for radially adjusting said propeller blades, and means co-operative with said controlling means selectively rendering said last-named means operative or in-operative.

118. In an automotive vehicle, the combination of a plurality of power units, a power delivery shaft, a transmission mechanism adapted to transmit the power of any of said power units to said power delivery shaft, means for selectively controlling said transmission mechanism whereby any of said power units can be thrown into or out of combination, a variable incidence propeller having angularly adjustable blades in driven relation associated with said power delivery shaft, means associated with and actuated by said power delivery shaft for rotating said propeller blades about their radial axis whereby their angle of incidence is varied, and means co-operative with said controlling means selectively rendering said last-named means operative or in-operative.

119. In an automotive vehicle, the combination of a plurality of power units, a power delivery shaft, differential transmission means for transmitting the power of any of said power units to said power delivery shaft, means for selectively controlling said differential transmission means whereby any of said power units can be thrown into or out of combination, a variable incidence propeller having angularly adjustable blades in driven relation associated with said power delivery shaft, means associated with and actuated by said power delivery shaft for rotating said propeller blades about their radial axis whereby their angle of incidence is varied, and means co-operative with said controlling means selectively rendering said last named means operative or in-operative.

120. In an automotive vehicle, the combination of a plurality of power units, a power delivery shaft, a transmission mechanism adapted to transmit the power of any of said power units to said power delivery shaft, means for selectively controlling said transmission mechanism whereby any of said power units can be thrown into or out of combination, a variable incidence and variable diameter propeller having radially and angularly adjustable blades in driven relation associated with said power delivery shaft, means associated with and actuated by said power delivery shaft for rotating said propeller blades about their radial axis and for moving said propeller blades radially inward or outward whereby the angle of incidence of the blades and the diameter of the propeller are simultaneously varied, and means co-operative with said controlling means selectively rendering said last-named means operative or in-operative.

121. In an automotive vehicle, the combination of a plurality of power units, a power delivery shaft, differential transmission means adapted to transmit the power of any of said power units to said power delivery shaft, means for selectively controlling said differential transmission means whereby any of said power units can be thrown into or out of combination, a variable incidence and variable diameter propeller having radially and angularly adjustable blades in driven relation associated with said power delivery shaft, means associated with and actuated by said power delivery shaft for rotating said propeller blades about their radial axes and for moving said blades radially inward or outward whereby the angle of incidence of the blades and the diameter of the propeller are simultaneously varied, and means co-operative with said controlling means selectively rendering said last named means operative or in-operative.

122. In an automotive vehicle, the combination of a plurality of power units, a power delivery shaft, a transmission mechanism adapted to transmit the power of any of said power units to said power delivery shaft, means for selectively controlling said transmission mechanism whereby any of said power units can be thrown into or out of combination, a variable diameter propeller having radially adjustable blades in driven relation associated with said power delivery shaft, means co-operative with and actuated by said power delivery shaft for radially moving said propeller blades inward or outward, means co-operative with said controlling means rendering said second named means operative, and means co-ordinated with said controlling means rendering said second named means in-operative when the radial adjustment of the propeller blades has reached a predetermined amount.

123. In an automotive vehicle, the combination of a plurality of power units, a power delivery shaft, a differential transmission device adapted to transmit the power of any of said power units to said power delivery shaft, means for selectively controlling said differential transmission device whereby any of said power units can be thrown into or out of combination, a variable diameter propeller having radially adjustable blades in driven relation associated with said power delivery shaft, geared means co-operative with and actuated by said power delivery shaft for radially moving said propeller blades inward or outward, means co-operative with said controlling means rendering said geared means operative, and means co-ordinated with said controlling means rendering said geared means in-operative when the radial adjustment of the propeller blades has reached a predetermined amount.

124. In an automotive vehicle, the combination of a plurality of power units, a power delivery shaft, a transmission mechanism adapted to transmit the power of any of said power units to said power delivery shaft, means for selectively controlling said transmission mechanism whereby any of said power units can be thrown into or out of combination, a variable incidence propeller having angularly adjustable blades in driven relation associated with said power delivery shaft, means co-operative with said power delivery shaft for turning said blades about their radial axis whereby their angle of incidence is varied, means co-operative with said controlling means rendering said second named means operative, and means co-ordinated with said controlling means rendering said second-named means in-operative when the angular adjustment of the propeller blades has reached a predetermined amount.

125. In an automotive vehicle, the combination of a plurality of power units, a power delivery shaft, a differential transmission device adapted to transmit the power of any of said power units to said power delivery shaft, means for selectively controlling said transmission device whereby any of said power units can be thrown into or out of combination, a variable incidence propeller having angularly adjustable blades in driven relation associated with said power delivery shaft, geared means co-operative with said power delivery shaft for turning said blades about their radial axis whereby their angle of incidence is varied, means co-operative with and actuated by said controlling means rendering said geared means operative, and means co-ordinated with said controlling means rendering said geared means in-operative when the angular adjustment of the propeller blades has reached a predetermined amount.

126. In an automotive vehicle, the combination of a plurality of power units, a power delivery shaft, a transmission mechanism adapted to transmit the power of any of said power units to said power delivery shaft, means for selectively controlling said transmission mechanism whereby any of said power units can be thrown into or out of combination, a variable incidence and variable diameter propeller having radially and angularly adjustable blades in driven relation associated with said power delivery shaft, means co-operative with said power delivery shaft for rotating said blades about their radial axis and for moving them radially inward or outward whereby the diameter of the propeller and the angle of incidence of the blades are simultaneously varied, means co-operative with said controlling means for rendering said second named means operative, and means co-ordinated with said controlling means rendering said second named means in-operative when the angular and radial adjustments of the propeller blades have reached a predetermined amount.

127. In an automotive vehicle, the combination of a plurality of power units, a power delivery shaft, a differential transmission device adapted to transmit the power of any of said power units to said power delivery shaft, means for selectively controlling said differential transmission mechanism whereby any of said power units can be thrown into or out of combination, a variable incidence and variable diameter propeller having angularly and radially adjustable blades in driven relation associated with said power delivery shaft, geared means co-operative with and actuated by said power delivery shaft for rotating said blades about their radial axis and for moving them radially inward and outward whereby the diameter of the propeller and the angle of incidence of the blades are simultaneously varied, means co-operative with said controlling means for rendering said geared means operative, and means co-ordinated with said controlling means and actuated by said power delivery shaft rendering said geared means in-operative when the adjustments of the blades have reached a predetermined amount.

128. The combination with a power transmission device including driving elements, driven elements and a plurality of clutches for effecting driving relation between any of said elements, of mechanism for selectively operating any of said clutches in selected combination and direction, comprising: a fixed base frame, a plurality of centrally pivoted levers having mounting in said fixed base frame, each of said levers having operating connection with a corresponding clutch, a movable base frame having guided support in said fixed base frame, two rotary frames having bearing support in said movable base frame arranged at opposite sides of said pivoted levers, each rotary frame having a plurality of longitudinal members arranged in peripherally spaced relation to each other, each member adapted to engage with a selected combination of said pivoted levers, a rotatable master shaft, transmission connection between said master shaft and said rotary frames, the rotation of said mastershaft inducing corresponding rotation of each rotary frame whereby a selected longitudinal member of each rotary frame can be brought into alinement with said pivoted levers, an extension shaft axially alined with said master shaft, a master clutch for clutching the master shaft and the extension shaft together, means for operating said master clutch, means carried by said fixed base frame having leverage engagement with said movable frame, and means actuated by said extension shaft for operating said last named means whereby relative displacement between said base frames is effected, thereby bringing said selected longitudinal members into actuating engagement with said pivoted levers and operating said transmission clutches in selected combination and direction.

129. The combination with a power transmission device having driving elements, driven elements and clutches for effecting driving relation between any of said elements, of mechanism for operating any of said clutches in selected combination and direction, comprising: a fixed base frame, a plurality of centrally pivoted levers having mounting in said fixed base frame, operating connections between said levers and the corresponding clutches of the power transmission device, a movable base frame having guided support in said fixed base frame, two rotary frames having bearing support in said movable base frame arranged at opposite sides of said pivoted levers, each rotary frame including a plurality of longitudinal members radially movable therein and arranged in peripherally spaced relation to each other, each member being adapted to engage with a selected combination of said pivoted levers, levermeans for positioning said longitudinal members outward in line of engagement with said pivoted levers, a rotatable mastershaft, transmission connection between said mastershaft and said rotary frames whereby rotation of said rotary frames is effected co-operative with rotation of said master shaft and whereby a selected longitudinal member of each rotary frame can be brought into alinement with said pivoted levers, an element carried by one of said base frames having leverage engagement with the other base frame, means co-operative with said mastershaft for operating said element, and means co-operative with said master shaft for operating said positioning levermeans for the longitudinal members of the rotary frames.

130. The combination with a power transmission device having driving elements, driven elements and clutches for effecting driving relation between any of said elements, of mechanism for operating any of said clutches in selected combination and direction, comprising: a plurality of centrally pivoted levers, operating connection between said pivoted levers and the respective clutches in the transmission device, two rotary frames located at opposite sides of said pivoted levers, each rotary frame having a plurality of longitudinal members radially movable therein and arranged in peripherally spaced relation to each other, each member adapted to engage with a selected combination of said pivoted levers, a rotatable master shaft, transmission connection between the said master shaft and the rotary frames whereby rotation of said rotary frames is effected co-operative with said master shaft and whereby a selected member of each rotary frame is brought in alinement with said pivoted levers, an extension shaft in axial alinement with said mastershaft, a two-way master clutch for clutching said master shaft and extension shaft together, means for arresting the rotation of said master-shaft and rotary frames on alinement of the selected longitudinal members with the pivoted levers, means co-operative with said arresting means operating said master-clutch whereby the masterclutch and the extension shaft are declutched and said extension shaft is rendered independently rotatable, levermeans operated by said independently rotating extension shaft for positioning said longitudinal members of the rotary frame in line of engagement with said pivoted levers, means actuated by said extension shaft for moving said rotatable frames lengthwise whereby the selected longitudinal members are urged into engagement with the corresponding pivoted levers and whereby the clutches in the transmission device are operated in selected combination and direction, and means co-operative with said extension shaft for subsequently shifting the master-clutch to neutral whereby the entire mechanism is rendered inoperative.

131. In combination, a rotatable mastershaft, an extension shaft in axial alinement therewith, transmission means actuated by and cooperative with said extension shaft, a masterclutch for connecting said shafts in clutched relation, a rotary member actuated by said mastershaft having spaced tracks concentric with its axis of rotation, each track having a socket, said sockets being arranged in selected angular spacing and sequence, a frame, a plurality of pins slidably supported in said frame and projecting outwardly therefrom, being in alinement with a corresponding track of said rotary member, a lever for each pin having resilient connection with said pin for moving the pin inward or outward, extension members resiliently mounted in said pins, each provided with a transversely extending finger, supports in said frame wherein said extension members have slidable bearing, said extension members being normally positioned distant from said rotary member but adapted to be brought into resilient contact with the corresponding tracks thereof by manipulation of the levers, levermeans mounted in said frame in alinement with the corresponding pins, each lever adapted to be actuated by the finger of the corresponding extension member, a member connecting said levermeans for effecting their simultaneous movement, and levermeans operable by said connecting member having operating connection with said masterclutch whereby said mastershaft and extension shafts are declutched upon the resiliently urged entrance of any of said extension members into the corresponding socket of the rotary member and said transmission means subsequently actuated independently from the arrested mastershaft by the continued rotation of the extension shaft.

132. In combination, a rotatable master shaft, an extension shaft in axial alinement therewith and normally independently rotatable, a rotary transmission element freely rotatable on said extension shaft, transmission means co-operative with said rotary transmission element, a double-acting master clutch adapted to connect said master shaft and extension shaft in clutched relation and to alternately effect clutched relation between said extension shaft and said rotary transmission element, a rotatable body co-operative with and actuated by said mastershaft having spaced tracks concentric with its axis of rotation, each track having a socket, said sockets being arranged in selected angular spacing and sequence, a fixed frame adjacent to said rotary body, a plurality of pins having slidable bearing in said frame and projecting outward therefrom, each pin being in alinement with a corresponding track of said rotary body, levermeans resiliently associated with each pin for urging said pin inward, an extension member for each pin in slidably resilient relation associated with it and provided with a transversely extending finger, each extension member having slidable support in said frame and being normally distant from the rotatable body but adapted to be brought in resilient contact therewith by manipulation of the pin-lever means, a plurality of levers pivotally mounted in said frame each adapted to be actuated by the finger of the corresponding pin-extension member, a member connecting said pivoted levers and effecting their simultaneous movement, lever means actuated by said connecting member for operating said masterclutch whereby the extension shaft and the mastershaft are disconnected upon the engagement of a selected pin-extension member with the corresponding socket in the rotatable body and the rotary transmission element is brought into clutched relation with the extension shaft, said transmission means being thereby rendered co-operative with continued rotation of the extension shaft independently from the arrested mastershaft, and means co-ordinated with and operated by said transmission means for shifting the masterclutch to an intermediate neutral position whereby mastershaft, extension shaft and transmission means become disconnected and said extension shaft is rendered freely rotatable independently from the other elements.

133. In combination, a rotary shaft, a rotary element in axial alinement therewith, a clutch having slidably splined mounting on said shaft adapted to engage said rotary element, a pivoted lever, a member carried by said lever with which said clutch has following connection, means holding said member normally rigid with said lever whereby said clutch can be shifted by moving said lever and member in unison, and means external of said lever for moving said member whereby said clutch can be shifted independent of the lever.

134. In combination, a rotary shaft, a rotary element in axial alinment therewith, a clutch having slidably splined mounting on said shaft and adapted to engage said rotary element, a pivoted lever, a member carried by said pivoted lever with which said clutch has following connection, means holding said member normally rigid with said lever whereby said lever clutch can be shifted by moving said lever and member in unison, and means external of said lever actuated by said rotary element for moving said member whereby said clutch can be shifted independent of the lever.

135. In combination, a rotary shaft, a rotary element in axial alinement therewith, a clutch having slidably splined mounting on said shaft, and adapted to engage with said rotary element, a sleeve rotatably mounted on the body of said clutch, a pivoted lever, a member carried by said pivoted lever with which said sleeve has following connection, means holding said member normally rigid with said lever whereby said clutch and sleeve can be shifted by moving said member and lever in unison, and means external of said lever for moving said member whereby said clutch and sleeve can be shifted independently of the lever.

136. In combination, a rotary shaft, a rotary element in axial alinement therewith, a clutch having slidably splined mounting on said shaft and adapted to engage said rotary element, a sleeve rotatably mounted on the body of said clutch, said sleeve having members rigid with it and extending transversely thereof, a pivoted lever having slots receiving said transverse members, said slots permitting relative movement between said lever and said clutch and sleeve, a member normally co-operative with said lever with which said transverse members have following connection, and means external of said lever for moving said normally co-operative member whereby said sleeve and clutch are shifted independently of the lever.

137. In combination, a rotary shaft, a rotary element in axial alinement therewith, a clutch having slidably splined mounting on said shaft and adapted to engage said rotary element, a sleeve rotatably mounted on the body of said clutch but otherwise co-active therewith, members rigid with said sleeve and extending transversely thereof, a pivoted lever having slots receiving said transverse members, said slots permitting relative movement between said lever and said clutch and sleeve, a member carried by said sleeve and relatively movable thereto with which said transverse members have following connection, means for normally keeping said member rigid with the lever, said sleeve and clutch being then shifted by moving said lever and member in unison, and means external of said lever for moving said member when the lever is positioned, whereby said sleeve and clutch are shifted to the extent of the slots independently of the lever.

138. In combination, a rotary shaft, a rotary element in axial alinement therewith, a clutch having slidably splined mounting on said shaft and adapted to engage said rotary element, a sleeve rotatably mounted on the body of the clutch but otherwise co-operative therewith, members rigid with said sleeve extending transversely thereof, a pivoted lever having slots receiving said transverse members, said slots permitting relative movement between said clutch and sleeve and said pivoted lever, a member having movably guided mounting in said lever provided with slantwise disposed slots receiving said transverse members, means normally holding said member rigid with said lever, said clutch and sleeve being then shifted by moving said lever and member in unison, and means for moving said member vertically when the lever is positioned whereby said clutch and sleeve are shifted independently from the lever to the lateral extent of the lever slots.

139. In combination, two eccentric rotary elements arranged in opposed alinement to each other, a frame intermediate said rotary elements, a member movable in said frame having following connection with each of said eccentric rotary elements, and means for rotating said eccentric rotary elements separately or in unison whereby the said member is moved in said frame.

140. In combination, two rotary cams arranged in opposed alinement to each other, a frame intermediate said cams, a member movable in said frame, a centrally pivoted lever carried by said member, the arms of said lever having following connection with the tracks of said cams, and means for rotating said cams separately or in unison whereby the said lever and member is moved in said frame in accordance with the differential eccentricity of the camtracks.

141. In combination, two rotary cams arranged in opposed alinement to each other, each cam having a closed camtrack, a frame intermediate said cams, a member movable in said frame, a centrally pivoted lever mounted in said member, movable terminal portions having mounting on the arms of said pivoted lever, said terminal portions having permanent following engagement with the camtracks of the respective cams, resilient means interposed between said terminal portions and arms for urging the terminal portions outward, and means for rotating said cams separately or in unison whereby said member is moved in the frame in accordance with the differential eccentricity of the camtracks.

142. In combination, two rotary cams arranged in opposed alinement to each other, a frame intermediate said cams, a member movable in said frame having following connection with the tracks of both cams, means for rotating said cams separately or in unison whereby said member is moved in the frame in accordance with the differential eccentricity of both cams, and a lever operable by said movable member.

143. In combination, two rotary cams arranged in opposed alinement to each other, a frame intermediate said cam, a carriage movable in said frame having following connection with the tracks of both cams, levermeans mounted in said carriage, a lever positioned external of said carriage adapted to be engaged by said levermeans when the carriage has reached a predetermined position, means for rotating said cams separately or in unison whereby the carriage is moved in the frame in accordance with the differential eccentricity of both cam tracks, and means for actuating said levermeans when the carriage has reached a predetermined position whereby said externally positioned lever is operated.

144. In combination, two rotary cams arranged in opposed alinement to each other, a fixed frame intermediate said cams, a frame for each cam movable in said fixed frame, each movable frame having following connection with the camtrack of the respective cam, a carriage movable in said fixed frame, a centrally pivoted lever mounted in said carriage, the arms of said lever having following connection with the respective frames, and means for rotating said cams whereby the movable frames are moved in accordance with the individual eccentricity of the camtracks and whereby the carriage is moved in the fixed frame in accordance with the differential eccentricity of both camtracks.

145. In combination, two rotary cams arranged in opposed alinement to each other, a fixed frame intermediate said cams, a frame for each cam movable in said fixed frame having following connection with the camtrack of the respective cam, each movable frame provided with funnelwise converging guidemembers merging into a vertically disposed guide slot, a carriage movable in said fixed frame, a centrally pivoted lever slidably mounted in said carriage, the arms of said pivoted lever extending into the funnel-like recesses of the corresponding movable frames, means for rotating said cams separately or in unison whereby the movable frames are positioned in accordance with the eccentricity of the respective camtracks, and means for effecting relative displacement between said pivoted lever and said movable frames whereby the arms of the said lever are urged into the terminal guide-slots and the carriage is positioned in accordance with the differential eccentricity of both camtracks.

146. In combination, two rotary cams arranged in opposed alinement to each other, a fixed frame intermediate said cams, a frame for each cam movable in said fixed frame having following connection with the camtrack of the respective cam, each movable frame provided with funnelwise converging guide members merging into a vertically disposed guide-slot, a carriage movable in said fixed frame, a centrally pivoted lever having vertically slidable mounting in said carriage, the arms of said pivoted lever extending into the funnel-like recesses of the corresponding frames, means for rotating said cams separately or in unison whereby the movable frames are positioned in accordance with the eccentricity of the respective camtracks, and means for moving said pivoted lever in the direction of its pivotal axis whereby the arms of said lever are urged into the terminal guide-slots and the carriage is positioned in accordance with the differential eccentricity of both camtracks.

147. In an automotive vehicle, in combination, a power delivery shaft, means actuating said power delivery shaft, adjustable propulsion means actuated by said power delivery shaft, rotary means cooperative with said power delivery shaft for adjusting said propulsion means, transmission gearing actuated by said power delivery shaft having actuating connection with said rotary means, and means for rendering said transmission gearing selectively operative or non-operative.

148. In an automotive vehicle, in combination, a power delivery shaft, means actuating said power delivery shaft, adjustable propulsion means actuated by said power delivery shaft, rotary means for adjusting said propulsion means, transmission gearing actuated by said power delivery shaft having actuating connection with said rotary means, means for rendering said transmission gearing selectively operative and/or non-operative, and means for selectively reversing the rotation of said transmission gearing whereby said propulsion means can be adjusted in opposite directions.

149. In an automotive vehicle, in combination, a power delivery shaft, means actuating said power delivery shaft, adjustable propulsion means actuated by said power delivery shaft, rotary means for adjusting said propulsion means, a shaft cooperative with said power delivery shaft, oppositely disposed bevel gears mounted on said shaft and freely rotatable thereon, one of said bevel gears having actuating connection with said rotary means, a pinion journaled external of said shaft meshing with said bevelgears, a two-way clutch adapted to engage either of said bevelgears having splined slidable mounting on said shaft and positioned intermediate said bevelgears, and means for shifting said clutch selectively in engagement with either bevelgear whereby said rotary means can be actuated in opposite directions and said propulsion means correspondingly adjusted.

150. In an automotive vehicle, in combination, a plurality of powerplants, a power delivery shaft, transmission means between said powerplants and said power delivery shaft adapted to transmit the power of any of said power plants to said power delivery shaft, adjustable propulsion means actuated by said power delivery shaft, rotary means for adjusting said propulsion means to the power delivered, a shaft actuated by said power delivery shaft, oppositely disposed bevelgears mounted on said shaft and freely rotatable thereon, one of said bevelgears having actuating connection with said rotary means, a pinion journaled external of said shaft meshing with said bevelgears, a two-way clutch adapted to engage either of said bevelgears having splined slidable mounting on said shaft and located intermediate said bevelgears, means for shifting said clutch selectively in engagement with either bevelgear whereby said rotary means can be actuated in opposite directions, the one bevelgear adapted to actuate said rotary means for an increased number of powerplants, and the other bevelgear adapted to actuate said rotary means for a decreased number of powerplants, and means for shifting said clutch to a neutral position when the required adjustment of the propulsion means has been effected.

151. In a power transmission and clutch operating device of the kind described, the combination of a rotatable master shaft, an extension shaft in axial alinement therewith and normally independently rotatable thereto, a rotary transmission element freely rotatable on said extension shaft, transmission means actuated by said transmission element, a double-faced master clutch having splined slidable mounting on said extension shaft, said clutch being adapted to alternately engage with said master shaft and with said rotary transmission element whereby either of said two last named elements can be clutched with said extension shaft, means for arresting the rotation of said master shaft after a predetermined arc of travel, a lever co-operative with said arresting means, lever-means for shifting said clutch actuated by said first named lever whereby the clutch is shifted so that the master shaft and the extension shaft are disconnected upon the arresting of the master shaft and the rotary transmission element is clutched to the extension shaft, a secondary lever adapted to operate said clutch movable on and normally co-operative with said clutch lever, and lever-means actuated by said transmission means operating said secondary lever independently of the clutch lever whereby the clutch is shifted to a neutral position and said extension shaft thereby rendered independently rotatable.

152. The combination with a rotary shaft, two axially alined rotary elements mounted in driven relation to said rotary shaft, a three-way clutch intermediate said rotary elements for rendering either of said rotary elements operative or both in-operative, and a lever for shifting said clutch, of mechanism for automatically declutching either of said rotary elements after a pre-determined number of revolutions of the said rotary shaft, said mechanism comprising: a resiliently mounted master member capable of movement lengthwise and retractable to its initial position, pivoted levers having slotted connection with said master member, said connections being so arranged that movement of either of said pivoted levers will move the master member in one direction only, a centrally pivoted member connecting said pivoted levers so that the levers move simultaneously in opposite directions, lever connection between said centrally pivoted member and the clutch lever whereby a shifting of the said clutch lever in either direction moves the master member in its one operative direction, retractable means for holding the master member in its operative position, a trip lever for disengaging said retractable means, a resiliently mounted movable member for operating said trip lever initially positioned distant therefrom, transmission means actuated by the rotary shaft for moving said resiliently mounted member toward the trip lever, and means operated by the master member for rendering said transmission means operative whereby said resiliently mounted member is moved into actuating engagement with the said trip lever after a predetermined number of revolutions of the rotary shaft; the master member being thereby released and returned to its initial position; the rotary member in operation being thereby de-clutched, and rendered in-operative, and the clutch shifted to neutral; and the transmission means to the trip lever being thereby disengaged so that the said resiliently mounted member is retracted to its original position and the mechanism thus rendered operable for a renewed clutching of either rotary member.

153. The combination with a rotary shaft, a rotary element in driven relation to said rotary shaft, a clutch for rendering said rotary element operative or inoperative, and a lever for shifting said clutch, of mechanism for automatically de-clutching said rotary element after a pre-determined number of revolutions of the said rotary shaft, said mechanism comprising: a master member capable of movement lengthwise and resiliently retractable to its initial position, pivoted levers having slotted connection with said master member, said connections being so arranged that movement of either of said pivoted levers will move the master member in one direction only, a centrally pivoted member connecting said pivoted levers so that the said levers move simultaneously in opposite directions, lever connection between said centrally pivoted member and the clutch lever whereby a shifting of the said clutch lever moves the master member in its one operative direction, retractable means for holding the master member in its operative position, a trip lever for disengaging said retractable means, a resiliently mounted movable member for operating said trip lever initially positioned distant therefrom, transmission means actuated by the said rotary shaft for moving said resiliently mounted member toward the trip lever, and means operated by said master member for rendering said transmission means operative whereby said resiliently mounted member is moved into actuating engagement with the said trip lever after a pre-determined number of revolutions of said rotary shaft; the master member being thereby released and returned to its initial position; the rotary member being thereby de-clutched and rendered inoperative, and the transmission means to the trip lever being thereby disengaged so that the said resiliently mounted member is returned to its initial position and the mechanism is thus rendered operable for a subsequent clutching of the rotary member.

154. The combination with a rotary shaft, two axially alined rotary elements mounted in driven relation to said rotary shaft, a three way clutch intermediate said rotary elements for rendering either of said rotary elements operative, or both in-operative by shifting the clutch to neutral, and a lever for shifting said clutch, of a timing device for automatically de-clutching either of said rotary elements after any selected number of revolutions of the said rotary shaft, said device comprising: a resiliently mounted master member capable of movement lengthwise and retractable to its initial position, pivoted levers having slotted connections with said master member, said connections being so arranged that movement of either of said levers will move the master member in one direction only, a centrally pivoted member connecting said pivoted levers so that the said levers move simultaneously in opposite directions, lever connection between said centrally pivoted member and the clutch lever whereby a shifting of the said clutchlever in either direction moves the master member in its one operative direction, retractable means for holding the master member in its operative position, a rotatably mounted frame having a central member resiliently slidable therein and turnable therewith, a plurality of trip levers corresponding in number to the number of possible combinations of power units fulcrumed in the said frame and having leverage connection with the central member, said triplevers being spaced angularly and longitudinally, the longitudinal location of each trip lever corresponding to a pre-determined number of revolutions of the rotary shaft, a resiliently mounted movable member for operating said trip levers initially positioned distant from them, means for rotatably adjusting said frame whereby any desired trip lever can be brought in alinement with the said movable member, disengageable transmission means actuated by the rotary shaft for moving said resiliently mounted member toward the trip lever, lever-connection between the central frame-member and the retractable means for positioning the master member, and means operated by the master member for rendering said transmission means operative whereby the resiliently mounted tripping member is moved into actuating engagement with the angularly alined trip lever after a corresponding number of revolutions of the rotary shaft; the master member being thereby released and returned to its original position; the heretofore active rotary member being thereby declutched and rendered inactive through the clutch being shifted to neutral; and the transmission means to the triplever operating member being thereby disengaged so that the said triplever operating member is resiliently retracted to its initial position and the mechanism thus put in condition for a subsequent clutching of either rotary member for any selected number of revolutions of the rotary shaft.

155. The combination with a plurality of power units, a differential transmission actuated by said power units and adapted to transmit the power of any combination of said power units, mechanism for adjusting said differential transmission to any desired combination of power units, adjustable propulsion means actuated by said differential transmission, and a lever for adjusting said propulsion means, of a device for automatically operating said lever in accordance with the selected aggregation of power units, said device comprising: two opposedly disposed rotary cams, each having a camtrack including a number of dwells corresponding to the number of possible aggregations of power units, the eccentricity of the dwells with reference to a transverse plane medianly through both cams being greater in one cam than the eccentricity of the corresponding dwells in the other cam, the dwells in one camtrack being diagonally opposed to the corresponding dwells in the other camtrack so that a line connecting any two dissimilar dwells of both cams when alined in a horizontal plane will cross a center line between the cams at points to one or the other side of the said median transverse plane, a fixed frame intermediate said cams, a carriage movable in said frame having following connection with both cam tracks so that the carriage is always positioned in accordance with the differential eccentricity of the camtracks, a lever mounted in said carriage, lever means positioned so that they can be engaged by said carriage lever having operating connection with the propulsion adjusting lever, transmission means for rotatably adjusting said cams co-active with the differential transmission adjusting mechanism and co-ordinated therewith so that the cams are alternately rotated whereby the dwell corresponding to the selected aggregation of power units of the one cam is brought in horizontal alinement with the carriage whilst the other cam remains stationary, the carriage being thereby moved to one or the other side of the said median transverse plane, and means actuated by said transmission adjusting mechanism for moving said carriage lever after the carriage has been positioned into actuating engagement with the said lever-means whereby the propulsion means adjusting lever is correspondingly operated for an increased or decreased aggregation of power units.

156. The combination with a plurality of power units, a differential transmission actuated by said power units and adapted to transmit the power of any selected combination of said power units, mechanism for adjusting said differential transmission to any combination of power units, adjustable propulsion means actuated by said differential transmission, means for adjusting said propulsion means to the increased or decreased power transmitted, a lever for operating said propulsion adjusting means, and a timing device co-ordinable with any aggregation of power units for automatically rendering said propulsion adjusting means in-operable after the desired adjustment has been effected, of means for automatically operating said lever and co-ordinating said timing device co-active with the said transmission adjusting mechanism, said means comprising: two opposedly disposed cams, each having a camtrack including a number of dwells corresponding to the number of possible aggregations of power units, the eccentricity of the dwells with reference to a transverse plane medianly through both cams being greater in one cam than the eccentricity of the corresponding dwells in the other cam, the dwells in one camtrack being diagonally opposed to the corresponding dwells in the other camtrack, so that a line connecting any two dissimilar dwells of both cams when alined in a horizontal plane will cross a center line between the cams at points to one or the other side of the said median transverse plane, a fixed frame intermediate said cams, a carriage movable in said frame having following connection with both camtracks so that the carriage is always positioned in accordance with the differential eccentricity of both camtracks, a lever mounted in said carriage, levermeans positioned so that they can be engaged by said carriage lever having operating connection with the propulsion adjusting lever, means actuated by and having following connection with said carriage for adjusting said timing device in accordance with the selected aggregation of power units, transmission means for rotatably adjusting said cams co-active with the differential transmission adjusting mechanism and co-ordinated therewith so that the cams are alternately rotated whereby the dwell corresponding to the selected aggregation of power units of one cam is brought in alinement with the carriage whilst the other cam remains stationary, the carriage being thereby moved to a station at one side or the other of the said median transverse plane and the timing device being thereby correspondingly adjusted, and means actuated by said transmission adjusting mechanism for moving said carriage lever into actuating engagement with the propulsion adjusting means, levers whereby the said propulsion adjusting means are rendered operative for the period of adjustment, and subsequently rendered in-operative by the said timing device.

JOHN DUMANS VAN VLIET.